(12) United States Patent
Kawamura

(10) Patent No.: US 7,929,094 B2
(45) Date of Patent: Apr. 19, 2011

(54) VERTICALLY-ALIGNED LIQUID CRYSTAL DISPLAY DEVICE HAVING A RUGGED STRUCTURE WHICH IS IN CONTACT WITH THE LIQUID CRYSTAL LAYER

(75) Inventor: Tadashi Kawamura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 292 days.

(21) Appl. No.: 11/109,936

(22) Filed: Apr. 20, 2005

(65) Prior Publication Data
US 2005/0237471 A1    Oct. 27, 2005

(30) Foreign Application Priority Data
Apr. 22, 2004   (JP) ................................ 2004-126357

(51) Int. Cl.
*G02F 1/1337*      (2006.01)
(52) U.S. Cl. ........ 349/130; 349/123; 349/124; 349/125; 349/126; 349/129
(58) Field of Classification Search .......... 349/123–130, 349/160
See application file for complete search history.

(56) References Cited

U.S. PATENT DOCUMENTS
5,438,421 A     8/1995  Sugawara et al.
5,717,474 A *  2/1998  Sarma ............................. 349/85
5,917,570 A *  6/1999  Bryan-Brown et al. ...... 349/129
(Continued)

FOREIGN PATENT DOCUMENTS
JP          01-238619          9/1989
(Continued)

OTHER PUBLICATIONS

T. Uchida et al., "Liquid Crystal Orientation on the Surface of Obliquely-Evaporated Silicon Monoxide with Homeotropic Surface Treatment", Japanese Journal Appl. Phys., vol. 19, pp. 2127-2136, 1980.

(Continued)

*Primary Examiner* — David Nelms
*Assistant Examiner* — Lauren Nguyen
(74) *Attorney, Agent, or Firm* — Nixon & Vanderhye P.C.

(57) ABSTRACT

A liquid crystal display device 700 includes a pair of substrates, a vertical alignment type liquid crystal layer 490 provided between the pair of substrates, and electrodes 481 and 485 for applying a voltage to the vertical alignment type liquid crystal layer 490. At least one of the pair of substrates has a rugged structure on a surface which is in contact with the vertical alignment type liquid crystal layer. The surface having the rugged structure formed thereon has a region in which the height of the rugged structure varies along a first direction with a first period and varies along a second direction perpendicular to the first direction with a second period different from the first period. The first period is no less than 0.1 μm and no more than 10 μm, and the second period is no less than 0.1 μm and no more than 10 μm. The vertical alignment type liquid crystal layer 490 has a pretilt due to the rugged structure with no voltage applied thereacross.

8 Claims, 27 Drawing Sheets

U.S. PATENT DOCUMENTS

| | | | |
|---|---|---|---|
| 6,067,141 A * | 5/2000 | Yamada et al. | 349/129 |
| 6,335,775 B1 | 1/2002 | Iwamura et al. | |
| 6,362,863 B1 | 3/2002 | Kataoka et al. | |
| 6,724,452 B1 | 4/2004 | Takeda et al. | 349/139 |
| 6,965,421 B2 * | 11/2005 | Tsuchiya | 349/125 |
| 2001/0024256 A1 | 9/2001 | Kitson et al. | |
| 2002/0135725 A1 * | 9/2002 | Terashita et al. | 349/129 |
| 2002/0159018 A1 * | 10/2002 | Kataoka et al. | 349/143 |
| 2003/0112394 A1 * | 6/2003 | Yoshida et al. | 349/123 |
| 2004/0150141 A1 | 8/2004 | Chao et al. | |

FOREIGN PATENT DOCUMENTS

| | | |
|---|---|---|
| JP | 3-150530 | 6/1991 |
| JP | 04-356019 | 12/1992 |
| JP | 07-175066 | 7/1995 |
| WO | 99/34251 | 7/1999 |
| WO | 01/40853 A1 | 6/2001 |

OTHER PUBLICATIONS

Y. Kawai et al., "Control of nematic liquid crystal alignment using an ultra-fine periodical structures", Preprints of 2002 Liquid Crystal Symposium, pp. 111-112.

J.C. Jones et al., "Meeting the Display Requirements for Portable Applications using Zenithal Bistable Devices," SID 2002 Digest, pp. 90-93.

J. Cognard, "Alignment of Nematic Liquid Crystals and Their Mixtures", Molecular Crystals and Liquid Crystals Supplements Series, Supplement 1, 1987.

G.P. Bryan-Brown et al., "Grating Aligned Bistable Nematic Device", SID 97 Digest, pp. 37-40, 1997.

* cited by examiner

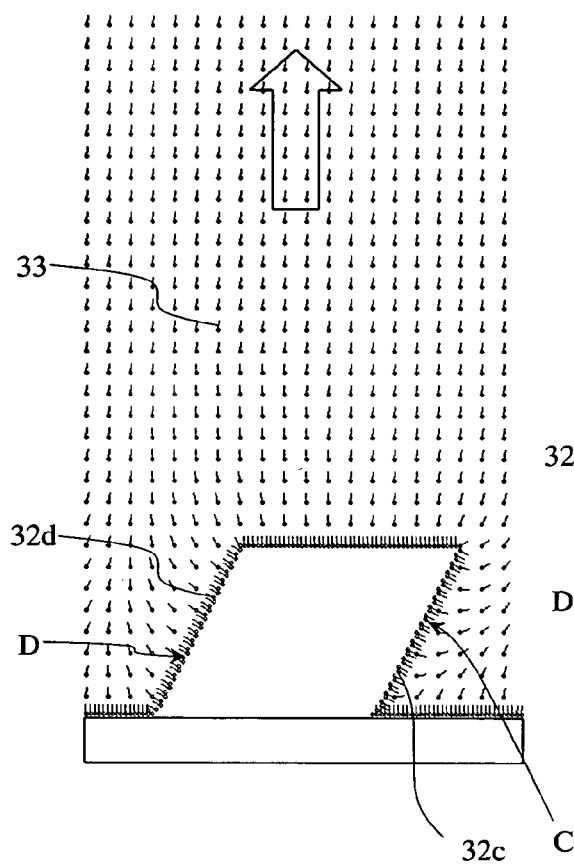
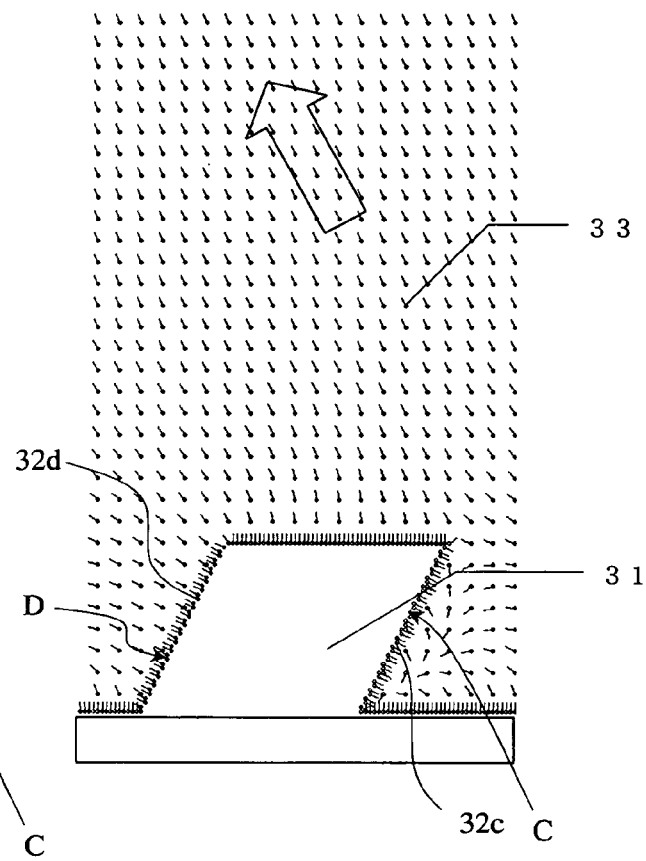
FIG. 7A
FIG. 7B

| | | Frontal Transmittance | | Transmittance at Azimuth Angle of 45° & Viewing Angle of 60° | |
|---|---|---|---|---|---|
| (I) | (Ia) (Ib) | 19% | 30% | 4.3% | 4.0% |
| (II) | (IIa) (IIb) | 19% | 30% | 1.8% | 4.8% |
| (III) | (IIIa) (IIIb) | 19% | 30% | 85% | 86% |
| (IV) | (IVa) (IVb) | 19% | 30% | 1.8% | 4.8% |

FIG.31B — Frontal Transmittance

FIG.31C — Transmittance at Azimuth Angle of 45° & Viewing Angle of 60°

VERTICALLY-ALIGNED LIQUID CRYSTAL DISPLAY DEVICE HAVING A RUGGED STRUCTURE WHICH IS IN CONTACT WITH THE LIQUID CRYSTAL LAYER

BACKGROUND OF THE INVENTION

1. Field of the Invention

The present invention relates to a liquid crystal display device and a method for producing the same.

2. Description of the Related Art

Liquid crystal display devices (LCD) are in wide use as display devices for computers or television sets. So far, horizontal alignment type LCDs have been prevalent. A horizontal alignment type LCD operates in a liquid crystal display mode such as TN (Twisted Nematic) mode or STN (Super Twisted Nematic) mode using a positive nematic liquid crystal.

Recently, in order to provide improved viewing angle characteristics and display contrast, vertical alignment type LCDs using VAN (Vertical Aligned Nematic) mode have come into practical use. A vertical alignment type LCD is an LCD which performs display in a normally black (NB) mode by employing a vertical alignment type liquid crystal layer provided between a pair of electrodes.

In order to enhance the display contrast of a vertical alignment type LCD, it is necessary to control the alignment of the vertical alignment type liquid crystal layer so as to become more uniform, with an increased stringency.

One method of achieving alignment control of a liquid crystal layer is a method which ensures that the liquid crystal layer has a pretilt with no voltage applied across the liquid crystal layer. For example, in a TN type liquid crystal display device (which is a liquid crystal display device of a horizontal alignment type), the alignment control of the liquid crystal has conventionally been realized by controlling the pretilt (or more specifically, a pretilt angle and a pretilt direction) of liquid crystal molecules by using a horizontal alignment film which have been subjected to a rubbing treatment. The pretilt angle is determined by the material of the liquid crystal layer and the alignment films and the like, whereas the pretilt direction is determined by the rubbing direction. In such a liquid crystal display device, in the absence of an applied voltage, the liquid crystal molecules (liquid crystal directors) on the surface of the alignment films on the liquid crystal layer are not completely parallel to the substrates, but are inclined by about 1° to 6° ("pretilt angle") in a predetermined direction ("pretilt direction"). Therefore, upon the application of a voltage across the liquid crystal layer, the liquid crystal molecules try to rise in the pretilt direction, thus causing a uniform and smooth change in optical response.

However, in the case of a vertical alignment type liquid crystal display device, the pretilt direction of the liquid crystal layer cannot be stably controlled even by performing a rubbing treatment for the vertical alignment films which are provided for the sake of alignment control. Moreover, since a vertical alignment type liquid crystal display device has a higher contrast than that of the horizontal alignment type liquid crystal display device, even a slight non-uniformity in alignment can be visually recognized, thus resulting in display unevenness.

Therefore, various methods of alignment control for a vertical alignment type liquid crystal display device have been studied. For example, there have been proposed a method of providing protrusions within the pixels ("rib technique") and a method of providing slits in the electrodes ("fringe field technique"). According to these methods, without having to perform a rubbing treatment for the alignment films, it is possible to restrict liquid crystal orientations by means of the rib structures or fringe field (i.e., inclined electric field).

By using the rib technique or the fringe field technique, not only is it possible to realize more stable alignment control than in the case of a rubbing treatment, but an advantage also exists in that alignment division is relatively facilitated (MVA mode; Multi Domain Vertical Alignment). In MVA mode, a plurality of regions ("domains") having different orientation directions (e.g., pretilt directions) are allowed to exist within each pixel, while ensuring that the areas of such domains are averaged out. Thus, it is possible to reduce drastic changes in brightness or contrast in response to changing viewing directions, whereby the viewing angle characteristics can be greatly improved.

As the simplest method for realizing alignment division, there has been disclosed a method which divides one pixel into four parts, as shown in FIG. 1 (e.g., Japanese Patent No. 2947350). Hereinafter, alignment division will be described by taking the method shown in FIG. 1 as an example.

Under no applied voltage, as shown in FIG. 2A, liquid crystal molecules 12 (hereinafter referred to as "central molecules") located at a middle level along the direction of the liquid crystal layer in each of the four split regions ("domain") are oriented in a direction substantially perpendicular to the face of each substrate 11 on which a vertical alignment film is formed. Provided that a pair of polarizers 11 are disposed so that their transmission axes lie perpendicular to each other (cross Nicol) with the liquid crystal layer interposed therebetween, light is not transmitted through the liquid crystal layer, thus resulting in a "black" display state.

Next, when a voltage is applied across the liquid crystal layer, as shown in FIG. 2B, the central molecules 12 fall in a direction as restricted by the ribs or fringe fields. As a result, light is now transmitted through the liquid crystal layer due to the birefringence thereof. If each pixel is alignment-divided so that, as shown in FIG. 1, the direction in which the central molecules 12 fall in each domain (as indicated by an arrow 13) differs from domain to domain, excellent viewing angle characteristics can be obtained as long as the areas of the four domains are averaged out, despite the less-than-optimum viewing angle characteristics of each domain.

If the above-described alignment division were to be realized without providing ribs or slits in each pixel, it would be necessary to form vertical alignment films which can create a plurality of domains having different pretilt directions within a single pixel, for example. However, according to any conventional technique which employs a rubbing treatment, rubbing would have to be performed a plurality of times (e.g., four times) in different directions, each time for a different domain. Since cloth is to be used for rubbing, the division precision would become poor, thus making practical applications difficult.

On the other hand, the rib technique and the fringe field technique also have a problem in that, since ribs or slits are provided within each pixel, the aperture ratio decreases, thus resulting in a dark display. As used herein, an aperture ratio is a ratio in area, to one pixel, of a portion of the pixel that allows light to be transmitted therethrough. Furthermore, the structures of the substrates, electrodes, and like elements may become complicated, so that the productivity may be lowered and the production cost may increase with increase in the number of steps involved in the production process.

Therefore, one method which is currently under study is, without using a rubbing treatment, forming vertical alignment films having a predetermined surface configuration, and controlling the pretilt direction of a vertical alignment type liquid crystal layer by utilizing the surface configuration of such vertical alignment films. Proposals have been directed to a method which forms periodic undulations (ruggednesses) with a minute pitch on the surface of each vertical alignment film, and a method which provides a vertical alignment film on a base film having a predetermined surface configuration to control the surface configuration of each vertical alignment film.

For example, a method has been proposed in which a vertical alignment film is applied to a substrate on whose surface an SiO film is formed by oblique evaporation (see, for example, T. UCHIDA, M. OHGAWARA, M. WADA, Jpn. J. Appl. Phys., 19, pp. 2127-2136 (1980)). An SiO film which is obtained by oblique evaporation has a surface configuration characterized by an arrangement of minute columns (unit features). According to the method of UCHIDA et al., the pretilt direction is controlled by the surface configuration of the SiO film. UCHIDA et al. also describe that the pretilt angle can be controlled through adjustment of the surface configuration of the SiO film by varying the evaporation conditions.

In Japanese Laid-Open Patent Publication No. 3-150530, there is proposed a method which performs embossing on the surface of a vertical alignment film by using, as a pressing die, a glass substrate having grooves in the shape of a diffraction grating or a substrate on whose surface SiO is obliquely vapor deposited.

The method proposed in UCHIDA et al. and the method proposed in Japanese Laid-Open Patent Publication No. 3-150530, supra, are both directed to producing a structure such as a substrate or a pressing die having a predetermined surface configuration, and forming a vertical alignment film having a surface configuration which reflects the surface configuration of that structure. However, these methods have the following problems because oblique evaporation is utilized for producing such a structure.

Firstly, it is difficult with oblique evaporation to control the surface configuration of a structure to a high precision. This problem is particularly outstanding in the case where unit features are to be formed on a vertical alignment film surface with a small pitch of, e.g., several μm or less. Secondly, it is impossible to arbitrarily prescribe the configuration of each unit feature of the structure (i.e., angle, orientation, etc., of the slanted faces of the grooves). Since the configuration of unit features which are formed on the surface of an SiO film by oblique evaporation depends on the evaporation conditions, there are limits to the configuration of the unit features that can be selected. Therefore, it is difficult to obtain a pretilt with an arbitrary direction or angle, and thus, there are limitations on the applications of the display device. Thirdly, in the case where an alignment division is to be performed for improved viewing angle characteristics (MVA mode), it is necessary to form a vertical alignment film which permits a plurality of regions (domains) having different pretilt directions to exist within one pixel. Using oblique evaporation to produce a structure for forming such a vertical alignment film, however, would complicate the production process. Moreover, with any method utilizing oblique evaporation, it is necessary to secure a certain distance or more between the evaporation source and the substrate surface in order to ensure that the incident angle with respect to the substrate surface falls within a predetermined range. Thus, pompous equipment is required, thus making the production of large-sized display devices difficult.

On the other hand, in Y. KAWAI, I. IRIE, T. SHIMAMURA, T. KAGASHIRO, H. OKADA, and H. ONNAGAWA, "Control of nematic liquid crystal alignment using an ultra-fine periodical structures", preprints of 2002 liquid crystal symposium, pp. 111-112, there is proposed a method which forms ruggednesses composed of periodic fine grooves on a substrate surface by utilizing interference exposure, thus causing vertical alignment of liquid crystal.

However, KAWAI et al. lack any mention of causing a pretilt of vertically aligned liquid crystal molecules. Moreover, the ruggednesses which are described KAWAI et al. are obtained by allowing perpendicularly-intersecting sinusoidal interference fringes to exist, and therefore, there are limitations on the configuration and arrangement of the fine grooves that can be selected. Furthermore, since similar features are formed along two directions perpendicular to each other (x direction, y direction), it is difficult to separately control the features along the x direction from the features along the y direction. Therefore, when this method is applied to a display device of MVA mode, for example, the production process may be complicated.

As described above, although there have been proposed methods for providing minute undulations (ruggednesses) on a surface which is in contact with a liquid crystal layer in order to perform alignment control of a vertical alignment type liquid crystal layer, it is difficult to obtain arbitrary and strict control of liquid crystal alignment without lowering the aperture ratio or complicating the production process.

SUMMARY OF THE INVENTION

The present invention has been made in order to overcome the problems described above, with a primary aim being to control liquid crystal alignment with a high precision by imparting a pretilt to a vertical alignment type liquid crystal layer, using a minute rugged structure (ruggedness) formed on a surface which is in contact with a liquid crystal layer.

A liquid crystal display device of the present invention is a liquid crystal display device comprising a pair of substrates, a vertical alignment type liquid crystal layer provided between the pair of substrates, and electrodes for applying a voltage to the vertical alignment type liquid crystal layer, wherein, at least one of the pair of substrates has a rugged structure on a surface which is in contact with the vertical alignment type liquid crystal layer; the surface having the rugged structure formed thereon has a region in which the height of the rugged structure varies along a first direction with a first period and varies along a second direction perpendicular to the first direction with a second period different from the first period; the first period is no less than 0.1 μm and no more than 10 μm, and the second period is no less than 0.1 μm and no more than 10 μm; and in the absence of an applied voltage, the vertical alignment type liquid crystal layer has a pretilt due to the rugged structure.

In a preferred embodiment, in the absence of an applied voltage, liquid crystal molecules located at a middle level along a thickness direction of the vertical alignment type liquid crystal layer are aligned so as to be tilted from a normal direction of the pair of substrates.

In a preferred embodiment, the first period is smaller than the second period.

Preferably, the height of the rugged structure is equal to or greater than 0.2 times the first period. More preferably, the height of the rugged structure is equal to or greater than 0.5 times the first period.

In a preferred embodiment, the rugged structure comprises a plurality of unit features arranged in a two-dimensional array, each unit feature having an asymmetric cross section along the first direction.

Each unit feature may have a substantially triangular cross section along the first direction.

Each unit feature may have a substantially quadrangular cross section along the first direction.

Each unit feature may have a substantially trapezoidal cross section along the first direction.

One of base angles of the substantially trapezoidal cross section of each unit feature may be equal to or greater than 90° and less than 180°.

The unit features may be arranged with interspaces along the first direction.

The rugged structure may comprise a plurality of grooves arranged in the second direction.

Each groove may extend along the first direction.

Each groove may have a substantially quadrangular and symmetric cross section along the second direction.

In a preferred embodiment, each groove may have a width of no less than 0.1 μm and no more than 10 μm.

In a preferred embodiment, the rugged structure including rows A and rows B, each row A having the unit features arranged in the first direction and each row B being identical to the row A being shifted along the first direction by a distance which is less than an average period of the unit features; and the rows A and rows B alternate in the second direction.

Another liquid crystal display device of the present invention is a liquid crystal display device comprising a pair of substrates, a vertical alignment type liquid crystal layer provided between the pair of substrates, and electrodes for applying a voltage to the vertical alignment type liquid crystal layer, wherein, at least one of the pair of substrates has a rugged structure on a surface which is in contact with the vertical alignment type liquid crystal layer; the surface having the rugged structure formed thereon has a region in which the height of the rugged structure varies along a first direction with a first period and varies along a second direction perpendicular to the first direction with a second period which is equal to or different from the first period; the first period is no less than 0.1 μm and no more than 10 μm, and the second period is no less than 0.1 μm and no more than 10 μm; the rugged structure comprises a plurality of grooves each having a substantially quadrangular and symmetric cross section and extending in a direction different from the second direction; and in the absence of an applied voltage, the vertical alignment type liquid crystal layer has a pretilt due to the rugged structure.

A still another liquid crystal display device of the present invention is a liquid crystal display device comprising a pair of substrates, a vertical alignment type liquid crystal layer provided between the pair of substrates, and electrodes for applying a voltage to the vertical alignment type liquid crystal layer, wherein, at least one of the pair of substrates has a rugged structure on a surface which is in contact with the vertical alignment type liquid crystal layer; the rugged structure includes rows A and rows B, each row A having a plurality of unit features arranged along a first direction with a first period, each row B being identical to the row A being shifted along the first direction by a distance which is less than an average period of the unit features, the rows A and rows B alternating in a second direction perpendicular to the first direction with a second period which is equal to or different from the first period; the first period is no less than 0.1 μm and no more than 10 μm, and the second period is no less than 0.1 μm and no more than 10 μm; and in the absence of an applied voltage, the vertical alignment type liquid crystal layer has a pretilt due to the rugged structure.

A still another liquid crystal display device of the present invention is a liquid crystal display device comprising a pair of substrates, a vertical alignment type liquid crystal layer provided between the pair of substrates, and electrodes for applying a voltage to the vertical alignment type liquid crystal layer, wherein, at least one of the pair of substrates has a rugged structure on a surface which is in contact with the vertical alignment type liquid crystal layer; the rugged structure comprises a plurality of unit features arranged along a first direction with a period of no less than 0.1 μm and no more than 10 μm, each unit feature having a substantially columnar shape; each bottom face surrounded by most adjacent ones of the plurality of unit feature lacks a symmetry axis of rotation in a substrate normal direction; and the vertical alignment type liquid crystal layer with no voltage applied thereacross has a pretilt due to the rugged structure.

In a preferred embodiment, with no voltage applied across the vertical alignment type liquid crystal layer, liquid crystal molecules located at a middle level along a thickness direction of the vertical alignment type liquid crystal layer are aligned so as to be tilted from a normal direction of the pair of substrates.

Preferably, the plurality of unit features have a height of no less than 0.1 μm and no more than 3 μm.

Each unit feature may be a triangular prism.

Each unit feature may be a pentagonal prism.

In a preferred embodiment, each unit feature has a shape which is determined in accordance with a specific location (position) of the unit feature on the substrate.

In a preferred embodiment, the rugged structure constitutes a plurality of subregions causing respectively different pretilt directions.

The rugged structure constituting the plurality of subregions may be provided on both of the pair of substrates, such that each subregion on one of the pair of substrates opposes a corresponding subregion on the other substrate in a one-to-one relationship.

The rugged structure constituting the plurality of subregions may be provided on both of the pair of substrates, such that each subregion on one of the pair of substrates opposes a corresponding plurality of subregions on the other substrate.

The rugged structure constituting the plurality of subregions may be provided on only one of the pair of substrates.

In a preferred embodiment, the liquid crystal display device further comprises a plurality of pixels arranged in a matrix, wherein, within a region corresponding to each pixel, the rugged structure constitutes a group of subregions causing respectively different pretilt directions.

In a preferred embodiment, the liquid crystal display device further comprises a plurality of pixels arranged in a matrix, wherein, within a region corresponding to each pixel, the rugged structure constitutes a plurality of groups of subregions causing respectively different pretilt directions, the groups of subregions being arranged with a pitch GP.

Each pixel may include a substantially rectangular aperture for allowing light to be transmitted therethrough, the aperture having a longer side extending along a column direction of the matrix of pixels and a shorter side extending along a row direction of the matrix of pixels; and the rugged structure may be split in stripes to constitute the plurality of subregions, each subregion extending in a direction which is parallel to neither the longer nor shorter side of the aperture.

A length $H_p$ of the longer side of each aperture may be substantially equal to an integer multiple of a length $W_p$ of the shorter side; the length $W_p$ of the shorter side may be substantially equal to an integer multiple of the pitch GP of the groups of subregions; and the subregions may extend in a direction at an angle of about 45° with respect to the shorter side of the aperture.

In a preferred embodiment, each subregion includes a plurality of minute regions causing respectively different pretilt angles.

In a preferred embodiment, the rugged structure has an embossed surface.

A method of producing the liquid crystal display device according to the present invention comprises the steps of: preparing a substrate having a rugged structure formed on a surface thereof; and providing a vertical alignment type liquid crystal layer between the substrate and another substrate opposing the substrate.

In a preferred embodiment, the step of preparing the substrate having the rugged structure formed on the surface thereof comprises the steps of: preparing a master having a surface configuration corresponding to the rugged structure; and embossing (or otherwise transferring) the surface configuration of the master onto the surface of the substrate.

According to the present invention, by using a minute rugged structure which is formed on a surface which is in contact with a liquid crystal layer, a substantially uniform pretilt can be imparted to liquid crystal molecules which are located at a middle level along the thickness direction of the vertical alignment type liquid crystal layer. As a result, the liquid crystal alignment can be controlled with a high precision, whereby high contrast display can be obtained. Since the alignment of the liquid crystal layer can be regulated by a plane (two dimensions), the response characteristics can be improved. Furthermore, alignment division can be realized by controlling the shape and/or arrangement of the rugged structure, the viewing angle characteristics can be improved.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 7A is a diagram showing a simulation result of liquid crystal alignment in the case where no disclinations are introduced. FIG. 7B is a diagram showing a simulation result of liquid crystal alignment in the case where disclinations are introduced.

FIGS. 31B and 31C are charts illustrating results of transmittance measurement in the minute regions included in a unit region in FIG. 31A.

DETAILED DESCRIPTION OF PREFERRED EMBODIMENTS

Hereinafter, preferred embodiments of the present invention will be described with reference to the accompanying drawings.

According to the present invention, a minute rugged structure (or minute ruggednesses) is introduced to a surface which is in contact with a liquid crystal layer, the rugged structure placing the liquid crystal layer in a vertical alignment. In the present specification, such a rugged structure may be referred to as an "alignment controlling structure".

Figure 3A:
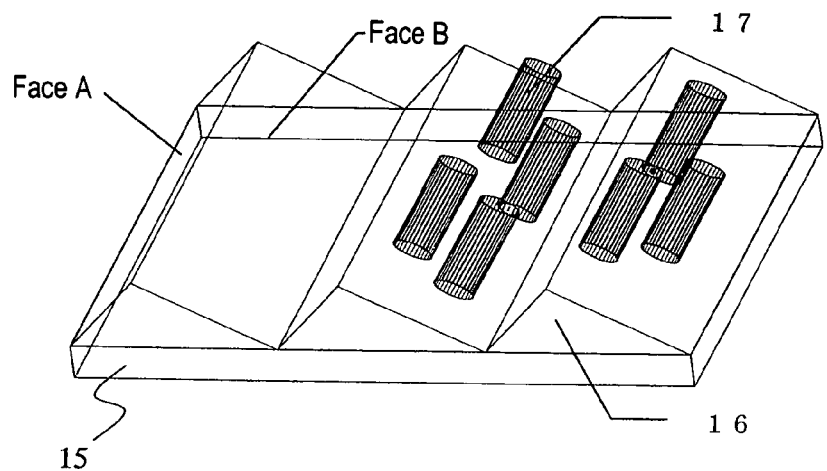
FIGS. 3A and 3B are diagrams for explaining the concept of alignment control based on a rugged structure.
Figure 3B:
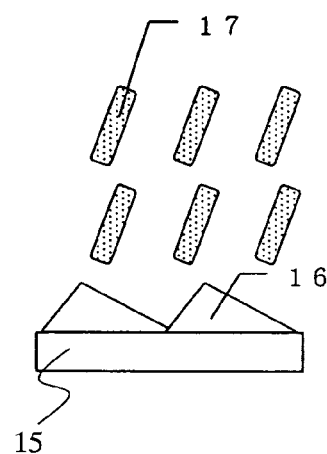

First, the concept of alignment control by the ruggednesses introduced to a surface which is in contact with a liquid crystal layer will be described. With reference to a perspective view of FIG. 3A and a cross-sectional view of FIG. 3B, an example will be described in which liquid crystal molecules 17 are aligned by means of a substrate 15 on whose surface a number of unit features 16 are arranged.

Each unit feature 16 is composed of two faces (face A, face B) which are slanted in different directions, and has a substantially triangular cross-sectional shape. On the surface of the unit features 16, a vertical alignment film is formed (not shown). The vertical alignment film has a surface which reflects the surface configuration of the unit features 16. When a liquid crystal layer is provided so as to be in contact with this vertical alignment film, the liquid crystal molecules 17 in the liquid crystal layer are oriented so as to be perpendicular to the surface of the vertical alignment film. In other words, any liquid crystal molecule located upon face B of the unit feature 16 is oriented as to be perpendicular to face B, whereas any liquid crystal molecule located upon face A is oriented so as to be perpendicular to face A. Thus, by introducing the ruggednesses to a surface which is in contact with the liquid crystal layer, the direction and angle of tilt of liquid crystal molecules in the vertical alignment type liquid crystal layer can be controlled.

Figure 6A:
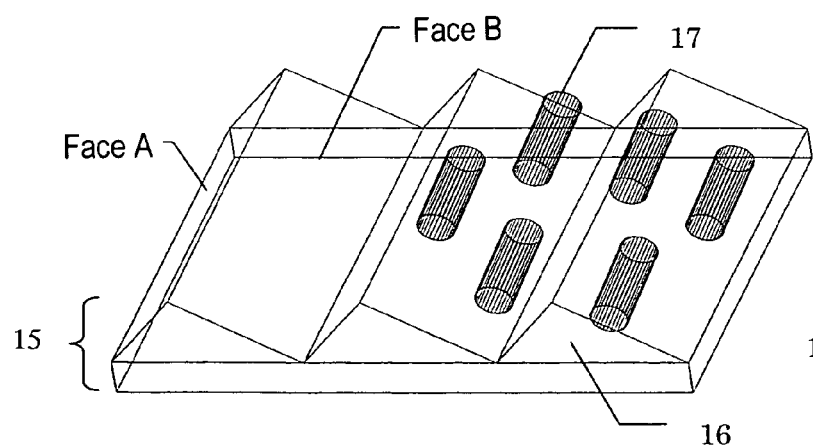
FIGS. 6A and 6B are diagrams for explaining alignment control for a parallel alignment type liquid crystal layer.
Figure 6B:
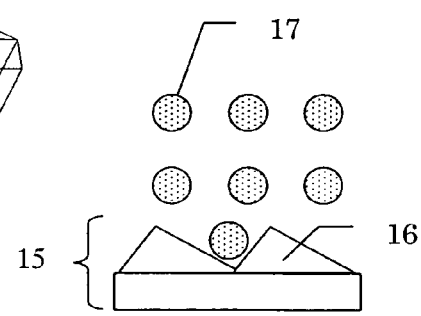

Note that undulation-based techniques for realizing alignment of a liquid crystal layer of a parallel alignment type are well known, as is described in J.COGNARD, Mol. Cryst.Liq.Cryst.Suppl.1(1987)1, for example. In the case of parallel alignment, as shown in FIGS. 6A and 6B, both face A and face B can be used to control the azimuth angle directions of the liquid crystal molecules; however, these slanted faces cannot be used for freely controlling the pretilt in an initial alignment. Therefore, it should be understood that the known techniques of alignment control for a parallel alignment type liquid crystal layer are utterly distinct from the aforementioned and below-described technique of alignment control for a vertical alignment type liquid crystal layer using ruggednesses.

When undulation-based alignment control is to be applied to a liquid crystal display device of VAN mode, the following problems may occur.

Referring back to FIGS. 3A and 3B, assuming that the unit features 16 have a period (pitch) P which is about the same as the pixel pitch (e.g., 100 μm), it would be possible to realize alignment of the liquid crystal molecules 17 only by means of face B, if face A is masked so that each pixel portion is defined only by a region corresponding to face B, out of the entire surface configuration. In other words, the liquid crystal molecules 17 would be oriented in the normal direction of face B, and thus tilted with respect to the normal of the substrate 15. However, in a general liquid crystal display device which is sized so that each pixel has a width of 100 μm and a thickness of 3 to 5 μm, it is necessary to ensure that the liquid crystal molecules 17 are tilted by about 3° from the substrate normal in order to attain good alignment control of the liquid crystal layer. If such a tilting angle were to be provided by means of unit features 16 of the aforementioned size, the ridges of the unit features 16 would have to rise so high that they exceed the thickness of the liquid crystal layer. It would be physically impossible to form such unit features 16 within the cell.

On the other hand, if the repetition period P of unit features 16 is made shorter than the pixel pitch, a plurality of unit features 16 will be formed within one pixel. As a result, different orientations, i.e., an orientation ascribable to face A and an orientation ascribable to face B, will be present. Although it might be possible to mask face A so as to realize alignment only by means of face B, the aperture ratio will be decreased in that case, thus resulting in a dark display and making it necessary to adjust the area ratio between face A and face B.

However, even if the area ratio between face A and face B is optimized so as to enable alignment control of the liquid crystal molecules 17, the ruggednesses introduced to the surface which is in contact with the liquid crystal layer will cause fluctuations in the effective cell thickness. Therefore, there will be a distribution of brightness within each pixel, which leads to a reduced transmittance. In order to prevent such fluctuations in the effective cell thickness, it would be necessary to further shorten the repetition period P of the unit features 16 (e.g., to 10 μm or less).

On the other hand, if the repetition period P is 1 μm or less, the alignment controlling element 15 will act as a diffraction grating with respect to visible light, thus causing coloration of the pixels when applied to a liquid crystal display device. Therefore, in order to realize satisfactory display, it is desirable that the period P is no less than 1 μm.

However, if alignment is to be introduced to a liquid crystal layer by using an alignment controlling element 15 having minute unit features 16 with a repetition period P in the range of about 1 μm to about 10 μm, a problem will occur because the alignment ascribable to face A and the alignment ascribable to face B will cancel out each other, thus making it difficult to impart a sufficient pretilt to the interior of the liquid crystal layer.

Figure 4:
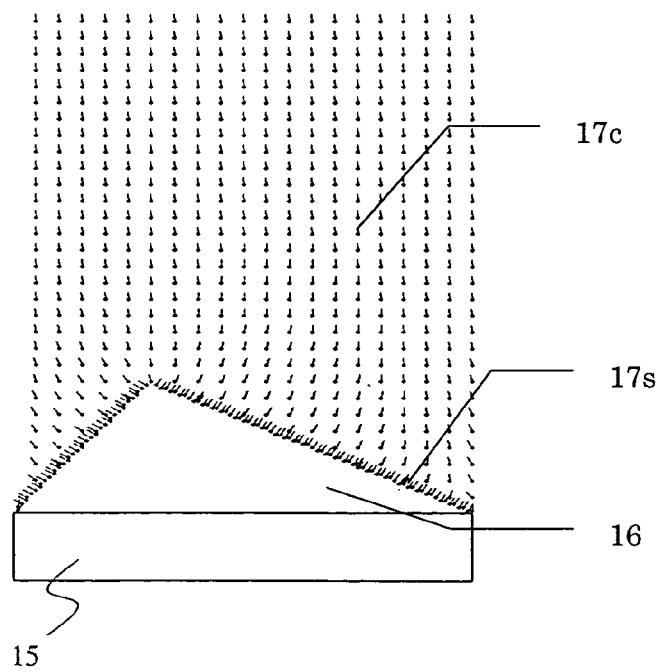
FIG. 4 is a diagram showing a simulation result of liquid crystal alignment.

By using a substrate 15 in which unit features 16 are arranged with a repetition period P of 10 μm, the liquid crystal molecule orientations in the liquid crystal layer were examined. FIG. 4 shows the result of this simulation. The liquid crystal layer used in the simulation had a thickness of 20 μm.

As can be seen from FIG. 4, the orientations of liquid crystal molecules 17s located at an interface between the liquid crystal layer and each unit feature 16 (hereinafter referred to as "interfacial liquid crystal molecules") are determined by slanted faces A and B of the unit feature 16. However, the liquid crystal molecules which are distant from the unit features 16 are unlikely to be influenced by the slanted faces, so that liquid crystal molecules 17c located at a middle level along the thickness direction of the liquid crystal layer (hereinafter referred to as "central molecules") are hardly tilted with respect to the normal direction of the substrate 15.

Figure 5:
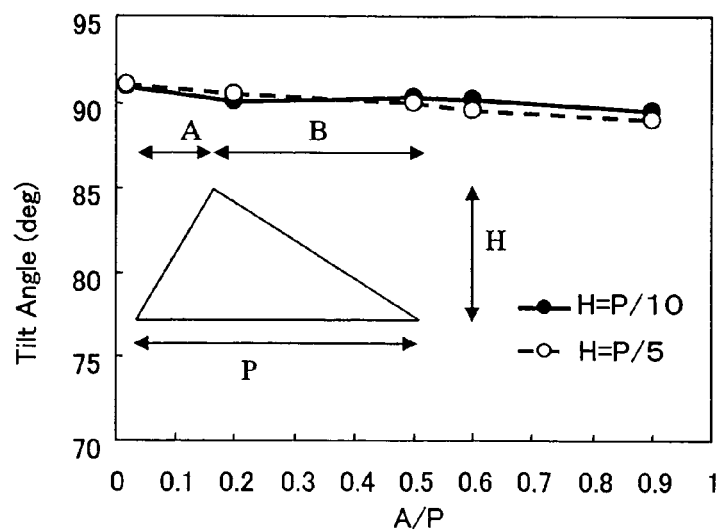
FIG. 5 is a graph illustrating the relationship between unit feature shape and tilt angle as obtained from a simulation.

Next, a similar simulation was performed while varying the area ratio between face A and face B of each unit feature 16 and the height H of each unit feature 16; the results are shown in FIG. 5. The horizontal axis of the graph of FIG. 5 represents a ratio A/P of the width of face A to the repetition period P of the unit features 16, whereas the vertical axis represents the angle (tilt angle) between the longer axes of the central molecules and the substrate surface in the absence of an applied voltage. From the results shown in FIG. 5, it can be seen that a similar trend to the simulation result shown in FIG. 4 exists even though the area ratio between face A and face B and the height H of each unit feature 16 is varied. The central molecules are hardly tilted with respect to the substrate normal direction.

The simulation results shown in FIG. 4 and FIG. 5 would indicate that the unit features 16 cannot impart a sufficient pretilt (e.g., a tilt angle of about 87° or about 93°; that is, an angle of about 3° between the liquid crystal molecules and the substrate normal) for the liquid crystal molecules located at a middle level along the thickness direction of the liquid crystal layer. The presumable reasons are as follows.

When alignment control is to be realized through a rubbing treatment, the liquid crystal alignment as determined at the interface between the liquid crystal layer and the substrate (alignment film) will be retained across the thickness direction of the liquid crystal layer. On the other hand, when alignment control is to be realized by means of ruggednesses formed on a surface which is in contact with the liquid crystal layer as shown in FIG. 4, the liquid crystal molecules will be oriented in accordance with the ruggednesses, as long as the ruggednesses consists of a fine pattern (e.g., 10 μm or less). However, under influences from the surroundings, the liquid crystal molecules will be reoriented so as to minimize strain in terms of orientation distribution. Thus, any local change (tilting direction and tilting angle) which has been imparted by the ruggednesses to the liquid crystal molecule 17s will be gradually averaged out along the thickness direction of the liquid crystal layer.

Therefore, merely downsizing the unit features 16 will not enable undulation-based alignment control to be applied to a liquid crystal display device. In order to enable applications to a liquid crystal display device, the average period P of the unit features must be kept no less than 10 μm, and the shape and size of the unit features 16 will also need to be optimized so that the liquid crystal alignment can be controlled across the thickness direction of the liquid crystal layer.

The inventors of the present invention have conducted a detailed study to find that, in order to enable liquid crystal alignment across the thickness direction of the liquid crystal layer, it is effective to intentionally introduce a kind of disclination (i.e., alignment defect) near the surface of a vertical alignment film for the liquid crystal layer, as will be described specifically with reference to FIGS. 7A and 7B. FIGS. 7A and 7B illustrate examples where alignment control for a liquid crystal layer is performed by using a substrate 30 on whose surface unit features 31 are arranged, each unit feature 31 having a cross section in the form of a parallelogram.

FIG. 7A is a diagram showing the liquid crystal alignment in the case where no disclinations exist. As can be seen from FIG. 7A, near the surface of a unit feature 31, the orientations of the liquid crystal molecules 32c and 32d are respectively restricted by face C and face D composing the unit feature 31. As a result, the liquid crystal molecules 32c located upon face C and the liquid crystal molecules 32d located upon face D are tilted in respectively different directions. However, these tilting directions become more averaged out as the liquid crystal molecules are located farther away from the unit feature 31, such that liquid crystal molecules 33 which are located at a middle level along the thickness direction of the liquid crystal layer are oriented substantially perpendicular to the substrate 30.

On the other hand, as shown in FIG. 7B, disclinations can be intentionally caused by optimizing the shape and/or arrangement of the unit features 31. In FIG. 7B, the orientation of the liquid crystal molecules as restricted by the slanted side face (face C) of the unit feature 31 and the orientation of the liquid crystal molecules as restricted by the substrate surface (bottom face) cannot maintain continuity in the thickness direction of the liquid crystal layer, thus causing disclinations in a region sandwiched between face C and the substrate surface. Since the orientational continuity is broken due to the disclinations, the orientation force from face C is not transmitted to any liquid crystal molecules distant from face C. As a result, the influence which face C exerts on the orientation of the liquid crystal molecules in the entire liquid crystal layer is reduced, whereas the orientation force of face D becomes dominant. In this state, the liquid crystal molecule orientation as restricted by the side face (face C) may be said to be "confined within a space".

According to the present invention, the disclinations as shown in FIG. 7B are utilized to substantially uniformly control the alignment of the liquid crystal molecules 33 which are located at a middle level along the thickness direction of the liquid crystal layer.

The aforementioned ruggednesses (alignment controlling structure) may be provided on any surface which is in contact with a liquid crystal layer, e.g., a TFT substrate, or a color filter substrate of a liquid crystal display device. In the present specification, any substrate (including a TFT substrate, a color filter substrate, a glass substrate or the like) on whose surface an alignment controlling structure is provided will be collectively referred to as an "alignment controlling element".

Hereinafter, with reference to the accompanying drawings, exemplary structures of the alignment controlling element of the present invention will be described.

Figure 8A:
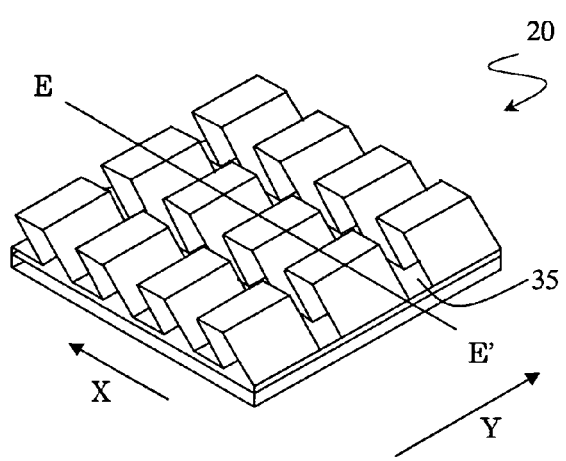
FIGS. 8A and 8B are a perspective view and a cross-sectional view, respectively, showing an exemplary structure of an alignment controlling element.
Figure 8B:
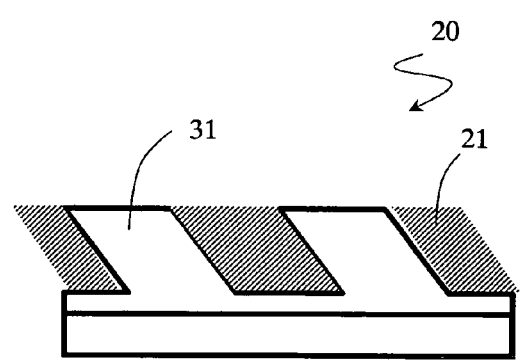

FIG. 8A is a perspective view of an alignment controlling element 20 including unit features 31 each having a quadrangular cross section. FIG. 8B is an E-E' cross-sectional view of the alignment controlling element 20.

On the surface of the alignment controlling element 20, the unit features 31 are arranged in a two-dimensional array. Each unit feature 31 has a cross section which is asymmetric along an X direction. The alignment controlling element 20 has a plurality of grooves 35 formed therein. Each groove 35 extends in a direction which is not perpendicular to the X direction, and may extend, for example, along the X direction.

With the alignment controlling element 20, it is possible to cause disclinations in the hatched areas shown in FIG. 8B, i.e., each region 21 surrounded by side walls of adjoining unit features and the substrate surface. In order to confine liquid crystal alignment within the region 21, it is necessary to adjust the surface configuration by, for example, adequately reducing the gap between adjoining unit features. The specific size and pitch of the unit features will be discussed later. The unit features may have any asymmetric cross-sectional shape, e.g., a triangle.

The grooves 35 in the alignment controlling element 20 are provided in order to prevent the liquid crystal molecules from rotating in an azimuth angle direction under a high applied voltage, as described below.

Figure 2A:
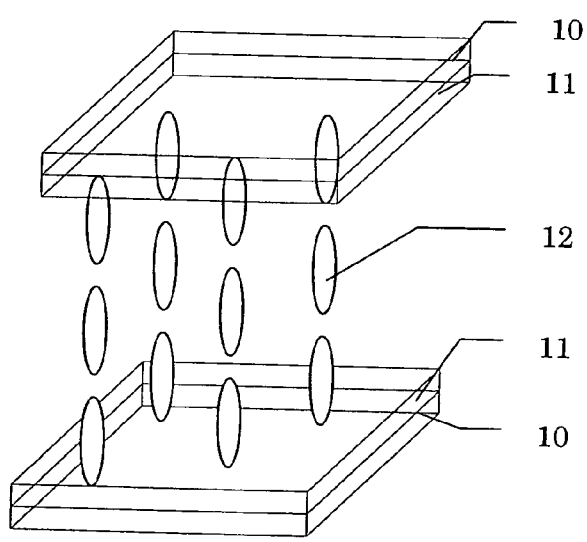
FIGS. 2A and 2B are diagrams for explaining VAN mode.
Figure 2B:
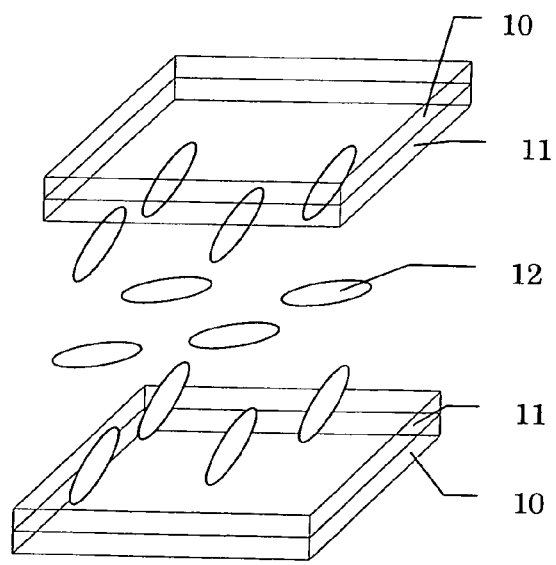

As described above with reference to FIGS. 2A and 2B, in VAN mode, the liquid crystal molecules are vertically aligned in the absence of an applied voltage (FIG. 2A). When a voltage is applied across the liquid crystal layer, the liquid crystal molecules become aligned in parallel to the substrate (FIG. 2B). If the grooves 35 were not formed in the alignment controlling element 20, when the liquid crystal molecules near the surface of the alignment controlling element 20 take a near-parallel posture to the substrate upon the application of a voltage, the liquid crystal molecules would try to align in the direction of the gaps between unit features, based on a principle similar to that described in FIGS. 6A and 6B with respect to the liquid crystal molecules 17. The gaps between unit features extend in a direction perpendicular to the orientation direction of the liquid crystal molecules in the absence of an applied voltage. Thus, as the voltage is increased, the motion of the liquid crystal molecules would switch from a motion in a polar angle direction to a motion in an azimuth angle direction. This makes it difficult to increase the voltage to be applied in a white display state, thus hindering satisfactory display.

On the other hand, if the grooves 35 are provided in the alignment controlling element 20 as shown in FIG. 8A, the liquid crystal molecules will try to align along the grooves 35 upon the application of a voltage, thus being prevented from rotating in an azimuth angle direction.

Each unit feature 31 is asymmetric with respect to a plane which is perpendicular to the X direction and to the substrate surface. Therefore, the surface of the alignment controlling element 20 is asymmetric with respect to azimuthal direction. In other words, the height of the surface of the alignment controlling element 20 periodically changes both along the X direction and along a Y direction which is perpendicular to the X direction, such that the period of height change along the X direction is different from the period of height change along the Y direction. Therefore, by disposing the alignment controlling element 20 so that its surface is in contact with the liquid crystal layer, not only is it possible to impart a pretilt to the liquid crystal layer in the absence of an applied voltage based on the cross-sectional shape (which is asymmetric along the X direction) of each unit feature 31, but it is also possible to restrict the liquid crystal molecule orientations under a high applied voltage, based on changes in the surface height along the Y direction (as exemplified by the periodic grooves 35).

Thus, the ruggednesses of the alignment controlling element 20 are optimized in terms not only of the cross-sectional shape but also of the shape along the depth direction. Therefore, the liquid crystal alignment can be controlled in both a black display state and a white display state. As a result, high quality display can be obtained.

With the exemplary alignment controlling element 20 illustrated in FIGS. 8A and 8B, disclinations are caused by breaking continuity in the thickness direction of the liquid crystal layer, by taking advantage of the orientation force from slanted face C of the unit features 31 and the orientation force from the substrate surface as has been described with reference to FIGS. 7A and 7B. Alternatively, disclinations may be caused by breaking orientational continuity within the plane of the liquid crystal layer.

As will be described later with reference to FIGS. 9A and 9B, an alignment controlling element 40 shown in FIGS. 8C and 8D acts so that the orientations of liquid crystal molecules 17w as restricted by the side faces of unit features 41 which extend substantially perpendicularly with respect to the substrate surface and the orientation of liquid crystal molecules 17g as restricted by the substrate surface (bottom face) cannot maintain continuity within the plane of the liquid crystal layer, thus causing disclinations along the side faces of each unit feature 41. Due to such disclinations, the orientations of the liquid crystal molecules as restricted by the side faces of the unit features 41 are "confined within a planar region" which is defined by the bottom face 42 and substantially surrounded by the side faces of each unit feature 41.

An exemplary alignment controlling element structure for causing disclinations within a planar region will be described below.

Figure 8C:
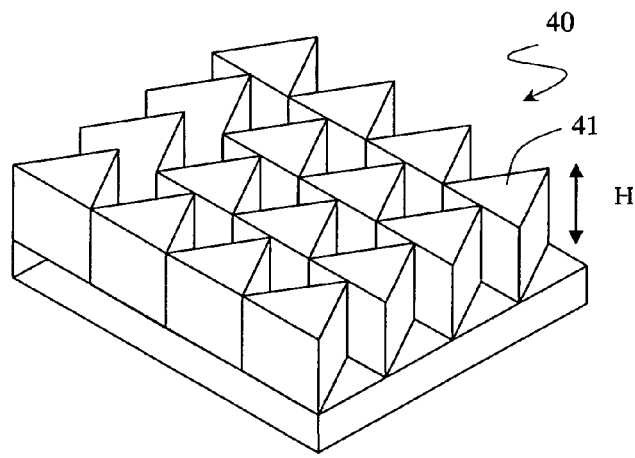
FIGS. 8C and 8D are a perspective view and a cross-sectional view, respectively, showing another exemplary structure of an alignment controlling element.

FIG. 8C is a perspective view showing another exemplary structure of the alignment controlling element of the present invention. The alignment controlling element 40 shown in FIG. 8C includes a plurality of triangular-prism-like unit features 41. The upper face of each unit feature 41 may be an isosceles triangle, for example. FIG. 8D is a plan view of the alignment controlling element 40. As can be seen from these figures, each gap (dent) between adjoining unit features 41 has a bottom face 42 in the shape of an isosceles triangle.

When liquid crystal is aligned with the alignment controlling element 40, it is possible to confine liquid crystal alignment within a planar region defined by the bottom face 42. This principle will be described below, with reference to FIGS. 9A and 9B.

Figure 9A:
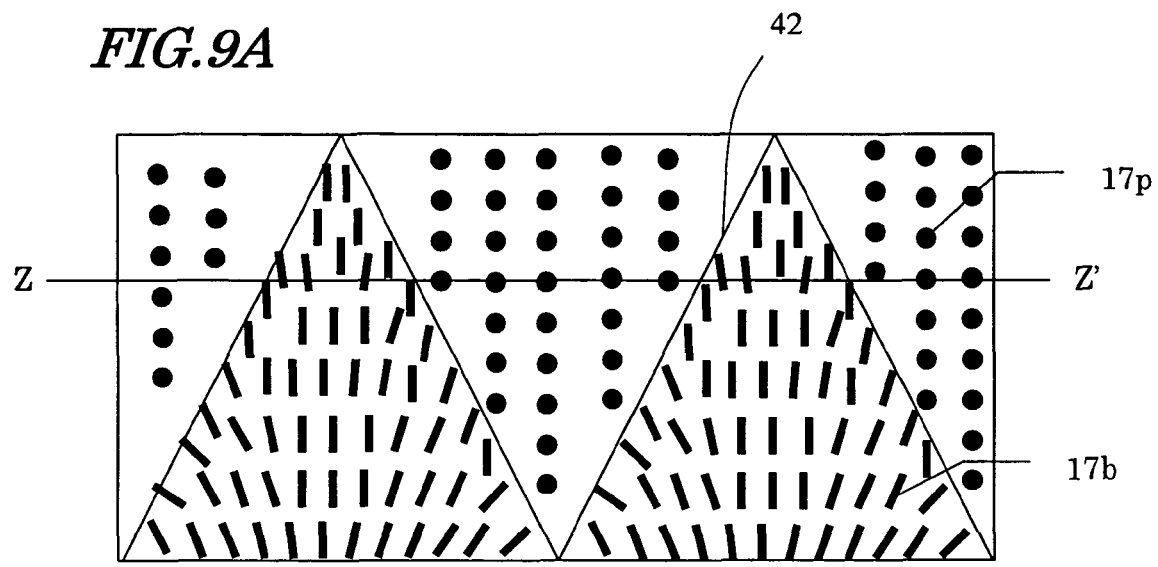
FIGS. 9A and 9B are a plan view and a cross-sectional view, respectively, showing liquid crystal molecule orientations at the alignment controlling element surface shown in FIGS. 8C and 8D.
Figure 9B:
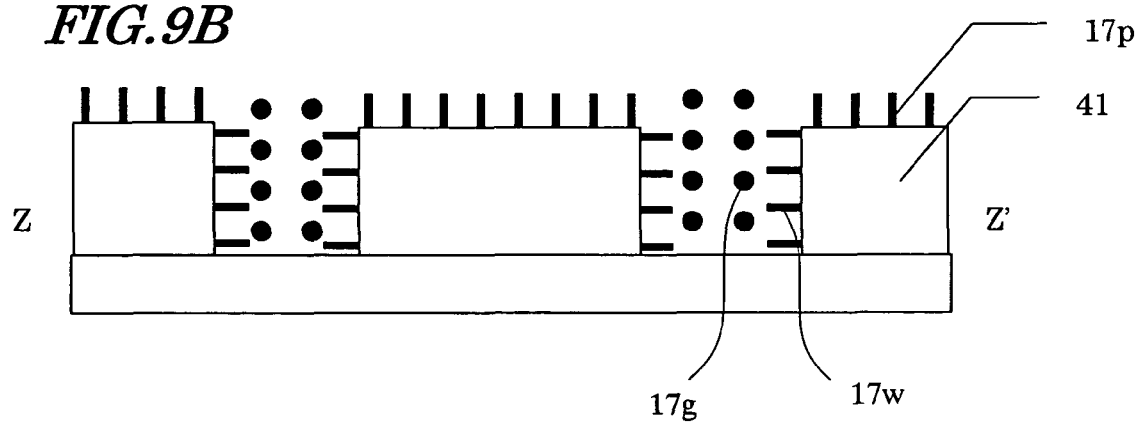

FIGS. 9A and 9B are a plan view and a Z-Z' cross-sectional view, respectively, showing the orientations of interfacial liquid crystal molecules at an interface between the alignment controlling element 40 and the liquid crystal layer. As shown, liquid crystal molecules 17p near the upper face of each unit feature 41 are aligned so as to be perpendicular to the upper face of the unit feature 41. At the bottom face 42 of each gap (dent) between unit features 41, liquid crystal molecules 17b are compelled to align in a direction parallel to the bottom face 42 and substantially perpendicular to the bottom side of the isosceles triangle defining the bottom face 42. Other liquid crystal molecules 17g in the gap of each unit feature 41 are aligned substantially similarly to the liquid crystal molecules 17b due to the influence of the liquid crystal molecules 17b at the bottom face 42, except that the liquid crystal molecules 17w located near either side wall of each unit feature 41 are aligned so as to be perpendicular to that side wall of the unit feature 41.

Thus, at the interface between the liquid crystal layer and the alignment controlling element 40, mainly two orientations predominate: the orientation of the liquid crystal molecules 17b at the bottom faces 42, and the orientation of the liquid crystal molecules 17p at the upper faces of the unit features 41. The liquid crystal molecules in the overall liquid crystal layer are aligned in a direction which averagely combines these two orientations, thus resulting in a vertically alignment which is tilted in a specific direction. In other words, alignment control within this liquid crystal layer can be realized by controlling the above two orientations that are imparted to the interfacial liquid crystal molecules, while ignoring any other orientations (e.g., those of the liquid crystal molecules 17w near the side walls of the unit features 41).

Figure 8D:
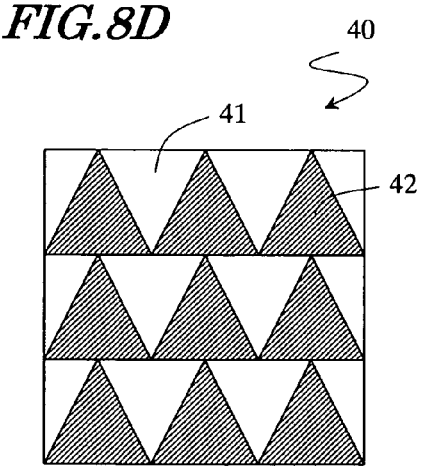

The shape of the upper face and the shape of the bottom face 42 of each unit feature 41 are not limited to the shapes shown in FIGS. 8C and 8D. However, it must be noted that, if the bottom face 42 has a shape which has a symmetry axis of rotation in the substrate normal direction (e.g., a regular triangle, a square, or a rectangle), it would be impossible to cause the interfacial liquid crystal molecules near the bottom face to be aligned in a certain direction. Therefore, it is necessary that the bottom face 42 does not have a symmetry axis of rotation in the substrate normal direction.

A structure for causing disclinations within a planar region (such as the alignment controlling element 40 shown in FIGS. 8C and 8D) can be produced more easily than a structure for causing spatial disclinations (such as the alignment controlling element 20 shown in FIGS. 8A and 8B). In the case of a structure for causing spatial disclinations, the surface of the alignment controlling element needs to have ruggednesses which vary along the thickness direction of the liquid crystal layer (as exemplified by the unit features 31 of the alignment controlling element 20). However, it is difficult to produce ruggednesses which vary along the thickness direction with a conventional exposure apparatus. On the other hand, in the case of a structure for causing disclinations within a planar region, the ruggednesses may be formed so as to be always vertical with respect to the substrate (as exemplified by the triangular-prism-like unit features 41), and therefore can be produced with an exposure apparatus which is usually employed for display device production, e.g., a stepper.

Figure 10A:
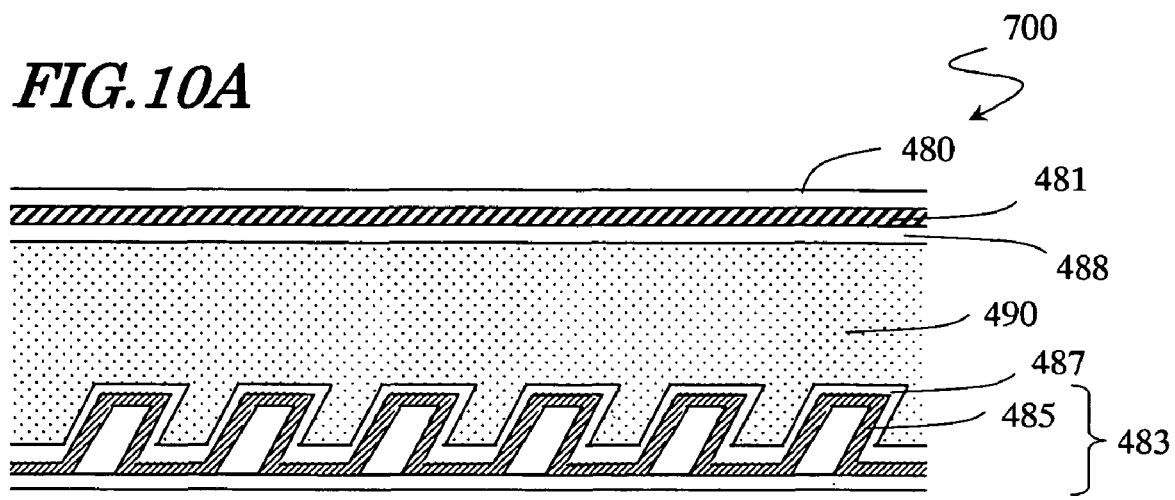
FIGS. 10A and 10B are schematic cross-sectional views illustrating exemplary structures of a liquid crystal display device of the present invention.
Figure 10B:
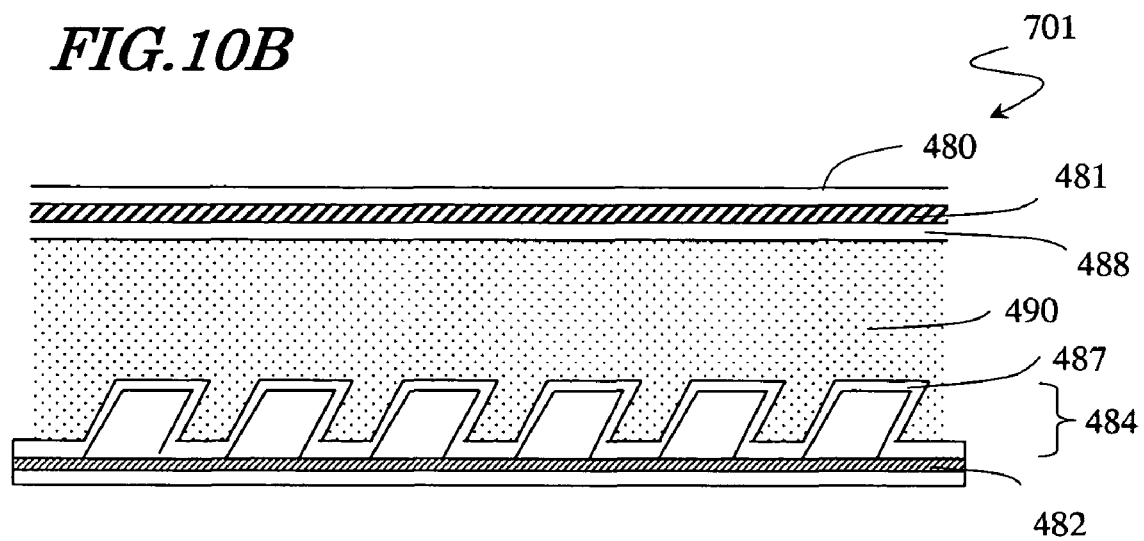

By using the aforementioned alignment controlling element 20 or 40, a liquid crystal display device having a structure as shown in FIG. 10A or 10B can be obtained, for example.

In a display device 700 shown in FIG. 10A, an alignment controlling element 483, which has a conductive film 485 and a vertical alignment film 487 formed in this order on its surface, opposes a substrate 480 which has an electrode 481 and a vertical alignment film 488 formed on its surface. A liquid crystal layer 490 is interposed between the alignment controlling element 483 and the substrate 480. The vertical alignment film 487 is formed so as to be in contact with the liquid crystal layer 490. The liquid crystal layer 490 is a vertical alignment type liquid crystal layer. The alignment controlling element 483 has an undulated surface as described with reference to FIGS. 8A to 8D, the ruggednesses acting to cause alignment of the liquid crystal molecules in the liquid crystal layer 490.

In a state where no voltage is applied across the liquid crystal layer 490 (OFF state), the liquid crystal molecules (central molecules) contained in the liquid crystal layer 490 are influenced by the surface configuration of the alignment controlling element 483, so as to be tilted from the normal direction of the substrate. When a voltage is applied across the liquid crystal layer 490 by means of the conductive film 485 and the electrode 481, the liquid crystal molecules further incline in the direction in which they were tilted in the OFF state.

Instead of the substrate 480, another alignment controlling element may be employed so as to oppose the alignment controlling element 483, such that the liquid crystal layer 490 is interposed between the two alignment controlling elements.

A display device 701 shown in FIG. 10B has a similar structure to that of the display device 700 shown in FIG. 10A. However, in the display device 701, a conductive film 482 is formed between a substrate and an alignment controlling element 484.

The unit features of the alignment controlling element 483, irrespective of their shape, may be formed of an organic substance such as acrylic resin or rubber, e.g., photoresist, UV-curable resin, thermosetting resin, or epoxy resin, or an inorganic substance such as a metal (e.g., Al, Ta, or Cu), a semiconductor (e.g., Si or ITO), or an insulative material (e.g., $SiO_2$ or SiN). It is preferable that the unit features are formed of a material having such characteristics as to cause liquid crystal to be vertically aligned (e.g., fluoroplastic) because then it is no longer necessary to apply the vertical alignment film 488 to the surface of the alignment controlling element 483, whereby the production process can be simplified.

With the display devices 700 and 701, the orientations of the central molecules in the liquid crystal layer 490 can be substantially uniformly controlled due to the ruggednesses provided on the surface of the alignment controlling element 483, so that high contrast display can be obtained. By controlling the shape and/or arrangement of the unit features in the alignment controlling element 483 or 484, any arbitrary liquid crystal alignment (i.e., tilting direction and tilting angle of the liquid crystal molecule from the substrate normal) can be set. Furthermore, as compared with display devices which are equipped with conventional alignment controlling means such as ribs or slits, an improved retardation and aperture ratio can be obtained.

Preferably, the display devices 700 and 701 are MVA mode liquid crystal display devices. In the case where the present invention is applied to an MVA mode liquid crystal display device, alignment division can be freely and easily realized by controlling the ruggednesses of the alignment controlling element 483 with respect to specific locations (coordinates) on the substrate the ruggednesses formed thereon. That is, the ruggednesses are changed to define domains of the MVA mode liquid crystal display devices. Since no such complicated alignment controlling means (e.g., ribs or slits) as in the conventional cases need to be formed, the production process can be simplified.

Furthermore, the display devices 700 and 701 also have an advantage in that better response characteristics can be realized than by display devices which utilize ribs or slits. This advantage will be described below.

Alignment controlling means such as ribs or slits, which are employed in conventional MVA mode liquid crystal display devices, are only locally (in a one dimensional array) deployed in the liquid crystal layer, with respect to each pixel. Therefore, within each pixel which actually has a two-dimensional expanse, the liquid crystal molecules near the alignment controlling means may respond relatively rapidly, whereas any liquid crystal molecules in positions unlikely to receive the influence of the alignment controlling means may become slow in response. Such response characteristics distribution may lead to poorer display characteristics.

In the case of a rib technique, liquid crystal molecules present in the neighborhood of the ribs will have a predetermined pretilt (pretilt direction and pretilt angle) due to the influence of the rib shapes. On the other hand, any liquid crystal molecule located in the middle of adjoining ribs is unlikely to be influenced by the rib shapes, so that the pretilt angle of such liquid crystal molecules becomes smaller than that of the liquid crystal molecules in the neighborhood of the ribs. When a voltage is applied across such a liquid crystal layer, the liquid crystal molecules will incline in the pretilt direction only one after another, those with greater pretilt angles first, thus reducing the response speed of the liquid crystal layer.

Similarly, in an fringe field technique, the liquid crystal molecules present in the neighborhood of the slits will receive greater influence of fringe field s than do the liquid crystal molecules which are present in the middle of slits. As a result, when a voltage is applied, the liquid crystal molecules will respond only one after another, those closer to the slits first, thus resulting in a prolonged response time of the liquid crystal layer.

On the other hand, in accordance with the above-described display devices 700 and 701, a planer (two-dimensional) alignment controlling means of the liquid crystal layer 490 can be formed uniformly over substantially the entire pixel region, so that the liquid crystal molecules will respond quickly, irrespective of the specific position in the liquid crystal layer 490. As a result, the response speed of the liquid crystal layer 490 can be greatly improved from the conventional level.

It should be noted that undulation-based liquid crystal alignment control is performed also in a ZBD (Zenithal Bistable Device) which operates in a bistable liquid crystal mode. Alignment control in ZBDs is described in Japanese National Stage Publication Nos. 2002-500383 and 2003-515788, for example. In a ZBD, there exits more than two liquid crystal orientation states (pretilts) to be determined by an undulated alignment film, these orientation states being switched from one another by the application of voltages of different polarities. Each orientation state is retained intact in the absence of an applied voltage. On the other hand, according to the present invention, the orientation state (pretilt angle, pretilt direction) as determined by the ruggednesses of the alignment controlling element does not change in response to the application of voltages of different polarities (e.g., within a range from −5V to +5V); in other words, bistability is not exhibited. Note that a bistable liquid crystal mode liquid crystal display device is generally plagued by transmittance hysteresis which occurs in response to voltage application, whereas the liquid crystal display device of the present invention is free of such transmittance hysteresis, so that excellent gray scale display can be realized.

Embodiment 1

Hereinafter, the structure of a liquid crystal display device according to Embodiment 1 of the present invention will be described with reference to the accompanying drawings.

Figure 11A:
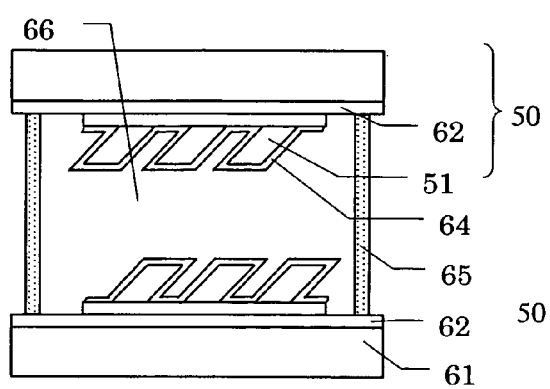
FIGS. 11A and 11B are schematic cross-sectional views illustrating exemplary structures of the liquid crystal display device of Embodiment 1.
Figure 11B:
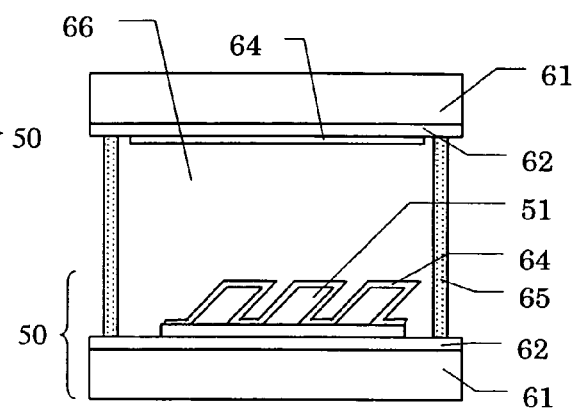

FIGS. 11A and 11B are schematic cross-sectional views illustrating exemplary structures of the liquid crystal display device of the present embodiment. The liquid crystal display device shown in FIG. 11A includes a pair of alignment controlling elements 50 attached together via spacers (thickness: 5 μm) 65, and a liquid crystal layer 66 interposed therebetween. The alignment controlling element 50 includes a glass substrate 61 and an electrode 62 formed on the glass substrate 61, with an alignment controlling structure being formed on the electrode 62. The alignment controlling structure includes an arrangement of a plurality of unit features 51. The unit features 51 are formed of, for example, a resin material. Each unit feature 51 has an asymmetric quadrangular cross section. In the alignment controlling structure, grooves (not shown) are formed in a direction perpendicular to the direction in which the unit features 51 are arranged. A vertical alignment film 64 is formed on the surface of the unit features 51. The vertical alignment film 64 is in contact with the liquid crystal layer 66.

The liquid crystal display device shown in FIG. 11B includes an alignment controlling element 50, a counter substrate 61', and a liquid crystal layer 66 interposed therebetween. The alignment controlling element 50 has a similar structure to that of the alignment controlling element 50 of the sample device shown in FIG. 11A. The counter substrate 61' includes an electrode 62 and a vertical alignment film 64 formed on the surface of the electrode 62. The surface of the vertical alignment film 64 provided on the counter substrate 61' is flat.

In the liquid crystal display device of either structure, it is possible to impart a pretilt to the liquid crystal molecules in the liquid crystal layer 66 by controlling the shape and/or arrangement of the unit features 51. Note, however, that the pretilt angle of the central molecules (i.e., the liquid crystal molecules located at a middle level along the thickness direction of the liquid crystal layer 66) in the liquid crystal display device shown in FIG. 11B will be about ½ of the pretilt angle of the central molecules in the liquid crystal display device shown in FIG. 11A.

Although the alignment controlling element 50 used in the liquid crystal display device of the present embodiment includes unit features 51 having a quadrangular cross section, the cross-sectional shape of the unit features 51 may be a triangle or any other shape, as long as it is asymmetric.

Figure 12A:
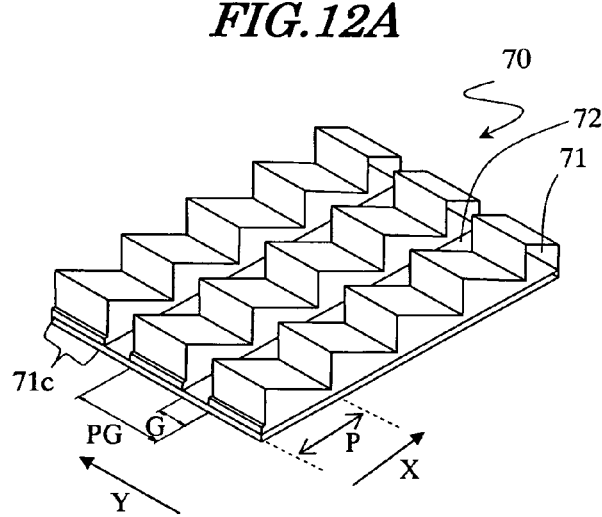
FIGS. 12A and 12B are perspective views illustrating exemplary structures of an alignment controlling element according to Embodiment 1 of the present invention.

FIG. 12A is a perspective view illustrating another exemplary structure of the alignment controlling element of the present embodiment. The alignment controlling element 70 shown in FIG. 12A includes a plurality of rows 71c of unit features. Each row 71c of unit features includes a plurality of unit features 71 which are arranged along the X direction with a pitch P. Each unit feature 71 has a substantially triangular cross section. The rows 71c of unit features are arranged along the Y direction at predetermined intervals (grooves 72), with a pitch PG. The grooves 72 extend along the X direction. Herein, the length of each groove 72 along the Y direction is defined as a width G.

When a liquid crystal display device is constructed using the alignment controlling element 70, as has been described with reference to FIG. 8A, the liquid crystal molecules will try to align along the grooves 72 under a high applied voltage, whereby the liquid crystal molecules are prevented from rotating in an azimuth angle direction. Preferably, the grooves 72 have a cross-sectional shape which is symmetric along the Y direction (e.g., a rectangle). Thus, the rotation of liquid crystal molecules under a high applied voltage can be prevented without affecting the pretilt, which is determined by the cross-sectional shape of each unit feature 71, which is asymmetric along the X direction.

The alignment controlling element 70 of the present embodiment is not limited to the structure shown in FIG. 12A, but any structure may be adopted as long as not only the cross-sectional shape of each unit feature but also the shape of each unit feature along the depth direction are controlled so that the liquid crystal molecules are prevented from rotating in an azimuth angle direction under a high applied voltage. For example, a structure as shown in FIG. 12B may be adopted, in which rows 73c of unit features and rows 73c' of unit features alternate along the Y direction, where each row 73c' of unit features is identical to each row 73c of unit features being translated along the X direction by ½ of the pitch P along the X direction.

Figure 12B:
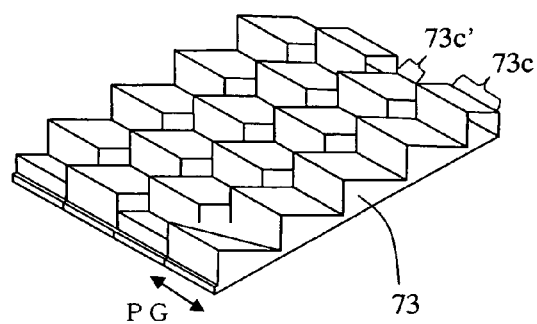

In the structure shown in FIG. 12A or 12B, the height of the surface of the alignment controlling element 70 changes along the X direction with the pitch P, and changes along the Y direction with the pitch PG. The height change along the X direction differs from the height change along the Y direction. The pitch P along the X direction and the pitch PG along the Y direction can each be arbitrarily selected, and the pitches P and PG may or may not be equal. The aforementioned effect of preventing the rotation of liquid crystal molecules under a high applied voltage can be obtained even if the pitch PG along the Y direction is not so small as the pitch P along the X direction. For example, if an alignment controlling element 70 is produced under the conditions that P=1 μm, PG=5 μm, and G=1 μm, and used to impart an alignment to a liquid crystal layer, no problematic changes in an azimuthal direction is observed when a high voltage is applied across the liquid crystal layer. Note that changes in an azimuthal direction can be most effectively suppressed if the width G of the grooves 72 are no less than 0.5 μm and no more than 10 μm, for example.

The pretilt direction and pretilt angle which are imparted to a liquid crystal layer are basically determined based on the cross-sectional shape of each unit feature 71 or 73 along the X direction. Therefore, even if the shape along the depth direction of the unit features 71 or 73 is only changed while conserving their cross-sectional shape, no substantial change in the pretilt will occur. In a below-discussed section entitled <Discussion of various parameters for alignment controlling structure>, various parameters defining the cross-sectional shape of the unit features are studied. Note that the results of the study will basically be unaffected by the pitch or shape of the grooves 72, or the presence or absence of the grooves 72. However, in the case where an alignment controlling element having the structure as shown in FIG. 11B is used, the actual pretilt angle which is imparted to the liquid crystal layer tends to be smaller than the pretilt angle as determined by the cross-sectional shape of the unit features 71 or 72. In this case, it would therefore be necessary to adjust the cross-sectional shape of the unit features 71 or 73 to obtain a desired pretilt angle.

Any alignment controlling element of the present embodiment can be produced by using an electron beam lithography apparatus, for example. Hereinafter, a method for producing the alignment controlling element 70 will be described as one example.

First, a photoresist layer (thickness: e.g., 1 μm) is formed on the surface of a substrate by spin-coating. Herein, a glass substrate having a conductive film formed on its surface is used as the substrate, with THMR-IP3300 being used as a photoresist.

Next, the photoresist layer is processed into a fine pattern. Herein, unit features 71 arranged as shown in FIG. 12A are to be formed. More specifically, by using an electron beam lithography apparatus, an exposure and then a development for the photoresist layer are performed. The slanted faces (side walls) of the unit features 71 can be formed by varying the beam intensity of the exposure apparatus at the time of exposure.

After the patterning of the photoresist layer, a vertical alignment film is applied to the exposed surface of the substrate. Thus, the alignment controlling element 70 is obtained.

The method for producing the alignment controlling element of the present embodiment is not limited to the above. For example, a hologram technique or a double beam interference exposure technique may be used. In the case where interference exposure is used, after stripes of ruggednesses are formed by interference exposure, grooves 72 may be formed in a direction perpendicular to the stripes, with the pitch PG. The grooves 72 can be formed by etching or laser ablation.

The liquid crystal display device of the present embodiment can be produced by using the alignment controlling element 70 which has been produced by the above-described method, for example. Specifically, in the case of producing a liquid crystal display device having the structure as shown in FIG. 11A, two alignment controlling elements 70 are formed, and attached together via spacers having a thickness of 5 μm. Thereafter, a liquid crystal material having a negative Δε is injected between the alignment controlling elements 70. As the liquid crystal material, MLC6609 (from MERCK&CO., Inc.) is used. In the case of producing a liquid crystal display device having the structure as shown in FIG. 11B, a similar method may be employed except that a counter substrate 61' having an electrode 62 and a vertical alignment film 64 formed thereon is used instead of one of the alignment controlling elements 50.

In the present embodiment, alignment control for the liquid crystal layer is realized by the ruggednesses on the surface of the alignment controlling element. At this time, in order to substantially uniformly control the orientation of the central molecules in the liquid crystal layer, it is necessary to cause disclinations in a region (space) near the surface of the alignment controlling element, as shown in FIG. 7B.

The inventors have specifically investigated into the possible surface configurations (alignment controlling structures) of the alignment controlling element for causing disclinations. The results are discussed below.

<Discussion of Various Parameters for Alignment Controlling Structure>

First, various parameters which define an alignment controlling structure will be described.

Figure 13A:
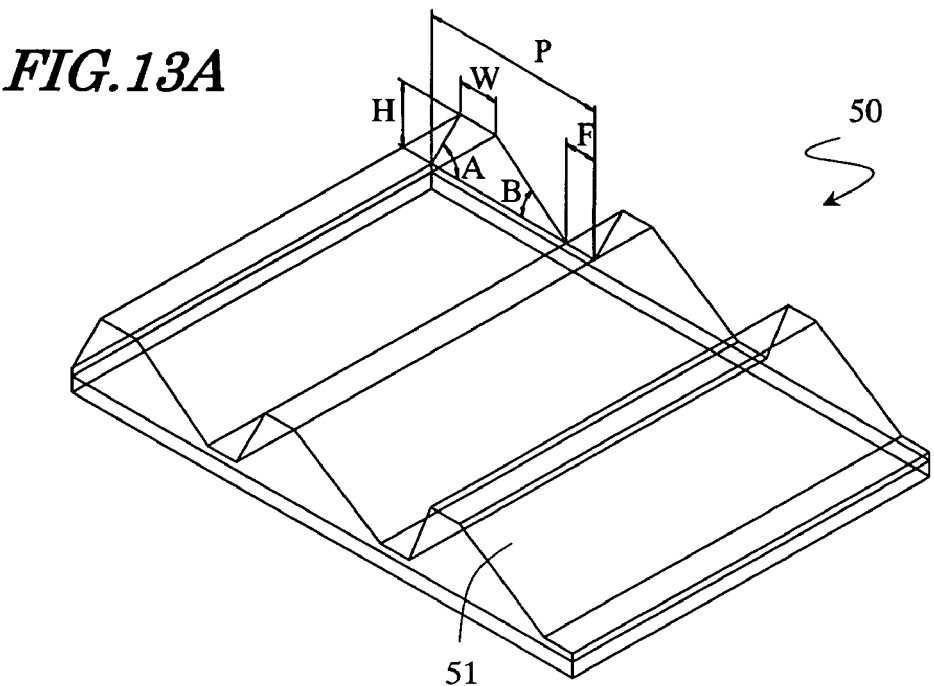
FIGS. 13A to 13C are diagrams for explaining parameters of an alignment controlling structure according to Embodiment 1 of the present invention.
Figure 13B:
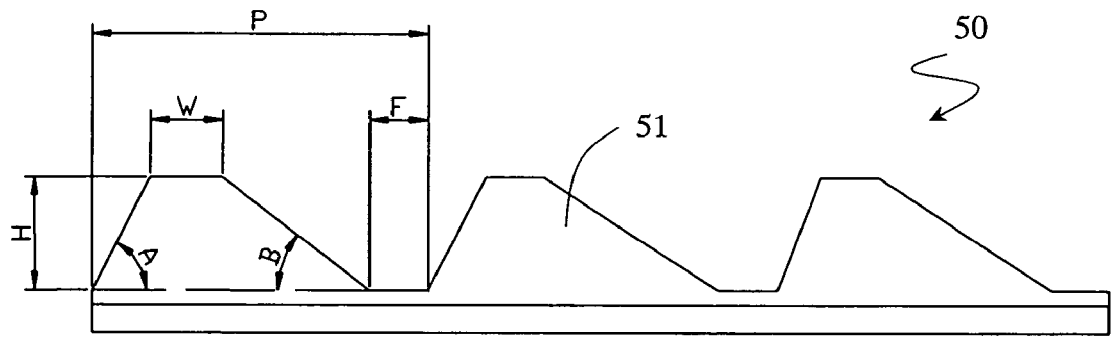

FIGS. 13A and 13B are a perspective view and a cross-sectional view, respectively, of the alignment controlling element 50. On the surface of the alignment controlling element 50, a plurality of unit features 51 are arranged. The cross-sectional shape of each unit feature 51 is substantially trapezoidal. In the cross-sectional view of FIG. 13B, the pitch of the unit features 51 is denoted as "P"; the height of each unit feature 51 is denoted as "H"; the width of the upper face of each unit feature 51 is denoted as "W"; the angles (base angles) between the substrate surface and the respective side walls of each unit feature 51 are denoted as "A" and "B"; and the width of a gap between adjoining unit features 51 is denoted as "F". The pitch P of the unit features 51 is no less than 1 μm and no more than 10 μm, as described before. The values of these parameters P, H, W, A, B, and F should be appropriately chosen in accordance with the specific pretilt to be imparted to the liquid crystal layer.

Figure 13C:
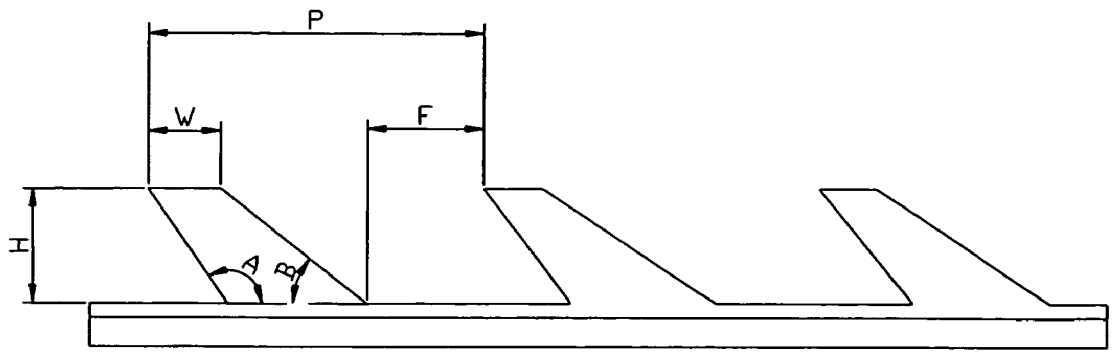

The angle A between one of the side walls of the cross-sectional shape of each unit feature and the substrate surface may be 90° or more; in this case, the above parameters are as defined in FIG. 13C. The cross-sectional shape of each unit feature may alternatively be a triangle; in this case, the width W of the upper face is zero.

Figure 14A:
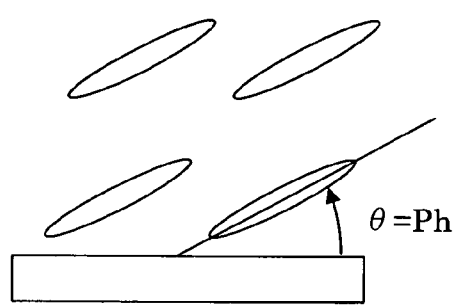
FIGS. 14A and 14B are diagrams for explaining definitions of a tilt angle and a pretilt in the present invention.
Figure 14B:
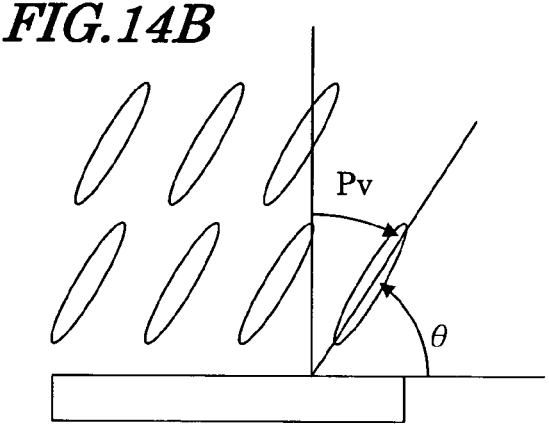

In the present specification, a "pretilt direction" is defined as the tilting direction of the liquid crystal molecules (liquid crystal directors) in the absence of an applied voltage to the liquid crystal layer, as projected onto the plane of the substrate surface. As shown in FIGS. 14A and 14B, the angle between the tilting direction of the liquid crystal molecules and the substrate surface is defined as a "tilt angle θ". Furthermore, as shown in FIG. 14A, in the case of a horizontal alignment type liquid crystal layer, the angle between the tilting direction of the liquid crystal molecules and the substrate surface is defined as a "pretilt angle Ph". On the other hand, as shown in FIG. 14B, in the case of a vertical alignment type liquid crystal layer, the angle between the tilting direction of the longer axis of the liquid crystal molecules and the substrate normal is defined as a "pretilt angle Pv". Therefore, the pretilt angle Ph is equal to the tilt angle θ (Ph=θ), whereas the pretilt angle Pv is equal to (90−θ).

In order to investigate into the above parameters for the alignment controlling structure, the inventors produced a sample device having the structure as shown in FIG. 11A. The method of production will be described below.

First, alignment controlling elements 50 to be used for the sample device are produced.

On the surface of a transparent substrate, a photoresist layer (thickness: 1 μm) is formed by spin-coating, for example. In the present embodiment, THMR-IP3300 is used as a photoresist. In the present embodiment, a glass substrate 61 having an electrically conductive layer (ITO) 62 formed on its surface is used as a transparent substrate.

Figure 15A:
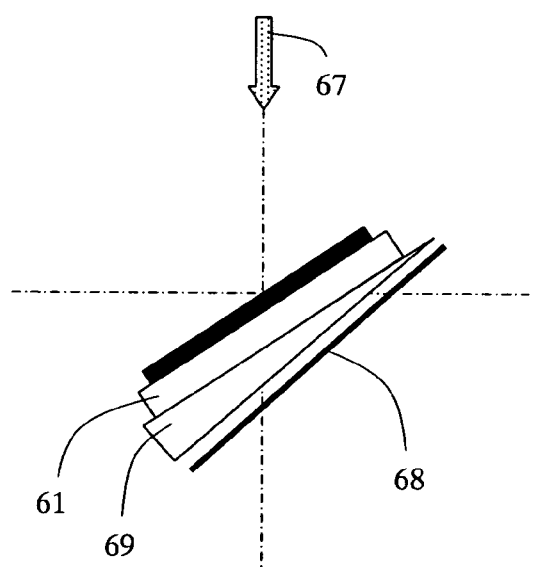
FIGS. 15A and 15B are diagrams for explaining a patterning method which utilizes double beam interference exposure.
Figure 15B:
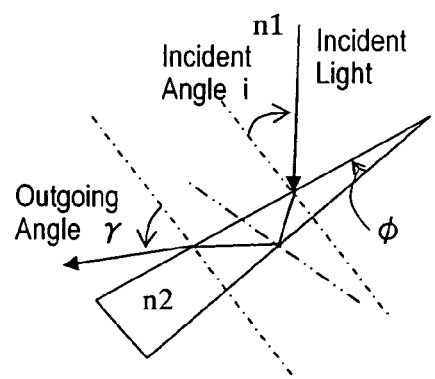

Next, the photoresist layer is patterned by using double beam interference exposure. Specifically, as shown in FIG. 15A, in an interference exposure apparatus, the substrate 61 is placed on a prism (prism angle: φ) 69, which is provided on an Al mirror 68. The substrate 61 is exposed to Kr laser light 67 having a wavelength of 407 nm. As shown in FIG. 15B, light which is incident to the substrate at an incident angle i is led through the substrate so as to be refracted within the prism, then reflected from the Al mirror, and thereafter goes out again from the substrate surface at an outgoing angle of γ. As a result, the photoresist layer can be subjected to a desired intensity distribution. After the exposure, a development is performed, whereby unit features 51 having a height of 1 μm or less and having an asymmetric quadrangular cross section are formed on the surface of the substrate 61. This patterning method is advantageous in that the pitch and the angles of the slanted faces, etc., of the unit features 51 can be freely set based on the incident angle i, prism angle φ, the refractive index of the prism, and the like.

Thereafter, a vertical alignment film 64 is applied onto the surface of the substrate 61 on which the unit features 51 have been formed. Thus, an alignment controlling element 50 is obtained.

Two alignment controlling elements 50 are formed by using the above-described method, and the resultant alignment controlling elements 50 are attached together via spacers 65. Then, a liquid crystal material is injected between the alignment controlling elements 50. As the liquid crystal material, liquid crystal MLC6609 (MERCK&CO., Inc.) having a negative $\Delta\epsilon$ is used. Thus, a sample device having the structure as shown in FIG. 11A is produced.

(A) Discussion of the Pitch P of Unit Features

First, the relationship between the pitch P of the unit features and liquid crystal alignment will be discussed. Herein, it is assumed that the height H of each unit feature 51 is 0.5 μm; the angle B between one of the side walls and the substrate surface is 75°; the width W of the upper face is 0; and the width F of the gap between adjoining unit features 51 is 0. Six sample devices (Nos. 1 to 6), the pitch P of whose unit features 51 is varied as shown in Table 1, are employed. The angle A between the other side wall and the substrate surface varies in accordance with the pitch P.

The tilt angle θ of sample device Nos. 1 to 6 in an initial alignment (i.e. alignment in the absence of an applied voltage) was measured, the results being shown in Table 1.

TABLE 1

|  | sample device No. | | | | | |
| --- | --- | --- | --- | --- | --- | --- |
|  | 1 | 2 | 3 | 4 | 5 | 6 |
| pitch P(μm) | 20 | 10 | 5 | 1 | 0.8 | 0.5 |
| tilt angle θ(°) | 90 | 89.7 | 89 | 88 | 85 | 80 |
| pretilt angle Pv(°) | 0 | 0.3 | 1 | 2 | 5 | 10 |

As is clear from Table 1, a pretilt can be imparted to the liquid crystal layer when the pitch P of the unit feature 51 is about 10 μm or less. However, in order to obtain a sufficient pretilt, the pitch P must be reduced (e.g., 1 μm or less). The presumable reason is as follows.

If the pitch P of the unit features 51 is large, as shown by the simulation result of FIG. 7A, the liquid crystal alignment which originates at the surface of the alignment controlling element 50 will be averaged out at a middle level along the thickness direction of the liquid crystal layer, so that these liquid crystal molecules are hardly tilted from the substrate normal direction. On the other hand, if the pitch P is reduced, as shown by the simulation result of FIG. 7B, a portion in which liquid crystal alignment is confined (disclinations) is created between adjoining unit features 51, thus suppressing the averaging out of liquid crystal alignment. As a result, even at a middle level along the thickness direction of the liquid crystal layer, the liquid crystal molecules will still be oriented so as to be tilted from the substrate normal direction.

(B) Discussion of the Height H of each Unit Feature

Next, the relationship between the height H of the unit features and liquid crystal alignment will be discussed. Herein, it is assumed that the pitch P of each unit feature 51 is 1 μm; the angle B between one of the side walls of the unit feature 51 and the substrate surface is 75°; the width W of the upper face is 0; and the width F of the gap between adjoining unit features 51 is 0. Six sample devices (Nos. 7 to 12), the height H of whose unit features 51 is varied as shown in Table 2, are employed. The angle A between the other side wall of each unit feature 51 and the substrate surface varies in accordance with the height H. Since W=0, each unit feature 51 has a triangular cross-sectional shape.

The alignment uniformity of the liquid crystal layer when applying a low voltage (2 to 3V) to the liquid crystal layers of sample device Nos. 7 to 12 was evaluated by visual inspection. The results are shown in Table 2. In Table 2, alignment uniformity is denoted to be either "good" (◯), "slightly random" (Δ), or "random" (X).

TABLE 2

|  | sample device No. | | | | | |
| --- | --- | --- | --- | --- | --- | --- |
|  | 7 | 8 | 9 | 10 | 11 | 12 |
| height H(μm) | 0.1 | 0.2 | 0.5 | 0.8 | 1 | 1.5 |
| alignment uniformity | X | Δ | Δ | ◯ | ◯ | ◯ |

As can be seen from Table 2, if the unit features have a sufficiently large height H, liquid crystal alignment can be confined within each region surrounded by undulation features, so that a substantially uniform pretilt can be imparted to the central molecules in the overall liquid crystal layer. Therefore, the central molecules can be tilted in a desired direction upon the application of a voltage.

By examining the alignment upon the application of a voltage while varying the pitch P and the height H of the unit features 51, it can be confirmed that basically good alignment is obtained when H/P is equal to or greater than 0.1, and that even more uniform alignment control can be attained when H/P is equal to or greater than 0.5.

(C) Discussion of the Width W of the Upper Face of each unit feature

The relationship between the width W of the upper face of each unit feature and liquid crystal alignment will be discussed. Herein, it is assumed that the pitch P of the unit features 51 is 1 µm; the height H of each unit feature 51 is 0.5 µm; the angle B between one of the side walls and the substrate surface is 75°; the width F of the gap between adjoining unit features 51 is 0. Four sample devices (Nos. 13 to 16), the width W of the upper face (apex portion) of whose unit features 51 is varied as shown in Table 3, are employed. The angle A between the other side wall and the substrate surface varies in accordance with the width W.

Note that the width W of the upper face is varied by controlling the thickness of the photoresist layer to be patterned through interference exposure, as well as exposure time and development time.

The tilt angle θ of sample device Nos. 13 to 16 in an initial alignment was measured. The results are shown in Table 3.

TABLE 3

| | sample device No. | | | |
|---|---|---|---|---|
| | 13 | 14 | 15 | 16 |
| upper face width W(µm) | 0.8 | 0.5 | 0.2 | 0 |
| tilt angle (°) | 90 | 89 | 88.5 | 88 |
| pretilt angle Pv(°) | 0 | 1 | 1.5 | 2 |

From Table 3, it can be seen that, as the width W of the upper face of each unit feature 51 is increased, the tilt angle becomes closer to 90°; that is, the pretilt angle Pv becomes closer to zero.

(D) Discussion of the Width F of the Gap Between Adjoining Unit Features

The relationship between the width F of the gap between adjoining unit features and liquid crystal alignment will be discussed. Herein, it is assumed that the height H of each unit feature 51 is 0.5 µm; the angle B between one of the side walls and the substrate surface is 75°; and the width W of the upper face is 0. Four sample devices (Nos. 17 to 20), in which the width F of the gap between adjoining unit features 51 is varied as shown in Table 4, are employed. The angle A between the other side wall and the substrate surface varies in accordance with the width F of the gap.

The tilt angle θ of sample device Nos. 17 to 20 in an initial alignment was measured. The results are shown in Table 4.

TABLE 4

| | sample device No. | | | |
|---|---|---|---|---|
| | 17 | 18 | 19 | 20 |
| unit feature gap width F(µm) | 2 | 1 | 0.5 | 0 |
| tilt angle (°) | 90 | 70 | 80 | 88 |
| pretilt angle Pv(°) | 0 | 20 | 10 | 2 |

It can be seen from Table 4 that, as the width F of the gap between adjoining unit features 51 is increased, disclinations are more likely to occur, and the pretilt angle Pv will increase. However, if the gap width F is too large (e.g., 2 µm or more), the pretilt angle Pv is reduced to 0°. This is presumably because, the pitch P of the unit features 51 increases as the gap width F excessively increases, thus causing averaging out of the liquid crystal alignment. In other words, a pretilt as shown by the simulation result of FIG. 7B can be generally obtained as the gap width F is increased; however, once the gap width F equals 2 µm or more, the liquid crystal alignment will become averaged out along the thickness direction of the liquid crystal layer as shown by the simulation result of FIG. 7A, so that a pretilt can no longer be obtained in the liquid crystal layer.

(E) Discussion of Side Wall Angle A of each Unit Feature

The relationship between the side wall angle A of each unit feature and liquid crystal alignment will be discussed. Herein, it is assumed that the height H of each unit feature 71 is 0.5 µm; the angle B between one of the side walls and the substrate surface is 60°; the width W of the upper face is 0; the width F of the gap between adjoining unit features 71 is 0. Five sample devices (Nos. 21 to 259), in which the angle A between the other side wall of each unit feature 71 and the substrate surface is varied as shown in Table 5, are employed. The pitch P of the unit features 71 varies in accordance with the angle A. Since W=0, each unit feature 71 has a triangular cross-sectional shape.

Note that, unlike the sample devices Nos. 1 to 20 employed in the discussions of (A) to (D) above, the alignment controlling structures of sample device Nos. 21 to 25 were formed by using an electron beam lithography apparatus.

The alignment uniformity of the liquid crystal layer when applying a low voltage (2 to 3V) to the liquid crystal layers of sample device Nos. 21 to 25 was evaluated by visual inspection. The results are shown in Table 5. In Table 5, alignment uniformity is denoted to be either "good" (◯), "slightly random" (Δ), or "random" (X), similarly to Table 2.

TABLE 5

| | sample device No. | | | | |
|---|---|---|---|---|---|
| | 21 | 22 | 23 | 24 | 25 |
| side wall angle A (°) | 5 | 15 | 30 | 45 | 90 |
| pitch P(µm) | 6.0 | 2.2 | 1.2 | 0.79 | 0.29 |
| alignment uniformity | X | X | X | Δ | ◯ |

It can be seen from the results of Table 5 that, when the angle B of one of the side walls is fixed at 60°, better alignment can be obtained as the other side wall angle A increases. The angle A is preferably equal to or greater than 45°.

As described above, by optimizing the shape and/or arrangement of the unit features 51, a desired pretilt can be obtained in the liquid crystal layer. By varying the shape (angle, area, etc., of the slanted faces), size, pitch, and the like of the unit features 51, an arbitrary pretilt (pretilt angle, pretilt direction) can be stably obtained. Since the pretilt direction is determined by the tilting angles of the side walls of each unit feature 51 and the like, it will be appreciated that alignment division, e.g., MVA mode, can be easily realized by varying the shape of the unit features 51 in accordance with specific locations on the substrate surface.

Embodiment 2

Hereinafter, a liquid crystal display device according to Embodiment 2 of the present invention will be described with reference to the accompanying drawings. The liquid crystal display device of the present embodiment has a similar structure to that of Embodiment 1 as described with reference to FIGS. 11A and 11B, except for the following difference.

The alignment controlling element employed in Embodiment 1 includes a plurality of unit features each having an asymmetric cross-sectional shape. Therefore, in Embodiment 1, disclinations are caused by confining liquid crystal alignment within certain regions or spaces, by utilizing ruggednesses consisting of unit features. On the other hand, the alignment controlling element of the present embodiment includes a plurality of columnar unit features each having side walls which are perpendicular to the substrate surface. By using such an alignment controlling element, as has been described above with reference to FIGS. 8C and 8D and FIGS. 9A and 9B, it is possible to cause disclinations by confining liquid crystal alignment within a planar region defined by the bottom surface in each gap (dent) between unit features.

The present embodiment is advantageous in that the surface configuration of the alignment controlling element can be easily formed by using an exposure apparatus having a usual resolution (1 μm or less), such as a stepper.

In the present embodiment, the pretilt (pretilt angle, pretilt direction) imparted to the liquid crystal layer depends on the shape of the unit features of the alignment controlling element. In order to cause a pretilt, it is preferable that the shape and arrangement of the unit features satisfy the following two conditions.

Firstly, it is necessary that each bottom face which is surrounded by the closest unit features does not have a symmetry axis of rotation in the substrate normal direction. Since the pretilt has directionality, if the bottom face has a symmetry axis of rotation in the substrate normal direction (as in the case of a circle or a regular triangle), the pretilt in the positive direction and the pretilt in the negative direction will be equivalent for any given pretilt angle. In other words, the pretilts in different pretilt directions cancel each other and average out, such that the liquid crystal molecules in the liquid crystal layer have a pretilt angle of 0° as a whole.

The shape of the upper face of each columnar unit feature may itself be a shape which does not have a symmetry axis of rotation in the substrate normal direction (e.g., an isosceles triangle or a trapezoid). In this case, there is an advantage in that bottom faces which satisfy the aforementioned conditions can be obtained by arraying the unit features in a relatively simple manner.

Secondly, it is necessary that the height (dent depth) H of each unit feature of the alignment controlling element is about 0.5 times or greater than the pitch P of the unit features, as in the case of the other embodiments. If the height H of the unit features is smaller than about 0.5 times the pitch P, liquid crystal alignment may average out as described with reference to FIG. 7A, thus making it difficult to obtain a pretilt.

A preferable alignment controlling element which satisfies the above two conditions may be, for example, a triangular prism-based alignment controlling element 40 as shown in FIGS. 8C and 8D. Alternatively, the alignment controlling element may have any of the structures exemplified in FIGS. 16A to 16D. In the structure shown in FIG. 16A, triangular-prism-like unit features 82 are arranged on the surface of a substrate 81 with interspaces between one another. In the structure shown in FIG. 16B, each unit feature is a quadrangular prism having a trapezoidal upper face. In the structure shown in FIG. 16C, triangular-prism-like unit features are arranged in a pattern different from those shown in FIG. 8C and FIG. 16A. In the structure shown in FIG. 16D, each unit feature is a pentagonal prism. In any of these structures, each unit feature does not need to be axisymmetric.

With any of the above structures, the pretilt angle and pretilt direction can be freely set by controlling the shape and/or arrangement of the unit features. The shape and/or arrangement of the unit features can be easily changed based on the mask shape used at the time of exposure, as described below. Therefore, there is an advantage in that the selection of the pretilt angle and pretilt direction is not restricted by the production process.

Hereinafter, a method for producing the alignment controlling element of the present embodiment will be described, with respect to the alignment controlling element 80 shown in FIG. 16A as an example.

First, a photoresist layer (thickness: e.g., 0.8 μm) is formed on the surface of the substrate 81 by spin-coating. Herein, a glass substrate having a conductive film formed on its surface may be used as the substrate 81. THMR-IP3300 is used as the photoresist, for example.

Figure 16A:
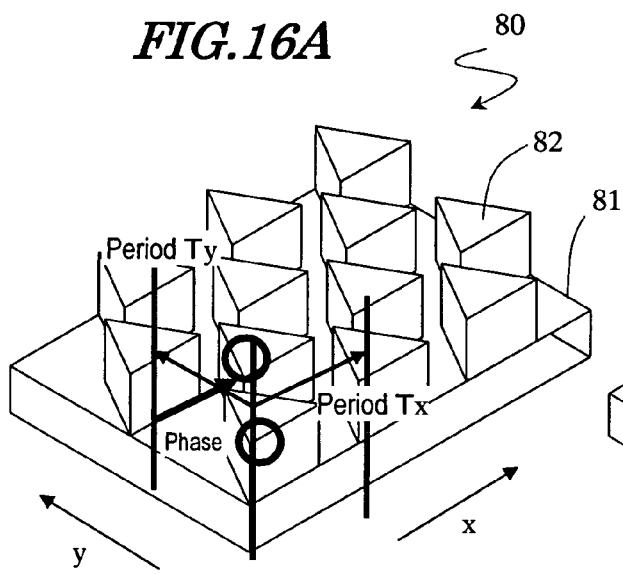
FIGS. 16A to 16D are perspective views each illustrating an exemplary structure of an alignment controlling element according to Embodiment 2 of the present invention.
Figure 16B:
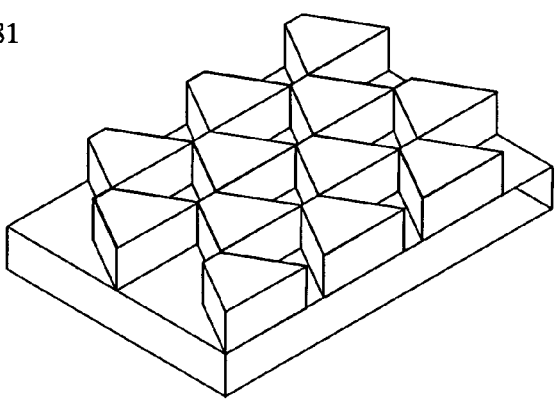

Next, the shape of the photoresist layer is processed by using an exposure apparatus which is usually employed for the production of liquid crystal display devices, thus forming triangular prism (unit features) 82 arranged as shown in FIG. 16A. More specifically, a mask is provided so as to cover regions of the photoresist layer surface to become upper faces of the unit features 82, and the photoresist layer is exposed through such a mask. Thereafter, development for the photoresist layer is performed.

Then, a vertical alignment film is applied onto the exposed surface of the substrate. Thus, the alignment controlling element 80 is completed.

By changing the shape of the mask to be used in the exposure step, any other alignment controlling element structure (e.g., the alignment controlling elements shown in FIGS. 16B to 16D) can be formed by a method similar to the above.

As described above, it is necessary that the surface configuration of the alignment controlling element of the present invention has two-dimensional anisotropy. Specifically, it is preferable that at least the periods along the X and Y directions (assuming that these directions are perpendicular to each other) are different, or phase changes occur along these directions. Hereinafter, anisotropy of the alignment controlling element according to the present invention will be described with reference to FIGS. 16A and 16C.

Figure 16C:
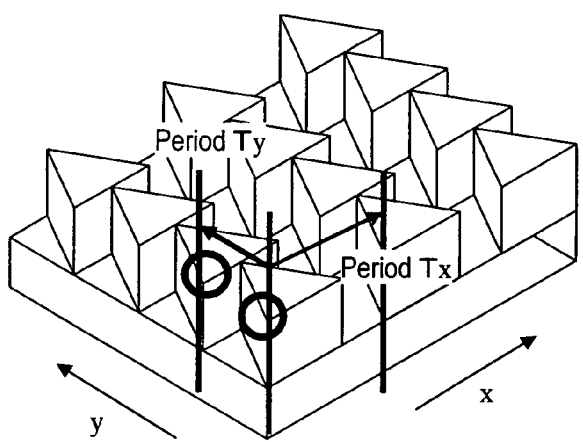
Figure 16D:
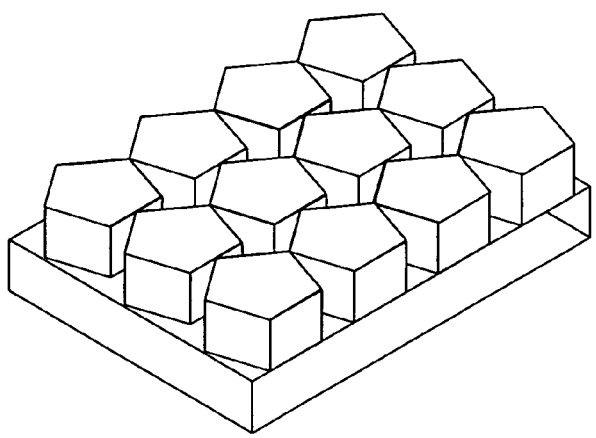

As shown in FIGS. 16A and 16C, a direction which is parallel to the substrate 81 and perpendicular to the pretilt direction occurring due to disclinations in the gaps (dents) between unit features is defined as the X direction, whereas a direction which is parallel to the substrate 81 and perpendicular to the X direction is defined as the Y direction.)

In the structure shown in FIG. 16A, if a cross section of the alignment controlling element 80 along the X direction is taken at various points on the Y direction, each cross-sectional shape will appear shifted along the X direction, with a pitch equal to ½ of a period Tx with which the unit features 82 are placed along the X direction. The cross-sectional shape along the Y direction will also appear shifted at various points on the X direction. In other words, the unit features 82 are arranged so that phase changes in the cross-sectional shape occur along the X and Y directions. In this case, the period Tx of the unit features 82 along the X direction and a period Ty of the unit features 82 along the Y direction may be equal or different. The same is also true of the structure shown in FIG. 16B.

On the other hand, in the structure shown in FIG. 16C, the phase of the cross-sectional shape along the X direction does not change at different points on the Y direction, and the phase of the cross-sectional shape along the Y direction does not change at different points on the X direction. In this case, it is preferable that the period Tx of the unit features 82 along the X direction is not equal to the period Ty of the unit features 82 along the Y direction. The same is also true of the structure shown in FIG. 16D.

Embodiment 3

Hereinafter, a liquid crystal display device according to Embodiment 3 of the present invention will be described. The liquid crystal display device of the present embodiment has a similar structure to that of Embodiment 1 as described with reference to FIGS. 11A and 11B, except that the device of the present embodiment is an MVA mode liquid crystal display device employing an alignment controlling element which is divided into regions.

As described earlier, in order to improve the viewing angle in VAN mode, it is preferable that different pretilt directions exist within each pixel (MVA mode). According to the present invention, a pretilt direction can be arbitrarily set based on the ruggednesses on a surface which is in contact with the liquid crystal layer, and therefore MVA mode is relatively easy to realize.

An exemplary structure of the alignment controlling element of the present embodiment will be described with reference to FIGS. 17 and 18.

Figure 17A:
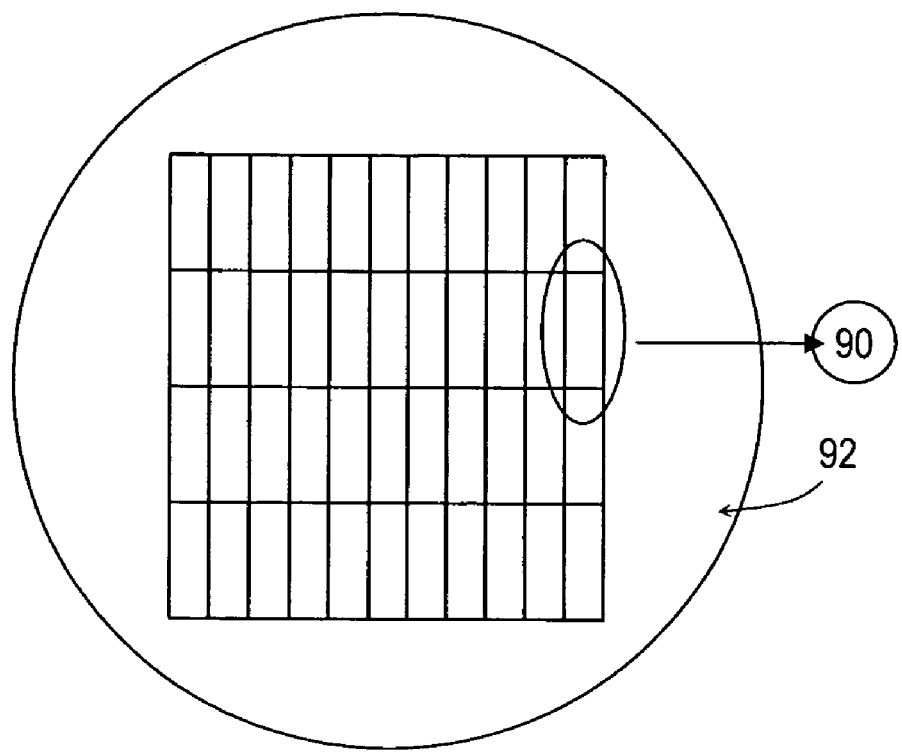
FIGS. 17A and 17B are diagrams for explaining unit regions and subregion in an alignment controlling element.

As shown in FIG. 17A, the alignment controlling element is formed on a substrate (e.g., a quartz substrate) which has an alignment control region 92 of 60 mm×60 mm, for example. In the alignment control region 92, unit regions 90 each sized 300 μm×100 μm are arranged to form an array of 200×600. The alignment control region 92 is provided correspondingly to a display region of the display device, whereas each unit region 90 is provided correspondingly to each pixel of the display device.

Figure 17B:
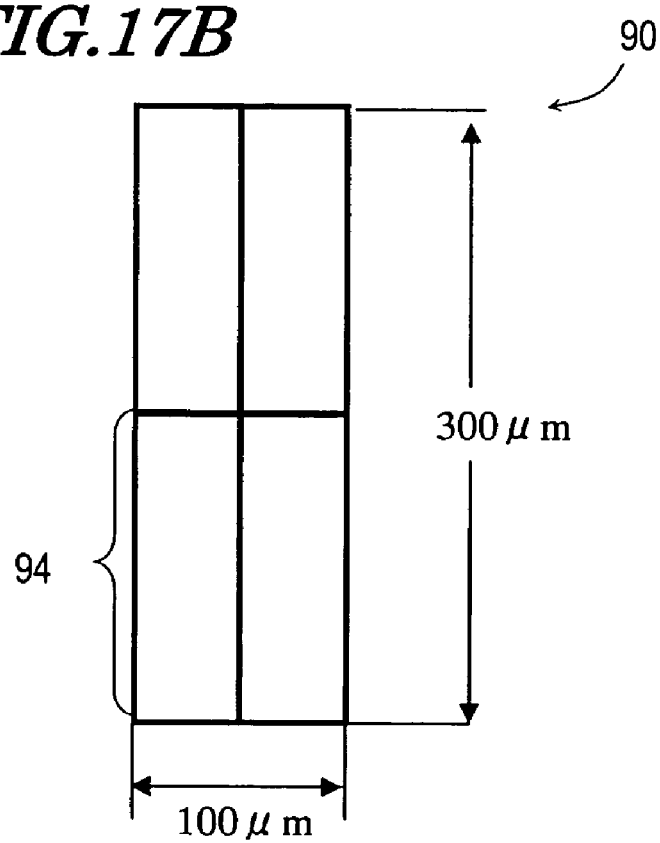

As shown in FIG. 17B, each unit region 90 is halved both longitudinally and laterally, thus resulting in four "sub" regions 94. Each subregion 94 may correspond to one of the subpixels which compose a pixel. In each subregion 94, a plurality of unit features are arranged. The unit features may have the shape of any of the unit features described in Embodiments 1 and 2. The unit features in the subregions 94 are arranged in such a manner that a pretilt in a different direction is imparted to each different subregion.

Figure 18A:
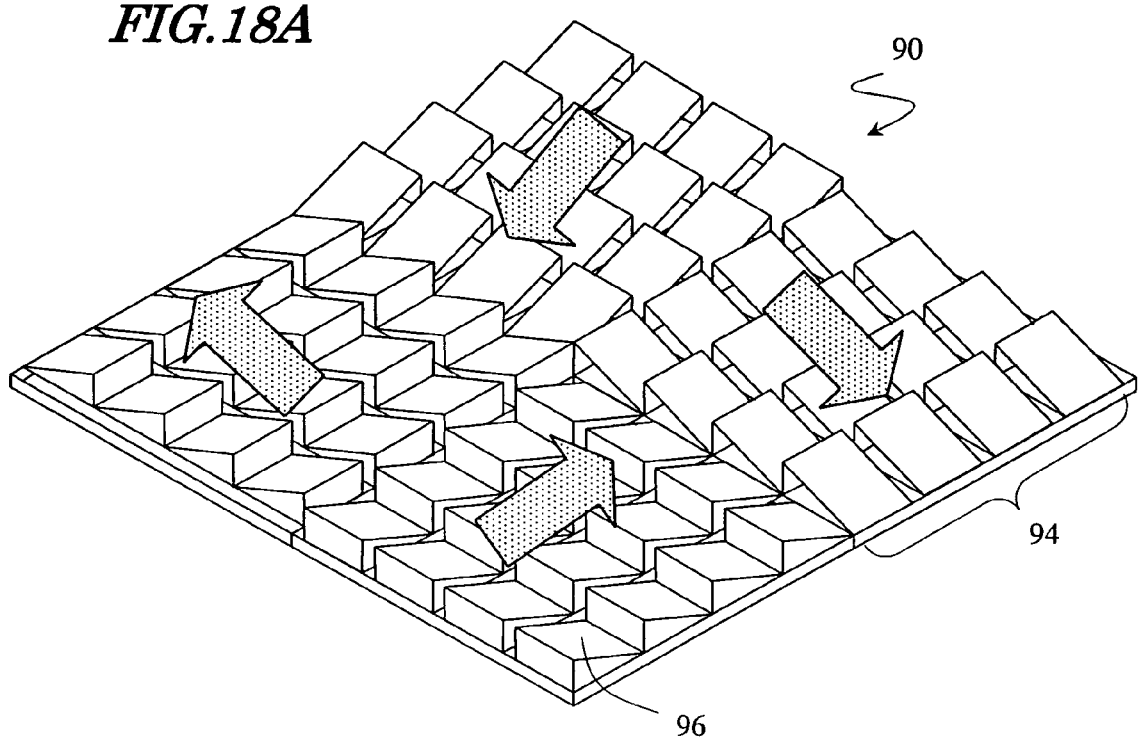
FIGS. 18A and 18B are perspective views showing subregion constructions according to Embodiment 3 of the present invention.
Figure 18B:
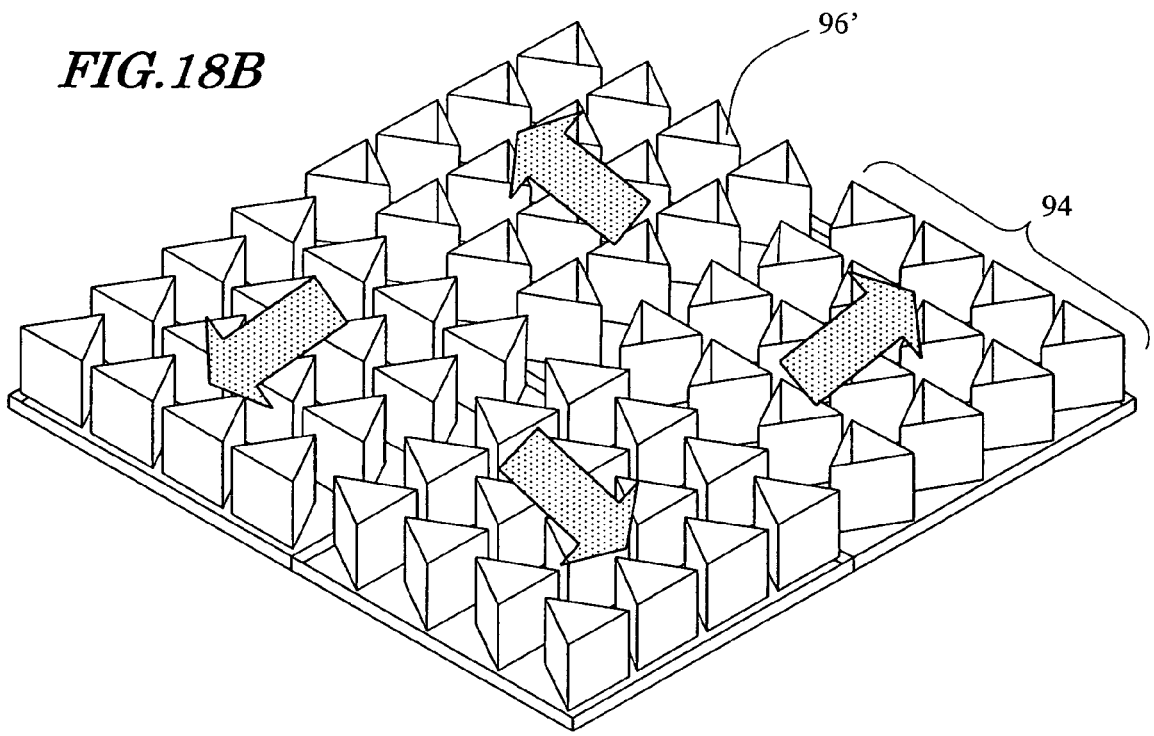

With reference to FIGS. 18A and 18B, the arrangement of unit features in each subregion 94 will be described more specifically.

Unit features 96 shown in FIG. 18A are similar to the unit features of Embodiment 1 as described with reference to FIG. 12, for example. Although each unit feature 96 is illustrated as having a substantially triangular cross section (W=0), it may alternatively have a quadrangular cross section. The unit features 96 in each subregion 94 are arranged so as to cause a pretilt in the direction of an arrow. In this example, the subregions 94 are designed so that the direction in which the unit features are arranged (the X direction in FIG. 12A) constitutes an angle of 90° with the said direction of every adjoining subregion 94. Thus, a pretilt in a different direction can be imparted to each different subregion.

Unit features 96' shown in FIG. 18B are similar to the unit features of Embodiment 2, for example. Although each unit feature 96' is exemplified as a triangular prism, it may alternatively be a pentagonal prism or any other shape. In this figure, too, the unit features 96' in each subregion 94 are arranged so as to cause a pretilt in the direction of an arrow.

By thus dividing each unit region 90 into four subregions 94, a quadruple alignment division can be realized. When constructing a display device by employing the alignment controlling element 90, another alignment controlling element which is divided into similar regions may be used as a substrate opposing the alignment controlling element 90, or a flat counter substrate having a vertical alignment film applied to its surface may be used. In the case where a flat counter substrate is employed, however, the pretilt angle ascribable to the alignment controlling element 90 is substantially halved; therefore, it would be necessary to design the ruggednesses of the alignment controlling element 90 so as to produce a correspondingly greater pretilt angle.

The alignment controlling element 90 can be produced by undulating a photoresist layer (thickness: about 1 μm or more) by means of a mask exposure apparatus (stepper). Alternatively, as in the preceding embodiments, the alignment controlling element 90 may be produced by arbitrarily undulating a photoresist layer (thickness: about 1 μm or less), which is formed on a substrate surface, with an interference exposure apparatus or an electron beam lithography apparatus, for example.

Figure 19A:
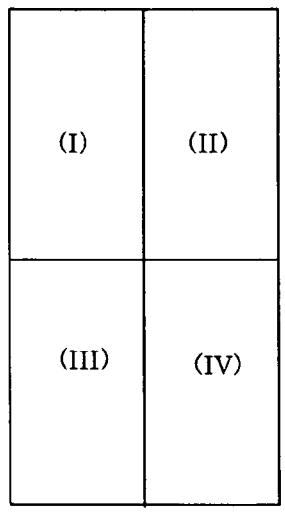
FIGS. 19A to 19C are diagrams each illustrating an exemplary method of splitting a unit region into subregions.
Figure 19B:
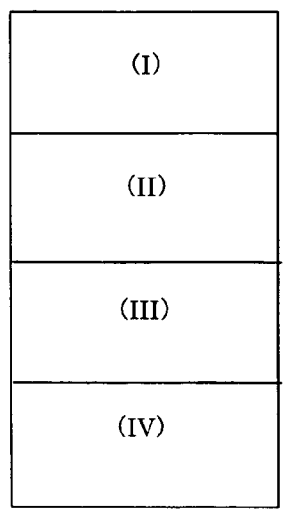
Figure 19C:
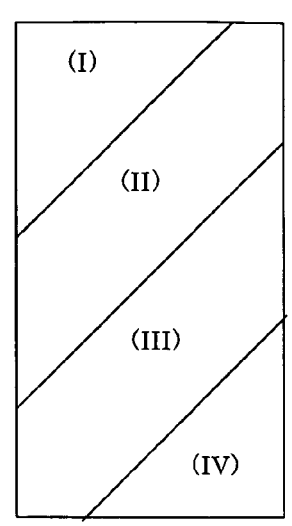

The alignment controlling element of the present embodiment is not limited to the structures shown in FIGS. 18A and 18B, as long as the pretilt direction caused by each unit feature of the ruggednesses is predetermined in accordance with a specific location of that unit feature on the substrate surface. Each unit region 90 may be divided into strip-like subregions. Other methods of dividing the unit region 90 are illustrated in FIGS. 19A, 19B, and 19C. Alternatively, without dividing each unit region 90 into subregions, alignment division may be realized by varying the direction in which the unit features 96 or 96' are arranged in accordance with specific locations on the unit region 90. For example, the unit features 96 or 96' may be arranged so that the pretilt direction within each unit region 90 is varied so as to constitute a so-called continuous pinwheel alignment. Moreover, the size of the unit region 90, the number and shape of subregions, etc., may be arbitrarily set. It is preferable that the size of the unit region 90 corresponds to the size of each pixel in the display device. The size and pitch of the unit features 96 or 96' may also be arbitrarily set.

Embodiment 4

Hereinafter, a method for producing an alignment controlling element according to Embodiment 4 of the present invention will be described with reference to the accompanying drawings. The present embodiment differs from Embodiments 1 to 3 in that an alignment controlling element has a surface formed through emboss.

In Embodiments 1 to 3, the alignment controlling element is formed by undulating a resin layer (photoresist layer). Under this method, the resin layer is required to have a high enough photosensitivity to support high resolution, thus imposing limitations on heat resistance and solvent endurance. Since the material of the resin layer cannot be freely selected, the electrical properties of the resin layer material, such as dielectric constant, electrical conductivity, and impurity concentration, are constrained. This leads to a problem in the production process in that, when applying a vertical alignment film to the resin layer surface whose shape has been processed, for example, the solvent and the firing temperature for the vertical alignment film must be selected so as not to damage the resin layer surface. Moreover, since ruggednesses to a height of about 1 μm are formed on the resin layer surface toward the interior of the liquid crystal layer, a voltage drop may be caused by the ruggednesses, or impurities may be eluted from the resin layer.

In the present embodiment, ruggednesses are formed on the alignment controlling element by emboss process. In the present specification, such a method of formation is referred to as a "replica technique".

Figure 20A:
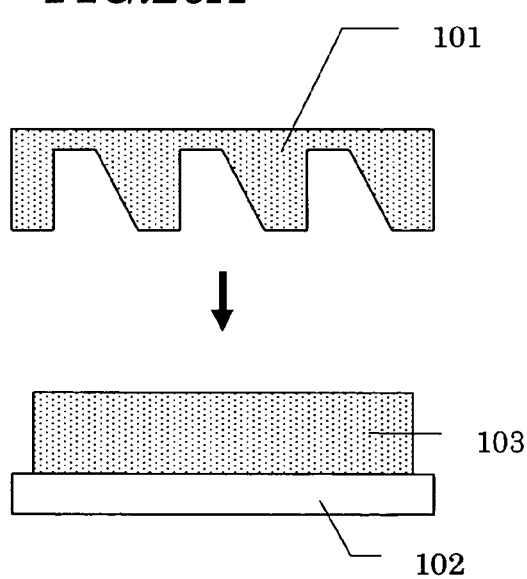
FIGS. 20A and 20B are diagrams illustrating the outline of a replica technique according to Embodiment 4 of the present invention.
Figure 20B:
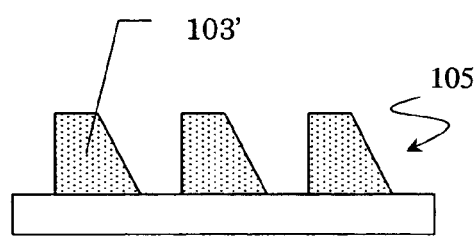

The outline of the replica technique will be described with reference to FIGS. 20A and 20B. First, as shown in FIG. 20A, a master 101 having ruggednesses formed on its surface is produced. On the other hand, a substrate 102 on whose surface a resin material 103 for replication has been applied or dropped is prepared. Next, the master 101 is pressed against the surface of the substrate 102 to emboss the surface configuration of the master 101 onto the resin material 103. Thus, as shown in FIG. 20B, an alignment controlling element 105 with a resin layer 103' having a shape that corresponds to the ruggednesses of the master 101 is obtained.

According to the replica technique, the resin layer does not need to have a high photosensitivity, so that the resin layer material can be selected with a greater freedom. As a result, a high-performance and highly reliable display device can be obtained.

Hereinafter, the method for producing an alignment controlling element according to the present embodiment will be more specifically described with reference to the drawings.

Figure 21A:
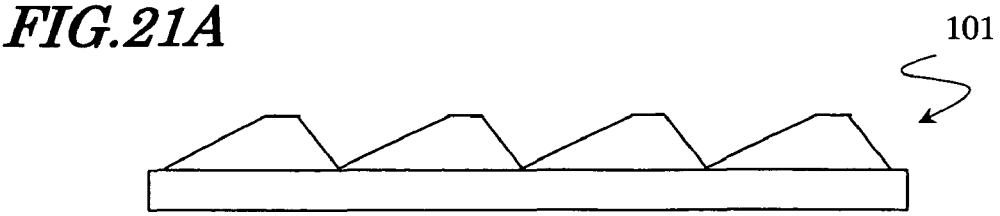
FIGS. 21A to 21D are cross-sectional views for explaining steps in a method of forming an alignment controlling element according to Embodiment 4 of the present invention.

First, as shown in FIG. 21A, a master 101 having an undulated surface is produced. The master 101 can be produced by, after forming a photoresist layer on a substrate, patterning the photoresist layer by using a double beam interference exposure apparatus, an electron beam lithography apparatus, or a mask exposure apparatus such as a stepper. The method for patterning the photoresist layer may be the same as that described in Embodiment 1 or 2, for example. Alternatively, the master 101 can be produced by mechanically grinding a substrate composed of Al or other materials, or etching a monocrystalline substrate-such as an Si substrate. The master 101 does not need to be optically transparent, but may be formed of any material which permits micromachining. As a material which permits micromachining, a high resolution resist may be used, for example.

Figure 21B:
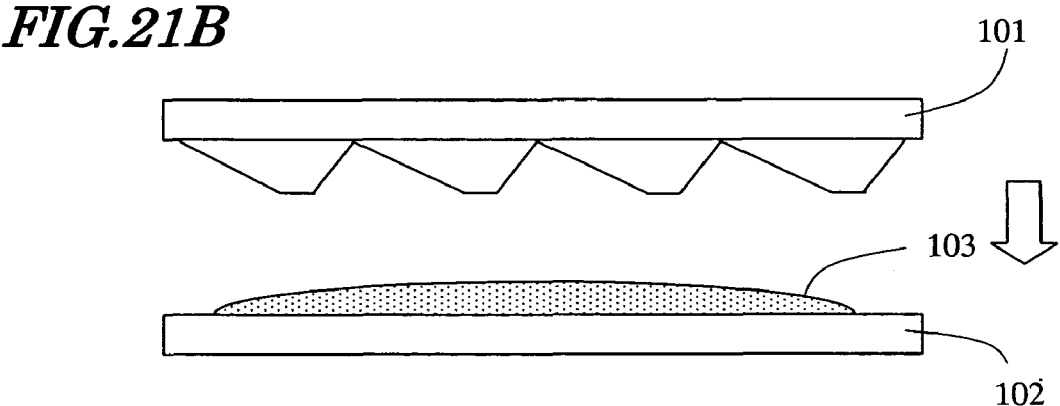

Next, as shown in FIG. 21B, a resin material 103 is applied to the surface of the transparent substrate 102, and thereafter the master 101 is attached to the transparent substrate 102 in such a manner that the ruggednesses of the master 101 are in contact with the resin material 103. As the transparent substrate 102, for example, a glass substrate, or a glass substrate having a conductive film (ITO) on its surface may be used. As the resin material 103, a UV (ultraviolet)-curable resin is used herein. Alternatively, the resin material 103 may be composed of any other resin material such as a thermoplastic resin or a thermosetting resin.

Figure 22:
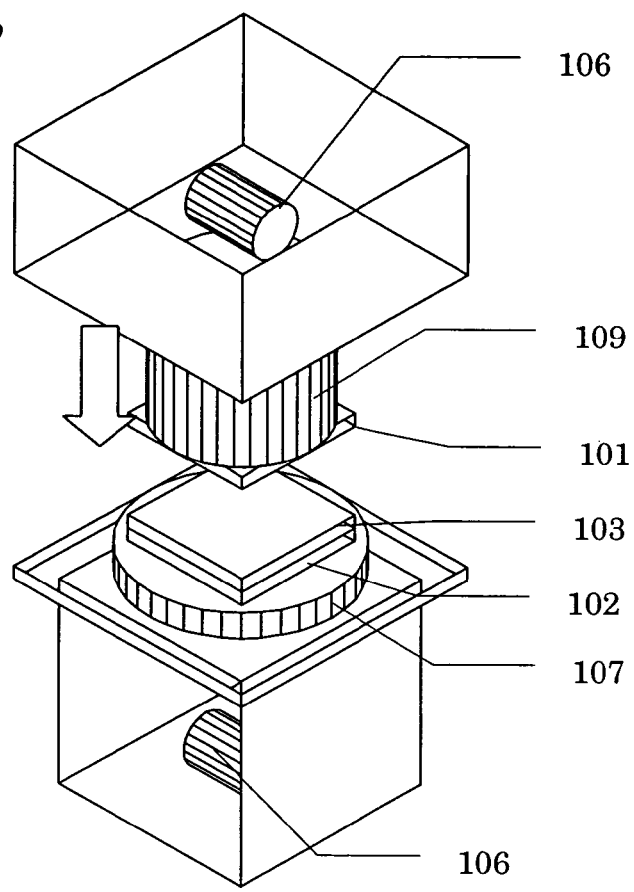
FIG. 22 is a schematic illustration of an apparatus used in an emboss step according to Embodiment 4 of the present invention.

The attachment of the transparent substrate 102 to the master 101 can be performed by using an apparatus as shown in FIG. 22, for example. The transparent substrate 102 is placed on a lower stage (a sample stage made of quartz glass) 107, and the master 101 is placed on an upper stage (a sample stage made of quartz glass) 109. By lowering the upper stage 109, the master 101 and the transparent substrate 102 are attached together via the resin material 103.

Figure 21C:
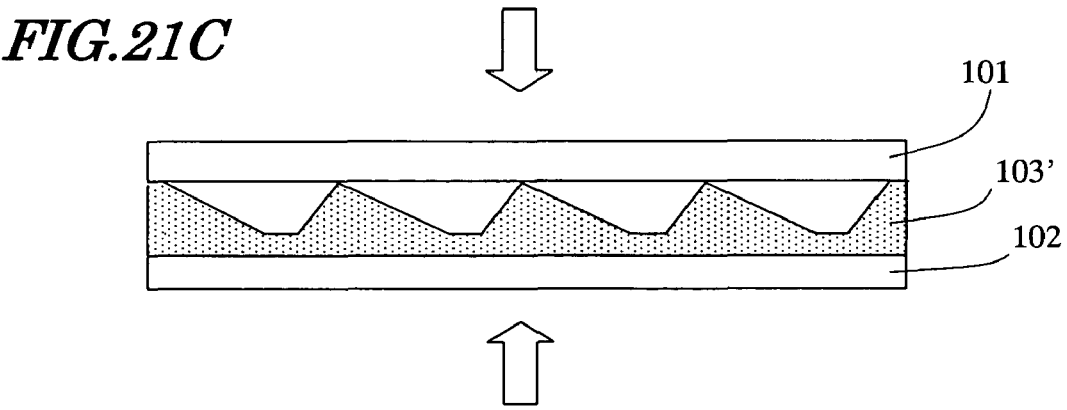

After the master 101 and the transparent substrate 102 are attached together, as shown in FIG. 21C, the substrate 102 having the master 101 attached thereto is held for a predetermined period of time while being pressed in the directions of the arrows. Thereafter, the resin material 103 is irradiated with ultraviolet by using an ultraviolet lamp 106. Thus, the resin material 103 sets, and becomes a resin layer 103'. In the case where the substrate 102 and the master 101 are capable of transmitting ultraviolet, it is preferable to radiate ultraviolet not only from the surface of the substrate 102 but also from the back side thereof. By thus performing ultraviolet irradiation from both sides of the substrate, the cure time can be reduced, with an additional advantage in that ultraviolet is not likely to cast shadows even if TFTs and/or metal wires are provided on the substrate 102.

Figure 21D:
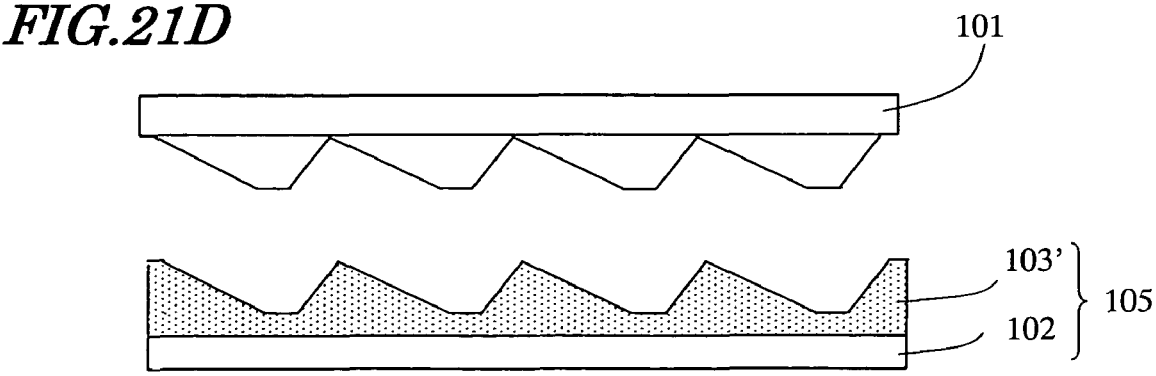

Next, as shown in FIG. 21D, the upper stage 109 is elevated to take the master 101 off the substrate 102. As a result, an alignment controlling element 105 having the undulated resin layer 103' is obtained.

The method for producing an alignment controlling element according to the present embodiment is not limited to the above. For example, a roller-like master may be produced, and the side face configuration of the roller-like master may be embossed onto a resin layer. The emboss may be performed by using an apparatus shown in FIG. 23, for example. A specific example of this emboss method will be illustrated below.

Figure 23:
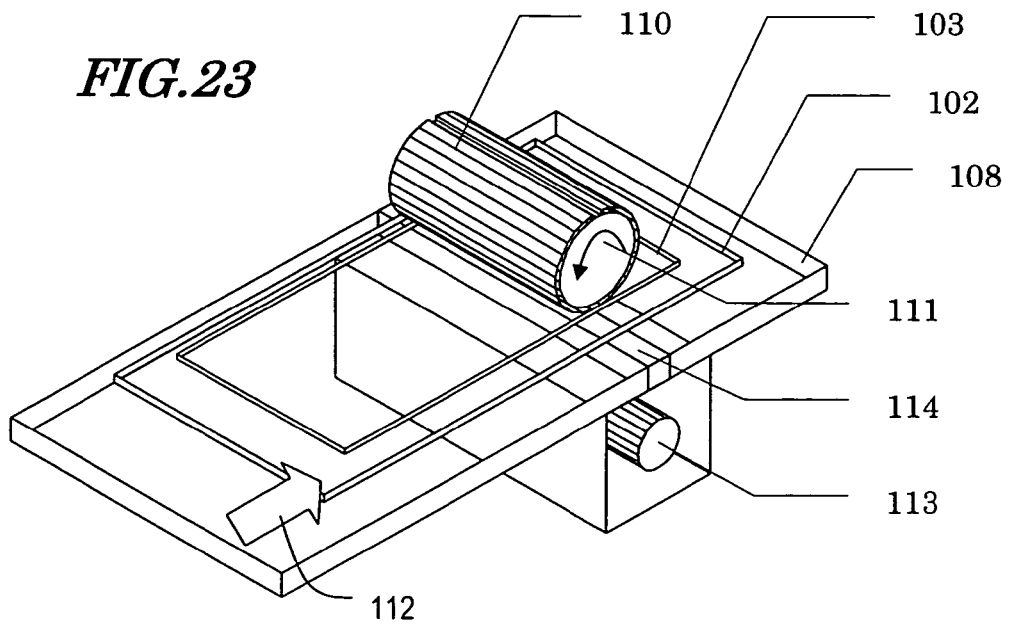
FIG. 23 is a schematic illustration of another apparatus used in an emboss step according to Embodiment 4 of the present invention.

First, the substrate 102 is placed on a stage 108 of the apparatus shown in FIG. 23. The resin material 103 is applied to the surface of the substrate 102. Herein, the resin material 103 is a UV-curable resin. Next, a roller-like master 110 being rotated in the direction of an arrow 111 is pressed against the substrate 102, while the stage 108 is moved in the direction of an arrow 112. As a result, a portion of the resin material 103 where the master 110 is pressed against can be irradiated with ultraviolet from an ultraviolet lamp 113, through an opening 114 for permitting ultraviolet irradiation. Thus, by irradiating the resin material 103 with ultraviolet in such a linear fashion, the resin material 103 is consecutively set, whereby the undulated resin layer 103' is formed.

With the method described with reference to FIGS. 21A to 21D, it is necessary to prepare a plate-like master 101 which has substantially the same as that of the substrate 102 of the alignment controlling element 105. Therefore, in the case where a large-area substrate 102 is to be used—as in the case of producing a plurality of panels concurrently on a single large substrate (multi-substrate processing)—, it becomes different to produce the master 101. Although it might be possible to emboss a plurality of times by using a master 101 which is sized smaller than the substrate 102, positioning in such cases would be difficult. On the other hand, with the above-described method using the roller-like master 110, once a master 110 corresponding to a single panel is produced, consecutive embossing can be performed for the entire substrate 102, even in the case of multi-substrate processing. Thus, there is an advantage in that the master 110 can be reduced in area.

Moreover, by using the roller-like master 110, emboss process may be performed for a thermoplastic resin (resin material for replication) 103, for example. Specifically, the substrate 102 and the thermoplastic resin 103 are previously heated, and the master 110 is pressed against the thermoplastic resin 103. Thereafter, the thermoplastic resin 103 is allowed to cool and set. For such emboss process against the thermoplastic resin 103, the apparatus shown in FIG. 23 can be used, with a heating and cooling mechanism added thereto.

Figure 24:
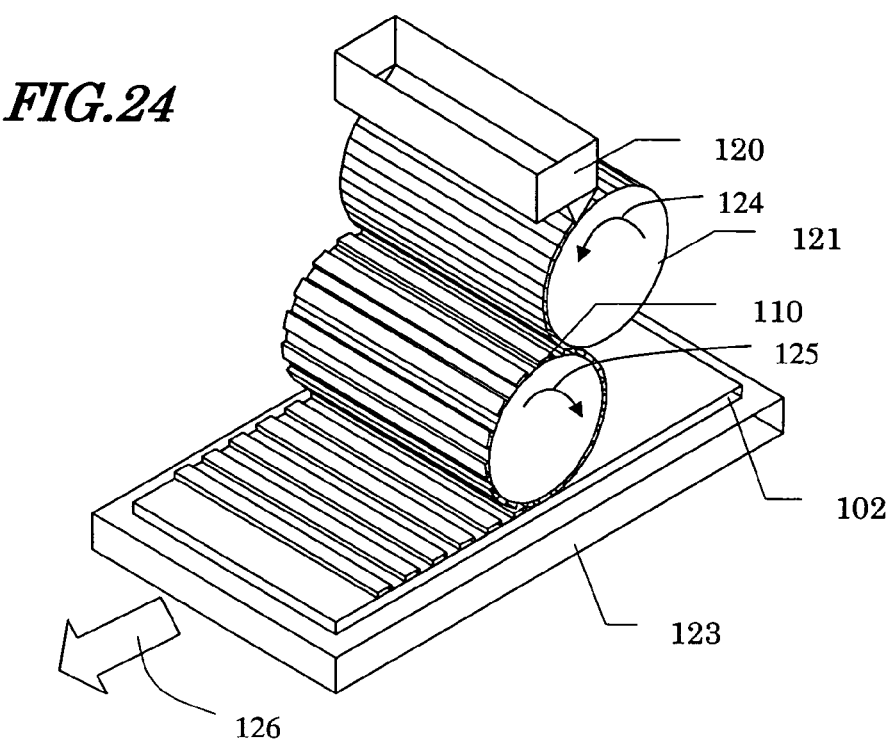
FIG. 24 is a schematic illustration of yet another apparatus used in an emboss step according to Embodiment 4 of the present invention.

By using a highly viscous resin as the resin material 103, the side face configuration of the roller-like master 110 can be embossed (or otherwise transferred) with a method similar to intaglio printing. For such emboss process, an apparatus shown in FIG. 24 can be used, for example. A specific example of this emboss method will be illustrated below.

First, the substrate 102 is placed on a stage 123. Then, the resin material 103 is placed in a container 120. The resin material 103 is continually discharged through an opening in the bottom face of the container 120, so as to be applied to the surface of an application roller 121, which is being rotated in the direction of an arrow 124. The resin material 103 having been applied to the application roller 121 is uniformly applied to the surface of a master 110, which is being rotated in the direction of an arrow 125. Thereafter, the master 110 having the resin material 103 applied thereto is pressed against the substrate 102 being placed on the stage 123. The stage 123 moves in the direction of an arrow 126 in synchronization with the rotation of the master 110. As a result, the resin material 103 which has been applied to the master 110 is transferred (embossed) onto the substrate 102, whereby a desired fine configuration composed of the resin material 103 is formed on the substrate 102. The resin material 103 which has been transferred onto the substrate 102 is allowed to set via ultraviolet irradiation or heating, thus becoming a resin layer 103'.

Figure 25:
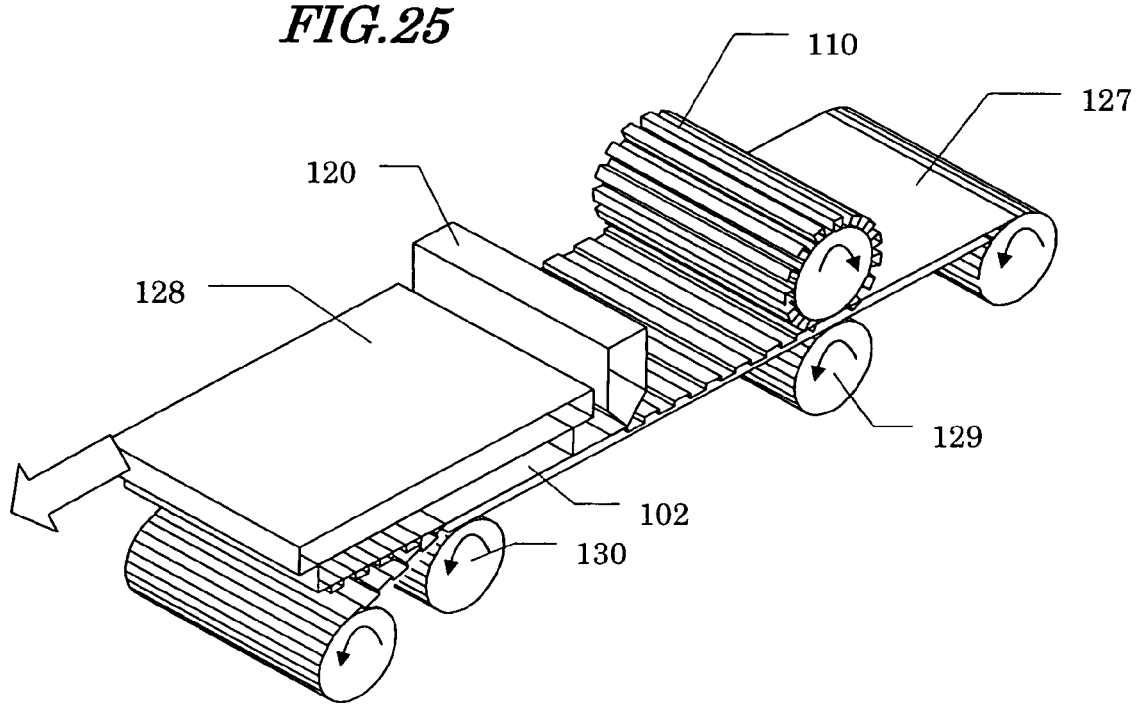
FIG. 25 is a schematic illustration of yet another apparatus used in an emboss step according to Embodiment 4 of the present invention.

With any of the above-described methods, the master is directly pressed against the substrate 102 such as a glass substrate, and is likely to be reused multiple times. Therefore, the master is likely to be grazed. If a grazed master is used for continued emboss, the grazes may themselves be embossed. Therefore, one possible method is to first emboss the surface configuration of a master onto a film, and then emboss this configuration further onto a resin material by using the film as a master. Hereinafter, the film will be referred to a "embossed master". For such emboss process, an apparatus shown in FIG. 25 can be used, for example. A specific example of this emboss method will be illustrated below.

First, the substrate 102 is placed on the back side of a stage 128. Next, a film (thickness: 0.5 µm or more) 127 which is composed of a material which can be deformed with heat is supplied between the master 110 and a press roller 129, thus forming fine ruggednesses on the film 127. The film 127 may be PET, for example. Next, the resin material 103 which is contained in a container 120 is thinly applied to the film 127 having the ruggednesses formed thereon. The resin material 103 thus applied is transferred (embossed) onto the substrate 102 placed on the back side of the stage 128, by the action of a peeling roller 130. The resin material 103 having been transferred onto the substrate 102 is allowed to set via ultraviolet irradiation or heating, thus becoming the resin layer 103'.

Thus, by embossing the surface configuration of the master 110 by way of the film 127, the master 110 is prevented from being damaged through a plurality of emboss processes. Note that, as has been described with reference to FIG. 24, the resin material 103 may be applied to the film 127 by means of an application roller. As necessary, the resin material 103 which has been applied to the film 127 may be allowed to set to a certain degree via ultraviolet irradiation or heating, before being transferred onto the substrate 102.

Embodiment 5

Hereinafter, a liquid crystal display device according to Embodiment 5 of the present invention will be described with reference to the accompanying drawings. The liquid crystal display device of the present embodiment is an MVA mode display device having an alignment controlling element which is divided into a plurality of subregions.

As described in Embodiment 3, the alignment controlling element has a plurality of unit regions which may correspond to the pixels of a display device. In the case where MVA mode is adopted, each unit region is divided into a plurality of subregions. Each of these subregions imparts a different pretilt to each subpixel.

Each unit region of the alignment controlling element of the present embodiment is divided into a plurality of subregions according to one of the preferred division patterns described below. Note that the below-described division patterns for the alignment controlling element can also be adopted for the master in Embodiment 4, or the alignment controlling element of Embodiments 1 to 3.

Firstly, as has been described with reference to FIG. 2B, liquid crystal molecules incline upon the application of a voltage in VAN mode, thus realizing a white display state due to their birefringence. Since a liquid crystal cell is interposed between a pair of polarizers 10 whose absorption axes constitute an angle of 90° with each other, it is preferable that the direction in which the liquid crystal molecules incline (pretilt direction) and the absorption axis of each polarizer 10 each constitute an angle of 45° on the substrate surface, for an efficient utilization of birefringence.

Secondly, it is preferable that the number of subregions (division number) in a single unit region is two or four, the subregions being equal in area. Note that it is only preferable that the subregions in each given pixel be equal. The area of a subregion in one pixel may well be different from the area of a subregion in another pixel.

Possible division patterns for the unit region that can satisfy the first and second conditions above are patterns in which the unit region is divided into four subregions (I) to (IV) as shown in FIGS. 19A to 19C, for example.

Any such division pattern can be applied to one or both of the pair of opposing substrates of a display device between which a liquid crystal layer is interposed. Exemplary applications of such division patterns will now be described with reference to FIGS. 26A to 26C.

Figure 26A:
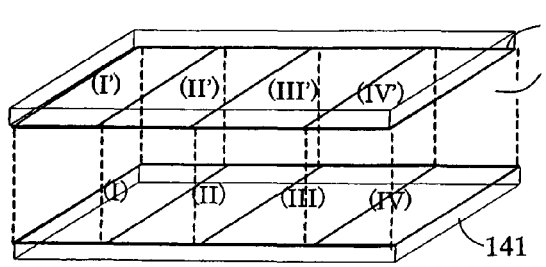
FIGS. 26A to 26C are diagrams each illustrating an exemplary division pattern for a unit region.
Figure 26B:
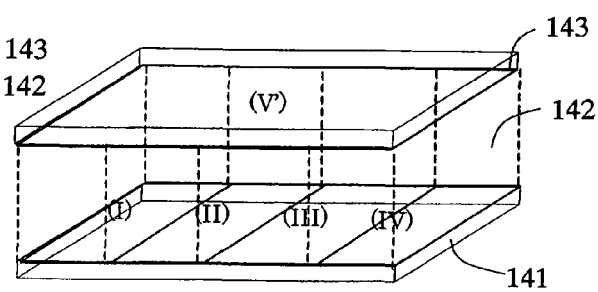
Figure 26C:
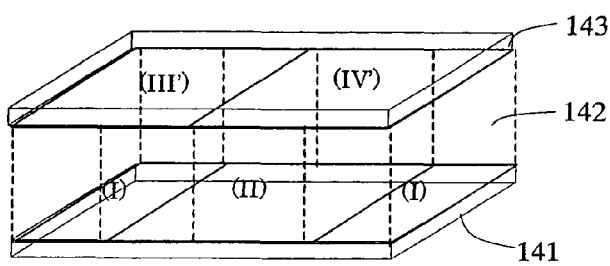

FIGS. 26A to 26C each illustrate a portion of a liquid crystal layer 142 and a portion of a pair of substrates 141 and 143 corresponding to a single pixel of a display device. A vertical alignment type liquid crystal layer 142 is provided between the first substrate 143 and the second substrate 141. Generally speaking, the first substrate 143 is a color filter substrate, and the second substrate 141 is a TFT substrate. However, since ruggednesses can be formed on either substrate with a similar method, the second substrate 141 may alternatively be a color filter substrate and the first substrate 143 may be a TFT substrate. On a face of each of the first substrate 143 and the second substrate 141 facing the liquid crystal layer, ruggednesses are formed in the same or different division pattern. Alternatively, ruggednesses with a certain division pattern may be formed on the surface of only one of the substrates.

In the example shown in FIG. 26A, ruggednesses are formed on the surface of each of the first substrate 143 and the second substrate 141. The unit region of these substrates 143 and 141 has subregions (I) to (IV) and subregions (I') to (IV'), respectively, as divided in accordance with the pattern shown in FIG. 19B. Therefore, one pixel is divided into four subpixels which are defined by the opposing subregions (I) and (I'); (II) and (II'); (III) and (III'); and (IV) and (IV'). By thus applying the same division pattern to the substrates 141 and 143, the most stable alignment can be obtained. Since the relationship between the pretilt angle and the ruggednesses is clear, it is easy to design the undulation.

In the example shown in FIG. 26B, ruggednesses having subregions (I) to (IV) as divided in accordance with the pattern shown in FIG. 19B are formed only on the surface of the second substrate 141. The unit region (V') of the first substrate 143 has a flat surface, which structure cannot produce a pretilt. Therefore, each pixel is divided into four subpixels as defined by the subregions (I) to (IV) and the unit region (V'). In this example, ruggednesses with a division pattern are formed on only one substrate 141, while ruggednesses are formed on the other substrate 143, so that the production process can be shortened. Note however that, given that the ruggednesses on the second substrate 141 are identical to the ruggednesses on the first and second substrates 141 and 143 shown in FIG. 26A, the pretilt angle imparted to the central molecules in the liquid crystal layer 142 would be half of the pretilt angle imparted to the central molecules in the liquid crystal layer 142 shown in FIG. 26A.

In the example shown in FIGS. 26A and 26B, ruggednesses which are divided in accordance with the pattern shown in FIG. 19B are formed on the face of a substrate which is in contact with the liquid crystal layer. Alternatively, ruggednesses which are divided in accordance with the pattern shown in FIG. 19A or 19C, or any other pattern may instead be formed.

In the example shown in FIG. 26C, ruggednesses are formed on the surface of each of the first substrate 143 and the second substrate 141, where the unit region of the substrates 143 and 141 is divided, respectively, into two subregions (III') and (IV') and two subregions (I) and (II). However, the subregions of the first substrate 143 are offset from the subregions of the second substrate 141 by ½ of the subregion pitch, with the liquid crystal layer 142 interposed therebetween. For example, the subregion (II) opposes the two subregions (III') and (IV'). In such a case, one pixel is divided into four subpixels as defined by the subregions (I) and (III'); subregions (II) and (III'); subregions (II) and (IV'); and subregions (I) and (IV'). In this example, the area of each of the subregions (I), (II), (III') and (IV') is twice the area of each subregion shown in FIG. 26A. Therefore, even in the case where the division into regions can only be performed with a relatively low resolution, the first substrate 143 and the second substrate 141 in this example can be adequately produced.

Alignment division can be realized in any of the examples shown in FIGS. 26A to 26C. However, for the sake of the production process, it is preferable to provide ruggednesses on only one of the substrates, as shown in FIG. 26B. The reason is that, as described above, the formation of minute ruggednesses is likely to complicate the production process of the display device.

In the case where a liquid crystal panel is to be produced by using a large substrate whose sides each measure up to one meter or more, the formation of ruggednesses for liquid crystal alignment control is particularly suitably performed by a replica technique as described in Embodiment 4, where a master is produced for emboss to a substrate surface. However, positioning of the master with respect to a substrate is very difficult, and therefore a division pattern which does not require highly precise positioning is desirable.

Hereinafter, division patterns which do not require a highly precise positioning of a master with respect to a substrate when embossing the surface configuration of the master to the substrate surface will be described.

The division pattern for the unit region in MVA mode must be such that each pixel is split into subregions of exactly the same area, so that the same amount of brightness change will result when the viewing direction is inclined in any of the upper/lower/right/left directions. However, as long as the subregions are equal in area, the positions of the subregions and the order in which they are positioned do not affect displaying. Therefore, it is advantageous to form consecutive groups of subregions (subregion groups) on the master, where size of the subregions and unit region are selected so that one unit region includes a plurality of subregions. Preferably, the total area of subregions of one subregion group is substantially equal to the total area of subregions of another subregion group. As a result, it can be ensured that, even after the master configuration is embossed to a substrate, the total areas of the subregions included in each unit region (pixel) on the substrate are substantially equal, without requiring a highly precise positioning.

Hereinafter, exemplary liquid crystal display device structures which are produced by using a master having subregion groups arranged thereon will be described. Each liquid crystal display device includes a plurality of pixels arranged in a matrix of rows and columns. Typically, gate lines and CS lines are provided in the row direction, and source lines are provided in the column direction. In the following examples, a TFT substrate of the liquid crystal display device has an alignment controlling structure (ruggednesses) which is formed by using the aforementioned master.

Figure 27A:
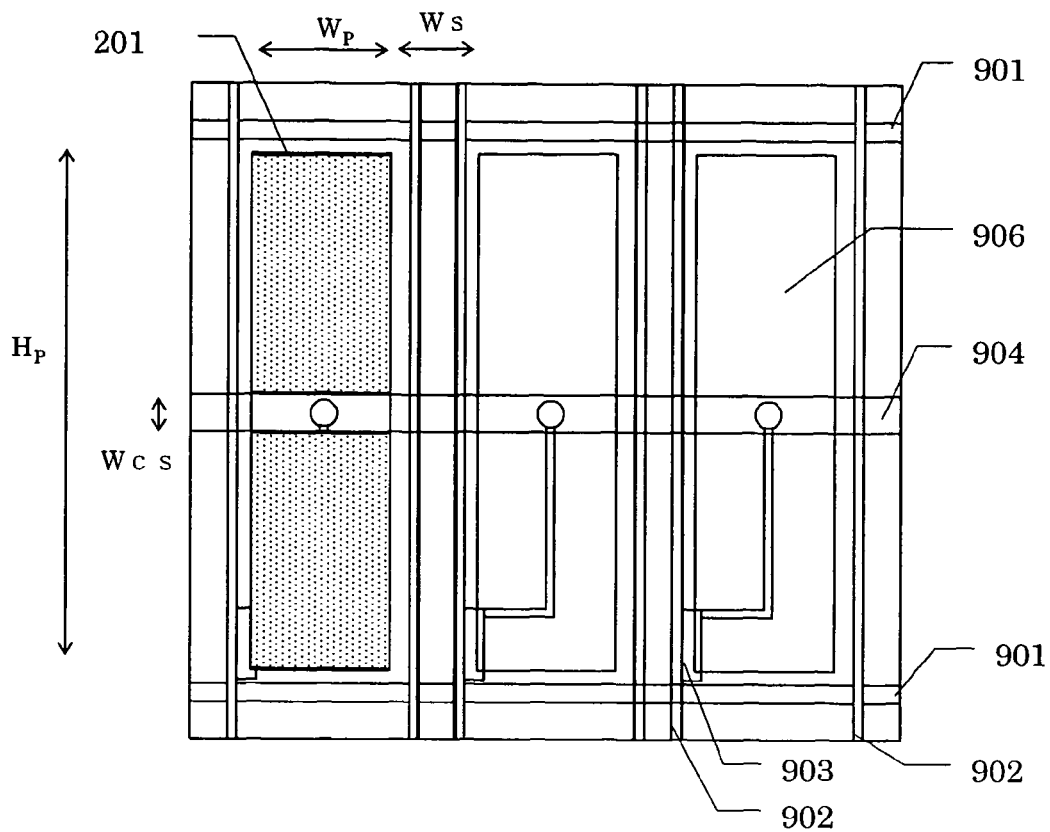
FIGS. 27A and 27B are a plan view and a perspective view, respectively, showing pixel construction in an active matrix type liquid crystal display device.
Figure 27B:
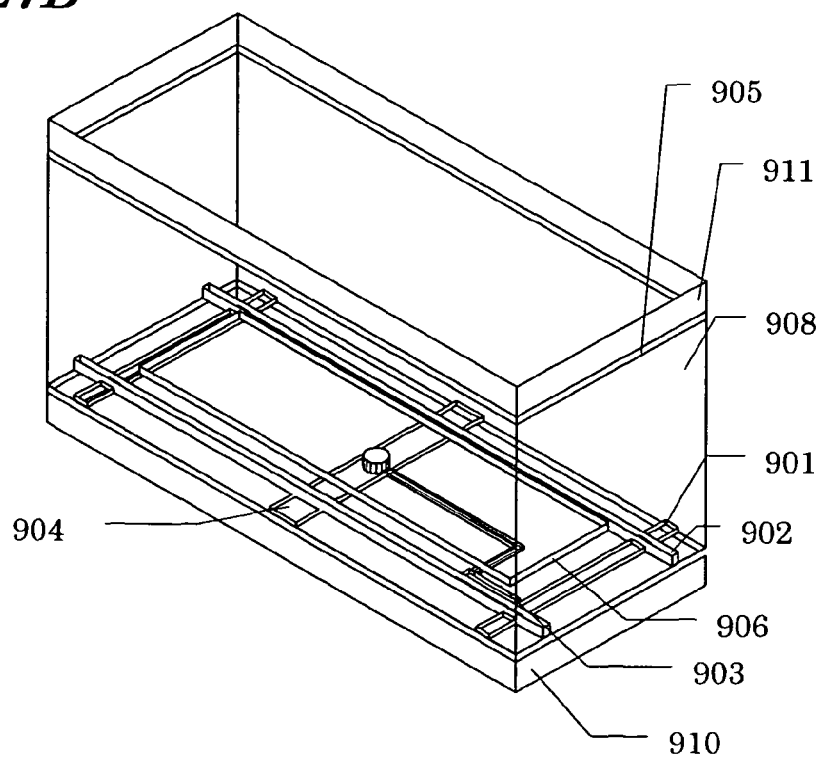

FIG. 27A is an enlarged plan view showing three pixels of an active matrix type liquid crystal display device of a common type. FIG. 27B is a perspective view showing one pixel of the liquid crystal display device shown in FIG. 27A. For conciseness, it is herein assumed that each pixel has a rectangular shape which is elongated in the column direction.

As shown in FIG. 27B, each pixel includes a portion of: a TFT substrate 910; a color filter substrate 911; and a liquid crystal layer 908 interposed between the substrates 910 and 911. On the face of the color filter substrate 911 facing the liquid crystal layer, a transparent electrode 905 is formed. On the face of the TFT substrate 910 facing the liquid crystal layer, a pixel electrode 906 and a switching element (TFT) 903 are provided for each pixel. The switching element 903 is connected to a gate line 901 and a source line 902. A CS line 904 is provided across a middle portion of each pixel. As shown in FIG. 27A, a region of the pixel through which light can be transmitted defines an aperture denoted as "201". Therefore, ruggednesses which are located in the aperture 201 most effectively exhibit a liquid crystal alignment controlling function. In this example, the aperture is a rectangle having a shorter side which is parallel to the row direction and a longer side which is parallel to the column direction.

First, an example in which ruggednesses are formed in the aperture 201 so as to constitute split regions resembling vertical or horizontal stripes will be described. In this case, alignment division can surely be realized even if an emboss step is performed without performing a highly precise positioning between a master and the TFT substrate, because a plurality of subregion groups are located within each aperture 201. However, the following problems may exist.

The longitudinal direction of each split, stripe-like subregion is parallel to the shorter sides or the longer sides of the aperture 201. Therefore, the effective area (i.e., the area which contributes to alignment control) of the subregion overlapping with the perimeter of the aperture 201 is reduced by the CS line 904 and the gate line 901. As a result, the ratio between total effective areas of the respective subregions is likely to become unbalanced. Moreover, the amounts of decrease in the effective areas of the subregions will depend on an interspace Ws with an adjoining aperture. Therefore, in order to alleviate imbalance in the area ratio, it is necessary to precisely position the boundary between adjoining subregion groups with respect to the side of each subregion (in the aperture) which runs parallel to the longitudinal direction, along a direction perpendicular to the longitudinal direction of the subregions. Although the degree of imbalance will become smaller as the width of each stripe-like subregion is decreased, the width cannot be made infinitely small; for example, in order to form ruggednesses with a pitch of about 1 μm, the width of each subregion would have to be about 10 μm or more.

Next, an exemplary structure shown in FIG. 28 will be described. In this example, an alignment controlling structure which is split into stripe-like regions obliquely traversing an aperture 201 is formed. Thus, the ratio between total effective areas of the respective subregions can be substantially improved.

More preferably, it is ensured that the effective areas of subregions (I) to (IV) that are reduced due to the interspaces between adjoining apertures are substantially equal. As a result, the total effective areas of the respective subregions in the aperture 201 can be made substantially equal. A specific example of such a division pattern is described.

Figure 28:
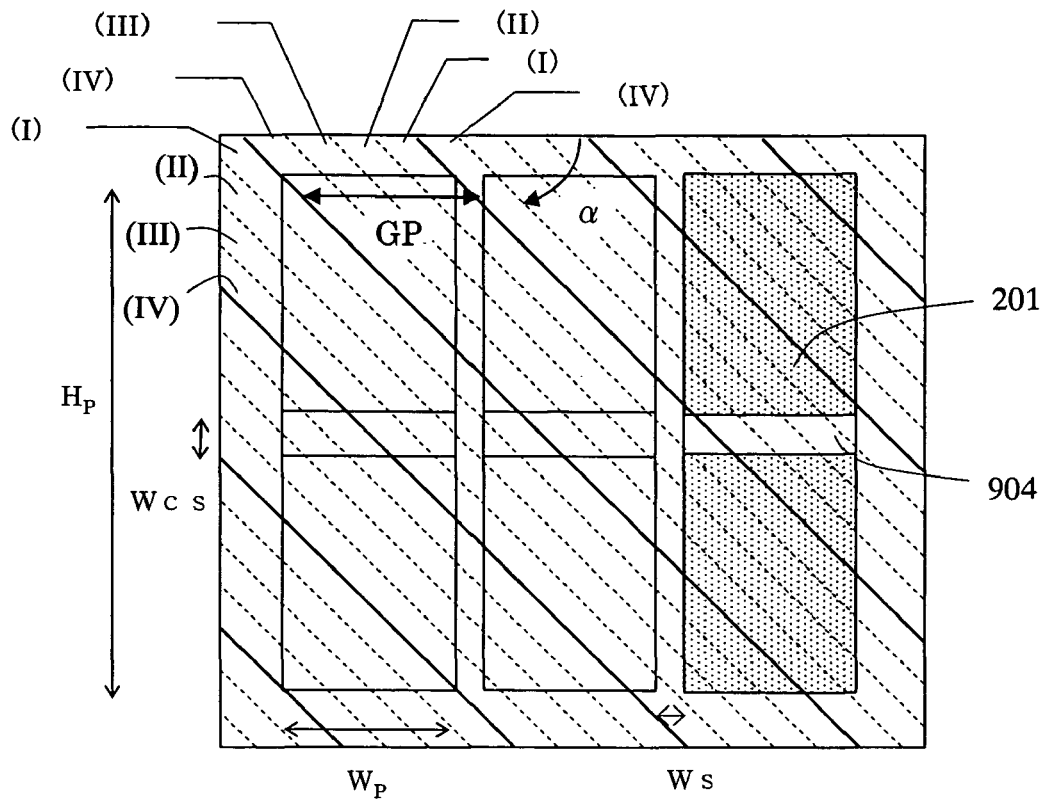
FIG. 28 is a plan view illustrating exemplary pixel construction in a liquid crystal display device according to Embodiment 5 of the present invention.

As shown in FIG. 28, pixels are formed such that a height $H_p$ of the aperture 201 is an integer multiple of a width $W_p$ of the aperture (eq.(1)).

$$H_p=nW_p \text{ (where n is an integer other than 0)} \qquad \text{eq.(1)}$$

Assuming that an angle between the longitudinal direction of each subregion and a shorter side of the aperture 201 is $\alpha$, and the pitch of each subregion group on the master is GP, the imbalance between total effective areas of the respective subregions can be improved if the angle $\alpha$ and the pitch GP satisfy eq.(2) and eq.(3) below.

$$\text{Tan } \alpha = W_p/(H_p/n) \qquad \text{eq.(2)}$$

$$GP = W_p/m \text{ (where } m \text{ is an integer other than 0)} \qquad \text{eq.(3)}$$

From eq.(2) above, the angle $\alpha$ is 45°. Assuming that m in eq.(3) is "1", for example, the total areas of the respective subregions can be made always equal, irrespective of any mispositioning between the master pattern and the substrate onto which the ruggednesses are to be embossed, by setting the size ($H_p$, $W_p$) of the pixels and the pitch GP of the subpixel groups so that eq.(1') and eq.(3') are satisfied, and embossing so that the angle $\alpha$ is 45°. Moreover, the ratio between effective areas of the subregions can be kept equal irrespectively of the position and width Wcs of the CS line 904 across the middle portion of the pixel, and the size of the interspace Ws between adjoining pixel apertures.

$$H_p=nW_p \text{ (where n is an integer other than 0)} \qquad \text{eq.(1')}$$

$$GP=W_p \qquad \text{eq.(3')}$$

Hereinafter, working examples of the display device of the present embodiment will be described.

EXAMPLE 1

A display device according to Example 1 includes: first and second substrates, each having an alignment controlling structure divided into regions as shown in FIG. 26A; and a liquid crystal layer interposed between the substrates. The alignment controlling structures on the first and second substrate surfaces are formed by the replica technique which has been described with reference to FIGS. 21A to 21D.

Hereinafter, a method for producing the display device of Example 1 will be described more specifically.

First, a master having ruggednesses composed of a plurality of unit features is produced. The ruggednesses on the master are formed by using a resist which has been applied to a glass substrate, in such a manner that the resin is subjected to four times of exposure by using a photomask, each time for each subregion, and then performing development. The exposure is performed while changing the direction of exposure by 90° for each subregion. The exposure for each subregion may be performed in the following two steps. For example, an exposure may be performed using a double beam interference exposure apparatus (first exposure), and thereafter a usual mask exposure (second exposure) may be performed. The second exposure is performed for the purpose of forming a plurality of grooves in a direction perpendicular to the direction in which the unit features are arranged. The grooves can be created by mask exposure because their pitch is relatively coarse. In the case where the grooves are to be formed with a small pitch, a double beam interference exposure apparatus may be employed in the second exposure to perform an interference exposure in a direction different from the direction of the first exposure. Instead of performing the first and second exposures above, it would also be possible to employ an interference exposure apparatus which is not equipped with a prism, and simultaneously irradiate the resist on the glass substrate with two different laser beams. In this case, the interference fringes ascribable to the respective laser beams can be independently controlled.

Unit features of the resultant ruggednesses are similar to those described in Embodiment 1. The unit features have a pitch P of 0.5 μm; the width W of the gap between adjoining unit features is 0; the height H of each unit feature is 0.5 μm; the side wall angles A and B are 105° and 75°, respectively; and the width F of the upper face is 0. The grooves are formed with a pitch PG of 5 μm along a direction perpendicular to the direction in which the unit features are arranged, and each groove has a width G of 1 μm. It should be understood that the values of the above parameters P, W, H, A, B, F, PG, G are approximate.

Next, the surface configuration of the resultant master is embossed to a substrate surface. The emboss is performed by using the apparatus shown in FIG. 22. Specifically, the master is pressed against a substrate having a UV-curable resin (1 μm) applied thereto by spin-coating, with a pressure of 35 Kg/cm², and left pressed for 60 second. After the pressing, the UV-curable resin is irradiated with ultraviolet (0.7 J/cm²), whereby the UV-curable resin sets and becomes a resin layer having ruggednesses formed on its surface. Thereafter, the master is removed from the substrate.

Then, a vertical alignment film is formed on the surface of the resin layer by spin-coating. As a result, a first substrate is obtained. A second substrate is also produced by a similar method.

The first and second substrates thus obtained are placed so as to oppose each other as shown in FIG. 26A, with the vertical alignment films facing inward, and are attached together while leaving an interspace of 3 μm therebetween. Between these substrates, a liquid crystal (MLC6609) having a negative Δε is injected. Thus, the display device of Example 1 is completed.

Figure 1:
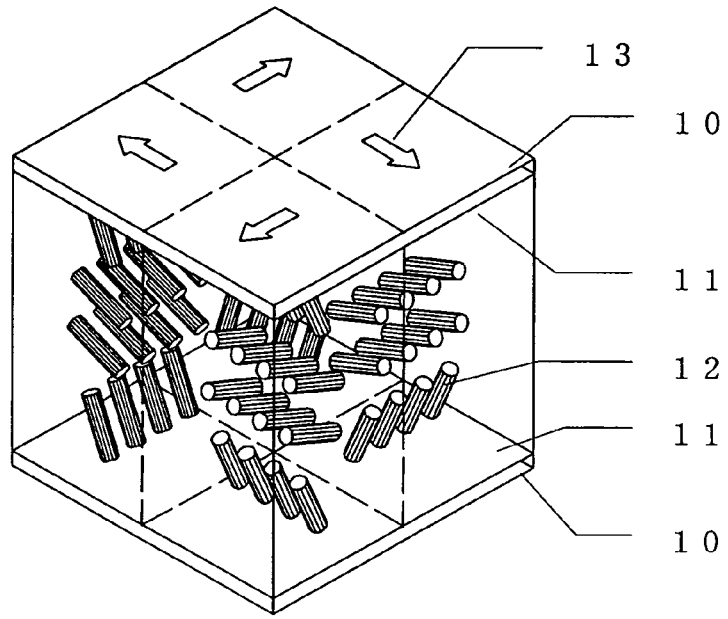
FIG. 1 is a diagram for explaining alignment division.

By examining the liquid crystal alignment in the display device of Example 1, it can be confirmed that the central molecules are vertically aligned in the absence of an applied voltage across the liquid crystal layer, with a tilt (pretilt) from the substrate normal direction. It can also be confirmed that, when a voltage is applied across the liquid crystal layer, the liquid crystal alignment is divided into four regions, in which the liquid crystal molecules incline in respectively different directions as shown in FIG. 1.

Although Example 1 illustrates a case where a master is produced by utilizing double beam interference exposure or the like, similar effects to those in Example 1 can also be obtained by producing a master having unit features similar to those of Embodiments 1 and 2 formed by using an electron beam lithography apparatus, a stepper, or the like.

EXAMPLE 2

A display device according to Example 2 includes: first and second substrates, each having an alignment controlling structure formed on its surface; and a liquid crystal layer interposed between the substrates. As shown in FIG. 28, each alignment controlling structure is divided into a plurality of subregion groups which extend in a direction which is inclined with respect to each aperture ($\alpha$=45°). Each subregion group consists of four subregions (I), (II), (III), and (IV). In this display device, the pixel size (width $W_p$, height $H_p$) and the pitch GP of the subregion group are set so as to satisfy eq.(1') and eq.(3') above. In other words, the height $H_p$ of each pixel is three times as large as the width $W_p$ (n=3), and the pitch GP of the subregion group is equal to the width $W_p$ of each pixel (m=1).

The ruggednesses on the surfaces of the first and second substrates are formed by the replica technique which has been described with reference to FIGS. 21A to 21D.

Hereinafter, a method for producing the display device of Example 2 will be described more specifically.

First, a master having ruggednesses composed of a plurality of unit features is produced. The ruggednesses on the master are formed by a method similar to that used in Example 1, by using double beam interference exposure and mask exposure. In the present example, as shown in FIG. 28, subregion groups (pitch GP: 100µ) composed of subregions (I), (II), (III), and (IV) are deployed in a repetitive arrangement. The directions of the unit features in each subregion are prescribed so that a constant pretilt direction exists due to ruggednesses within each subregion, and that the pretilt directions ascribable to the ruggednesses in adjoining subregions differ by 90° on the substrate surface. The unit features in each subregion are similar to those in Embodiment 1. The unit features have a pitch P of 0.5 µm; the width W of the gap between adjoining unit features is 0; the height H of each unit feature is 0.5 µm; the side wall angles A and B are 105° and 75°, respectively; and the width F of the upper face is 0. The grooves are formed with a pitch PG of 5 µm along a direction perpendicular to the direction in which the unit features are arranged, and each groove has a width G of 1 µm.

As a second substrate, a TFT substrate as shown in FIG. 23 is prepared. On the TFT substrate, the width $W_p$ of each pixel is 100 µm; the height $H_p$ of each pixel is 300 µm; the width Wcs of each CS line is 20 µm; and the width Ws of the interspace between adjoining apertures is 30 µm.

Next, the surface configuration of the resultant master is embossed to the surface of the TFT substrate. The emboss is performed by using the apparatus shown in FIG. 22. Specifically, the master is pressed against a substrate having a UV-curable resin (1 µm) applied thereto by spin-coating, with a pressure of 35 Kg/cm$^2$, and left pressed for 60 second. After the pressing, the UV-curable resin is irradiated with ultraviolet (0.7 J/cm$^2$), whereby the UV-curable resin sets and becomes a resin layer having ruggednesses formed on its surface. Thereafter, the master is removed from the substrate.

Then, a vertical alignment film is formed on the surface of the resin layer by spin-coating. As a result, a TFT substrate having an alignment controlling structure formed thereon is obtained. A counter substrate (first substrate) is also produced by a similar method.

The first and second substrates thus obtained are placed so as to oppose each other with the vertical alignment films facing inward, and are attached together while leaving an interspace of 3 µm therebetween. Between these substrates, a liquid crystal (MLC6609) having a negative $\Delta\epsilon$ is injected. Thus, the display device of Example 2 is completed.

By examining the liquid crystal alignment in the display device of Example 2, it can be confirmed that the central molecules are vertically aligned in the absence of an applied voltage across the liquid crystal layer, with a tilt (pretilt) from the substrate normal direction. It can also be confirmed that, when a voltage is applied across the liquid crystal layer, the liquid crystal alignment is divided into four regions, in which the liquid crystal molecules incline in respectively different directions. Since the total areas of the respective subregions (I) to (IV) within each pixel are substantially equal, the same amount of brightness change results when the viewing direction is inclined in any of the upper/lower/right/left directions, thus providing excellent viewing angle characteristics.

Although Example 2 illustrates a case where a master is produced by utilizing double beam interference exposure or the like, similar effects to those in Example 2 can also be obtained by producing a master having unit features similar to those of Embodiments 1 and 2 formed by using an electron beam lithography apparatus, a stepper, or the like.

Embodiment 6

Hereinafter, a liquid crystal display device according to Embodiment 6 of the present invention will be described with reference to the accompanying drawings. The liquid crystal display device of the present embodiment is an MVA mode display device having an alignment controlling element which is divided into a plurality of subregions. However, the liquid crystal display device of the present embodiment differs from the liquid crystal display device of any other embodiment above in that each subregion is further divided into a plurality of minute regions.

In Embodiment 5, alignment division for realizing different pretilt directions is performed by dividing a unit region (corresponding to a pixel) into subregions. On the other hand, according to the present embodiment, each subregion is divided into a plurality of minute regions, each of which causes a pretilt in the same direction (pretilt direction) but at a different angle (pretilt angle). Thus, there is realized an alignment division which results in regions which differ not only in pretilt directions but also in pretilt angles.

The reason for further dividing each subregion in the aforementioned manner will be described.

Figure 29:
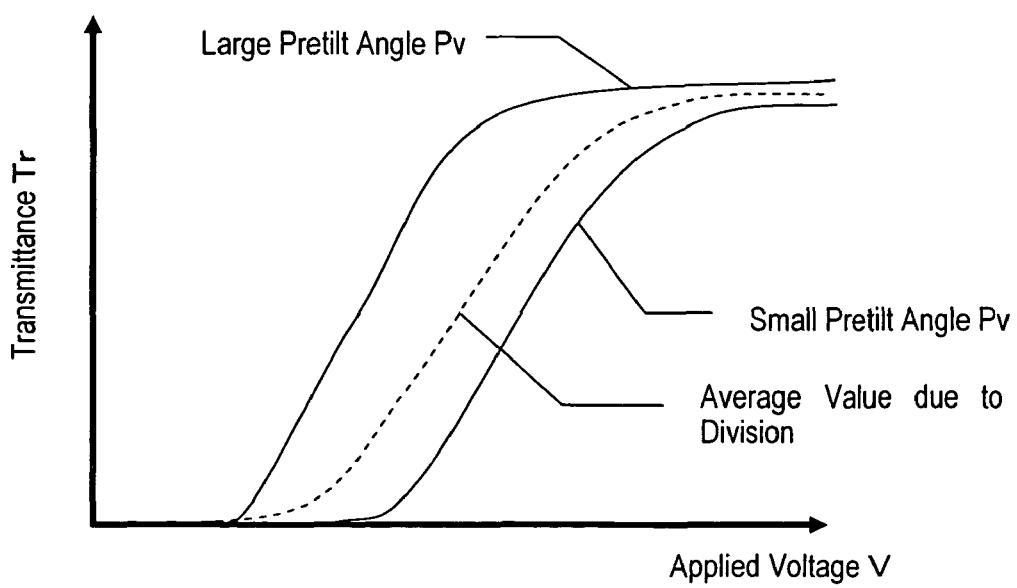
FIG. 29 is a graph a showing light transmittance Tr when a voltage V is applied across a liquid crystal layer.

FIG. 29 is a graph a showing light transmittance Tr when a voltage V is applied across a liquid crystal layer. As can be seen from FIG. 29, as the pretilt angle is increased, the transmittance Tr shifts toward lower voltages. This is because, even assuming that the tilting direction (pretilt direction) is the same, the tendency to incline in the polar angle direction in response to an applied voltage varies depending on the initial pretilt angle.

Therefore, by further dividing each subpixel under MVA mode into a plurality of minute regions for causing different pretilt angles, the liquid crystal layer will, upon the application of a voltage, not only have regions in which liquid crystal molecules incline in different directions, but also regions in which liquid crystal molecules incline (in the same direction but) at different tilt angles (i.e., angles in the direction in which liquid crystal molecules will rise). These regions are averaged out so that any change in brightness and contrast which occurs when the viewing direction is changed is milder than in conventional cases. By thus realizing a highly precise alignment division, a higher-quality display can be realized.

While a variety of alignment divisions for causing different orientation directions within each pixel may conventionally have been studied, the alignment division realized by the present embodiment is unprecedented in that different pretilt angles are imparted to liquid crystal molecules which are located near a middle level along the thickness direction of the liquid crystal layer. The presumable reason for the lack of precedents is the difficulty in forming an alignment controlling structure by performing an alignment treatment with an increased precision.

In the alignment controlling element of the present embodiment, each subregion is divided into a plurality of minute regions, such that unit features of a different shape are arranged in each different minute region.

Figure 30A:
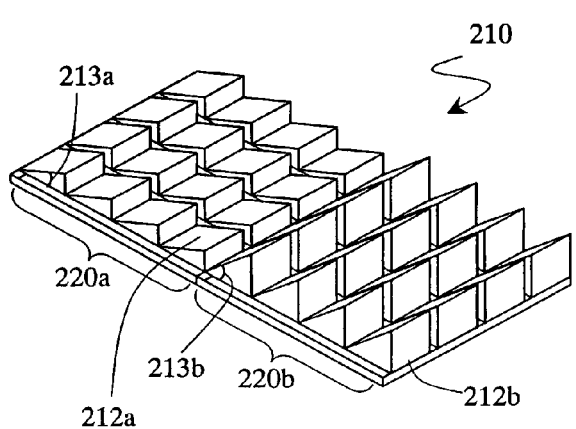
FIGS. 30A and 30B are perspective views each illustrating an exemplary subregion construction according to Embodiment 6 of the present invention.
Figure 30B:
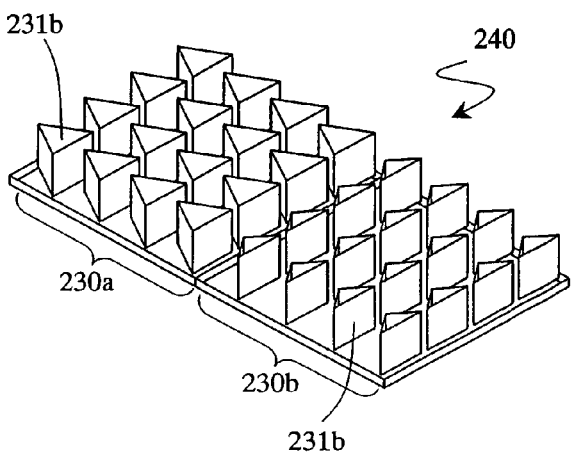

FIGS. 30A and 30B are perspective views illustrating exemplary subregion constructions according to the present embodiment.

A subregion 210 shown in FIG. 30A is divided into two minute regions 220a and 220b. In the minute regions 220a and 220b, respectively, unit features 212a and 212b having a triangular cross section are arranged, with substantially the same pitch P. Both minute regions 220a and 220b realize the same pretilt direction. However, a side wall angle 213a of each unit feature 212a in the minute region 220a is smaller than a side wall angle 213b of each unit feature 212b in the minute region 220b. Therefore, the minute region 220a realizes a different pretilt angle from that realized by the minute region 220b.

A subregion 240 shown in FIG. 30B is divided into two minute regions 230a and 230b. In the minute regions 230a and 230b, respectively, triangular-prism-like unit features 231a and 231b are arranged, with substantially the same pitch P. The height of an isosceles triangle constituting the upper face of each unit feature 231a in the minute region 230a is different from the height of an isosceles triangle constituting the upper face of each unit feature 231b in the minute region 230b. Therefore, although both minute regions 230a and 230b realize the same pretilt direction, the minute region 230a realizes a different pretilt angle from that realized by the minute region 230b.

Figure 31A:
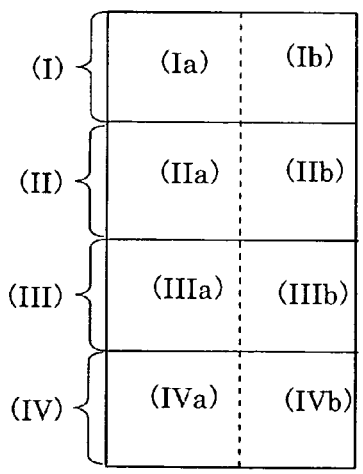
FIG. 31A is a diagram illustrating an exemplary unit region construction according to Embodiment 6 of the present invention.

The alignment controlling element of the present embodiment is composed of subregions as described above. FIG. 31A is a diagram illustrating an exemplary construction of a unit region in the alignment controlling element.

A unit region 250 shown in FIG. 31A is divided into four subregions (I), (II), (III), and (IV). Each subregion has the structure shown in FIG. 30A or 30B, for example. In other words, the subregion (I) is divided into two minute regions Ia and Ib. The other subregions (II) to (IV) are similarly divided into two minute regions IIa and IIb, IIIa and IIIb, and IVa and IVb, respectively.

In the example shown in FIG. 31A, the area ratio between the two minute regions included in each subregion is shown to be 1:1. Note, however, that the area ratio between the minute regions may be optimized in accordance with the viewing angle characteristics, and it is not necessary that the minute regions included in each subregion be equal in area. The pattern of dividing the unit region into subregions and the pattern of dividing each subregion into minute regions are not limited to those exemplified in FIG. 31A, but may be arbitrarily chosen.

The alignment controlling element of the present embodiment can be formed by a method similar to those used in the other embodiments. Preferable, the alignment controlling element of the present embodiment is formed by a replica technique.

Hereinafter, a working example of the liquid crystal display device of the present embodiment will be described.

EXAMPLE 3

A liquid crystal display device according to Example 3 includes first and second substrates, and a liquid crystal layer interposed between these substrates. On the surface of the second substrate (TFT substrate), ruggednesses for restricting liquid crystal alignment are provided. The first substrate (color filter substrate) has a flat surface. The ruggednesses on the surface of the second substrate are such that, as shown in FIG. 31A, each unit region is divided into four subregions (I) to (IV), each subregion being further divided into two minute regions Ia and Ib, IIa and IIb, IIIa and IIIb, and IVa and IVb. The subregions (I) to (IV) are equal in area. The area ratios Ia:Ib, IIa:IIb, IIIa:IIIb, IVa:IVb between the minute regions in each subregion are all 1:4.

In each subregion, as shown in FIG. 30A, unit features having a triangular cross section are arranged. The pitch P of the unit features is 0.5 μm; the width W of the gap between adjoining unit features is 0; and the width F of the upper face is 0. In the minute regions Ia, IIa, IIIa, and IIIa, the height H of each unit feature and the side wall angles A and B are prescribed so that the liquid crystal molecules at the interface between the substrate and the liquid crystal layer have a tilt angle (i.e., angles to which the liquid crystal molecules will rise) of 89°. On the other hand, in the minute regions Ib, IIb, IIIb, and IIIb, the height H of each unit feature and the side wall angles A and B are prescribed so that the liquid crystal molecules at the interface between the substrate and the liquid crystal layer have a tilt angle of 85°. Moreover, grooves are provided in a direction perpendicular to the direction in which the unit features are arranged, with a pitch GP of 5 μm. The width of each groove is 1 μm.

The liquid crystal display device of Example 3 may be produced as follows.

First, a roller-like master having predetermined ruggednesses formed on its surface is produced, and the surface configuration of the master is embossed onto a UV-curable resin which has been applied on a substrate surface. As a result, a resin layer having a structure corresponding to the ruggednesses on the master is formed on a TFT substrate. The emboss is performed by using the apparatus shown in FIG. 25. Thereafter, a vertical alignment film is formed on the surface of the resin layer by spin-coating.

The TFT substrate having the resin layer formed thereon and a color filter substrate having a vertical alignment film formed on its surface are placed so as to oppose each other with the vertical alignment films facing inward, and are attached together while leaving an interspace of 3 μm therebetween. Between these substrates, a liquid crystal (MLC6609) having a negative Δε is injected. Thus, the display device of Example 3 is completed.

The actual light transmittance measurement for each minute region is described below. The transmission axes of the polarizers are in vertical and horizontal directions.

FIG. 31B shows the frontal transmittance, and FIG. 31C shows the transmittance obtained when viewed at an azimuth angle 45° (45° in the upper right direction) and a viewing angle 60° (i.e., 60° from the substrate normal direction), of the minute regions Ia to IVa, and Ib to IVb. It can be seen from these results that, by realizing a highly precise alignment division as in the present example, the liquid crystal alignment ascribable to the respective minute regions is averaged out, so that any change in brightness depending on the viewing direction is suppressed, whereby better viewing angle characteristics can be obtained.

Embodiment 7

Hereinafter, a liquid crystal display device according to Embodiment 7 of the present invention will be described with reference to the accompanying drawings.

The liquid crystal display device of the present embodiment includes a pair of opposing substrates, and a liquid crystal layer interposed therebetween. One or both of the pair of substrates is constructed by using an alignment controlling element 501 shown in FIG. 32A.

The alignment controlling element 501 includes a substrate 502, and a plurality of unit features 503 formed on the surface of the substrate 502, and can function as an alignment controlling means for controlling the orientations of the liquid crystal molecules contained in a liquid crystal layer 510. The liquid crystal layer 510 is a vertical alignment type liquid crystal layer in which a negative type nematic liquid crystal (Δε<0) is employed.

Figure 32A:
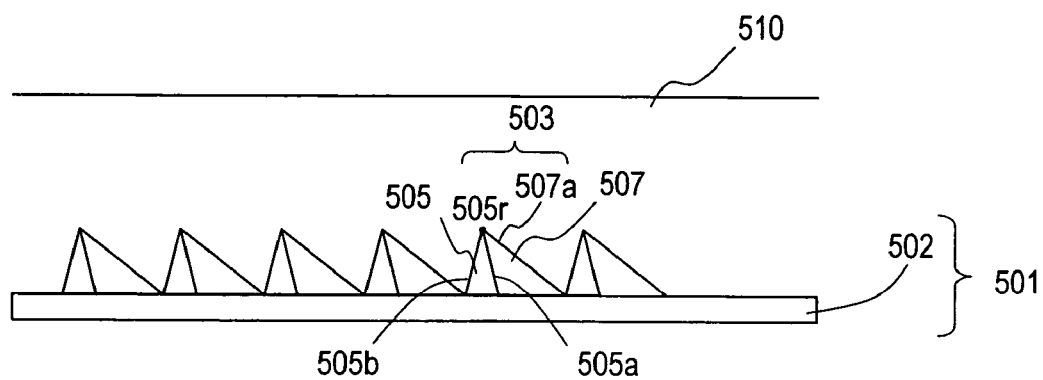
FIGS. 32A and 32B are a cross-sectional view and a plan view, respectively, showing the structure of an alignment controlling element according to Embodiment 7 of the present invention.

Each of the unit features 503 formed on the surface of the alignment controlling element 501 is composed of a wall member 505 and a slope member 507. The wall member 505 includes two side faces 505a and 505b and a ridge 505r formed by these side faces. The slope member 507 is formed so as to be in contact with one side face 505a of the wall member 505. The slope member 507 has a slanted face 507a, which is slanted with respect to the surface of the substrate 502. The wall member 505 and the slope member 507 are typically composed of different materials. Although the wall member 505 of FIG. 32A is shown to have a substantially triangular cross-sectional shape, the wall member 505 may alternatively have a curved cross-sectional shape or any other (e.g., a quadrangular) cross-sectional shape.

Figure 32B:
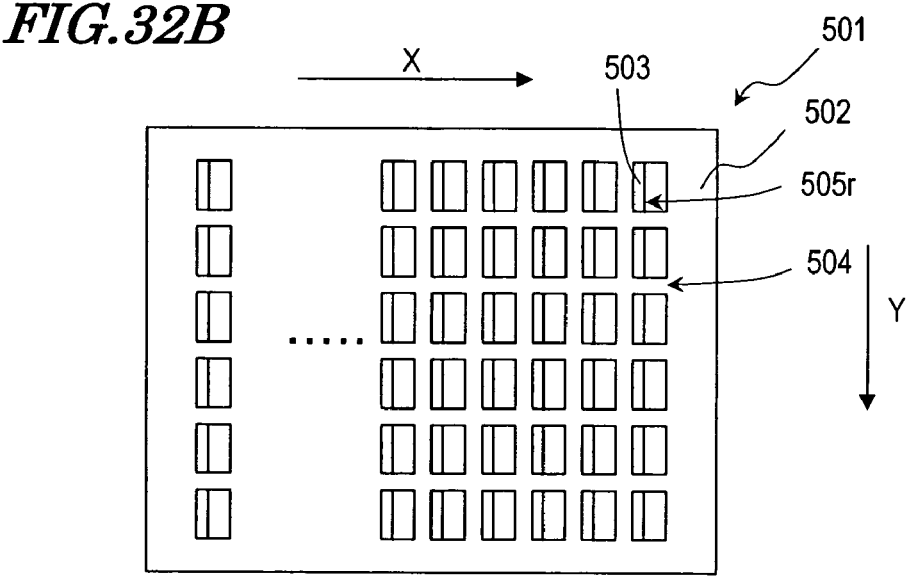

FIG. 32B is an exemplary plan view of the alignment controlling element 501. The alignment controlling element 501 includes the unit features 503, which appear as relatively short strips arranged in the direction of the ridges 505r (hereinafter the "Y direction") with predetermined grooves 504 left therebetween. The unit features 503 may be arranged in parallel to a direction perpendicular to the Y direction (hereinafter the "X direction"). Although FIG. 32B shows the X direction to be perpendicular to the Y direction, the X direction may be any direction different from the Y direction. Note that, in the present embodiment, the unit features 503 do not need to be periodically arranged.

Hereinafter, the manner in which the slanted faces 507a of the unit features 503 exert alignment control on the liquid crystal molecules in the liquid crystal layer 510 will be described by way of examples.

In a state where no voltage is applied across the liquid crystal layer 10 (hereinafter referred to as an "OFF state"), the longer axis of each liquid crystal molecule located at the surface of the slanted face 507a is oriented substantially perpendicularly to each slanted face 507a of the alignment controlling element 501. Therefore, the liquid crystal molecules in the liquid crystal layer 510 are tilted from the normal direction of the surface of the substrate 502 (pretilt direction). When a voltage is applied across the liquid crystal layer 510 in a direction perpendicular to the substrate 502, each liquid crystal molecule will try to incline in the pretilt direction. If the applied voltage is sufficiently high, the liquid crystal molecules will lie substantially parallel to the surface of the substrate 502, with the longer axes of the liquid crystal molecules being aligned in the direction of the grooves 504.

In order to ensure that the alignment controlling element 501 of the present embodiment has an adequate liquid crystal alignment controlling ability, it is preferable that the unit features 503 have an average pitch of 0.1 μm or more. On the other hand, in order to control the liquid crystal orientation directions by means of the entire surface of the alignment controlling element 501, it is preferable that the unit features 503 have an average pitch of 10 μm or less.

Figure 33A:
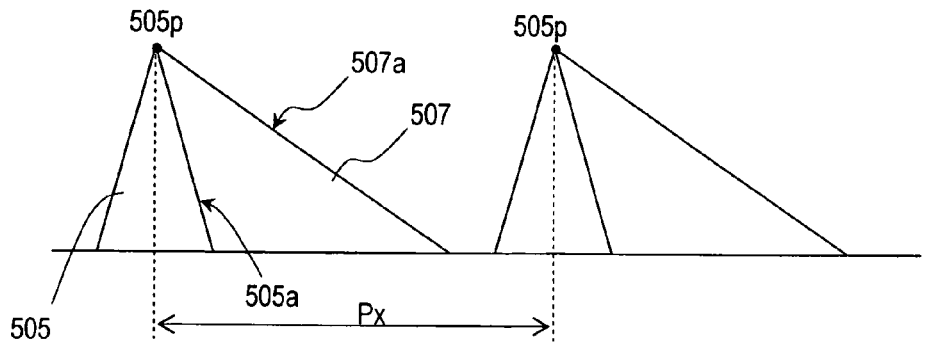
FIGS. 33A to 33E are diagrams for explaining a pitch, as well as angles of slanted faces or side faces, of unit features according to Embodiment 7 of the present invention.
Figure 33B:
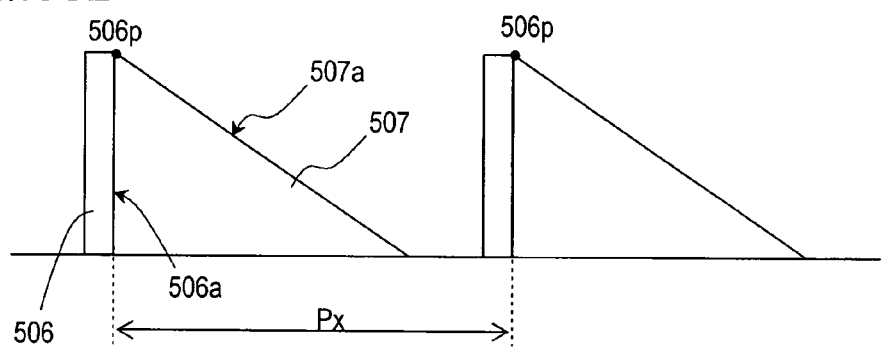

In the present embodiment, the "(average) pitch of unit features" is defined to be a distance between adjoining wall members, as taken between the apices of the side faces which are in contact with the associated slope members, in the plane of the substrate surface. For example, the pitch of the unit features shown in FIG. 33A is a distance $P_X$ between the highest points 505p of the side faces 505a of any two adjoining wall members 505 (the side faces 505a being in contact with their associated slope members 507), as taken in the plane of the substrate surface. Similarly, in the case where each wall member has a substantially rectangular cross section, the pitch of the unit features is, as shown in FIG. 33B, a distance $P_X$ between the highest points 506p of the side faces 506a of any two adjoining wall members 506, as taken in the plane of the substrate surface.

A pitch $P_Y$ of the unit features 503 along the direction of the ridges 505r is, for example, no less than 0.1 μm and no more than 10 μm. Each groove has a width of e.g. no less than 10 nm, which is equal to or less than the pitch $P_X$ of the unit features 503 along the X direction.

In the present embodiment, it is preferable that the unit features 503 have a height (which herein is the height of the wall members 505) which is no less than 10 nm and no more than 10 μm. If the height is no less than 10 nm, the surface configuration of the alignment controlling element 501 can securely restrict the liquid crystal molecule orientations. On the other hand, if the height is no more than 10 μm, any problems associated with the effective thickness of the liquid crystal layer 510 being changed by the presence of the unit features 503 can be suppressed.

The angle between the slanted face 507a of each unit feature 503 and the surface of the substrate 502 can be arbitrarily selected, in the range of greater than 0° and no more than 45°, for example. For example, if the angle between each slanted face 507a and the surface of the substrate 502 is no less than 10° and no more than 45°, the liquid crystal molecules can be oriented so as to be tilted from the normal direction of the substrate 502 by an angle of no less than 10° and no more than 45°, in the neighborhood of the slanted faces 507a of the alignment controlling element 501.

Figure 33C:
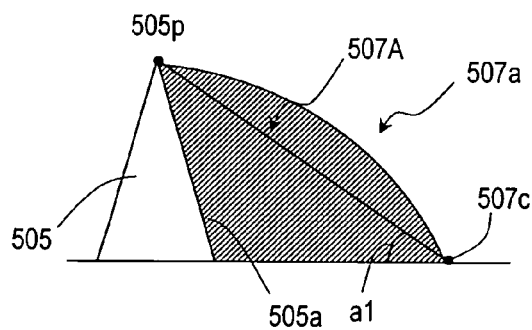
Figure 33D:
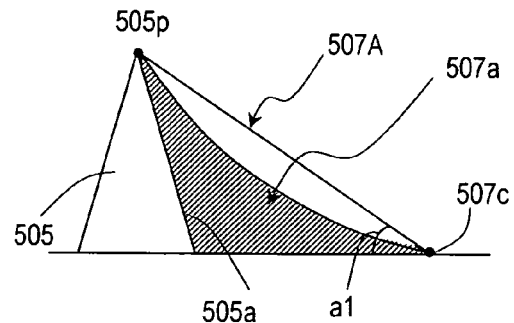

Now, with reference to FIGS. 33C and 33D, "the angle between the slanted face of each unit feature and the substrate surface (hereinafter this angle may be simply referred to as the 'slanted face angle')" will be described. The slanted face 507a of each slope member 507 of the present embodiment may fail to become planar as shown in FIGS. 33C and 33D, for reasons associated with the method by which they are produced, etc. In such cases, as shown in FIGS. 33C and 33D, in a cross-sectional view taken perpendicularly to the ridge 505r of each unit feature, a line 507A is drawn between the highest point 505p of the side face 505a of the wall member 505 (the side face 505a being in contact with the slope member 507) and a point 507c at which the slanted face 507a of the slope member 507 comes in contact with the substrate surface; and an angle a1 between this line 507A and the substrate surface will be regarded as the "slanted face angle".

Figure 33E:
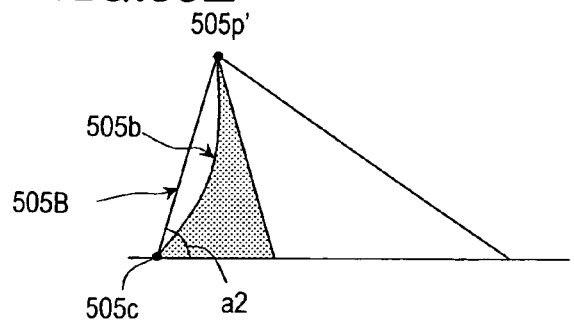

Among the side faces of the wall member 505 of each unit feature 503, the side face 505b which is not in contact with the slope member 507 preferably constitutes, with the surface of the substrate 502, an angle which is greater than the aforementioned angle a1 between the slanted face 507a and the surface of the substrate 502. The angle between the side face 505b of the wall member 505 and the surface of the substrate 502 is typically greater than 45° and less than 180°. As shown in FIG. 33E, "the angle between the side face 505b of the wall member 505 and the surface of the substrate 502" is defined as an angle a2 between the substrate surface and a line 505B which is drawn between the highest point 505p' of the side face 505b of the wall member 505 and a point 505c at which the side face 505b comes in contact with the substrate surface.

The liquid crystal molecules located at the interface between the surface of the alignment controlling element 501 and the liquid crystal layer are oriented along the normal direction of the surface of the alignment controlling element 501. In other words, the liquid crystal molecules located on each slanted face have a pretilt (first pretilt) along the normal direction of the slanted face 507a, whereas the liquid crystal molecules located on the side face of each wall member have a pretilt (second pretilt) along the normal direction of the side face 505b of the wall member. In the present embodiment, each unit feature 503 has an asymmetric cross section, and the pretilt which is imparted by the slanted face 7a is predominant over the pretilt which is imparted by the side face 5b of the wall member. Therefore, the liquid crystal molecules located near a middle level along the thickness direction of the liquid crystal layer are more susceptible to the first pretilt imparted by the slanted face 507a, so that the liquid crystal molecules will have the same pretilt direction as that of the first pretilt and a smaller pretilt angle than that of the first pretilt, for example. Note that the pretilt of the liquid crystal molecules located near a middle level along the thickness direction of the liquid crystal layer are affected not only by the surface configuration of the alignment controlling element 501, but also by the surface configuration of the counter substrate which is in contact with the upper face of the liquid crystal layer 510.

Although the exposed surface of the unit features 503 of the alignment controlling element 501 shown in FIG. 32A is in contact with the liquid crystal layer 510, it is not necessary that they are in contact with each other. For example, between the alignment controlling element 501 and the liquid crystal layer 510, a vertical alignment film and/or a conductive film which can function as an electrode for applying a voltage to the liquid crystal layer 510, or a multilayer film having a conductive film and an alignment film stacked in this order may be provided. It is desirable that any film provided between the alignment controlling element 501 and the liquid crystal layer 510 is sufficiently thin so that the film can acquire a surface configuration which reflects the shape of the unit features 503 (e.g., with a thickness of 1 μm or less). Such a thin film would allow the surface configuration of the alignment controlling element 501 to control the alignment of the liquid crystal layer 510.

Hereinafter, an exemplary method for producing the alignment controlling element 501 will be described with reference to the drawings.

FIGS. 34A to 34E are schematic cross-sectional views for explaining a method of producing the alignment controlling element 501 by using a material which is capable of thermal deformation (thermal flow).

Figure 34A:
FIGS. 34A to 34E are schematic cross-sectional views for explaining a method of producing an alignment controlling element according to Embodiment 7 of the present invention.

First, as shown in FIG. 34A, a wall member forming layer (thickness: e.g., 300 nm) 522 is formed on a substrate 520. Although there are no limitations to the materials of the substrate 520 and the wall member forming layer 522, the present embodiment illustrates a case where a quartz substrate is used as the substrate 520 and a silicon nitride film is used as the wall member forming layer 522.

Figure 34B:
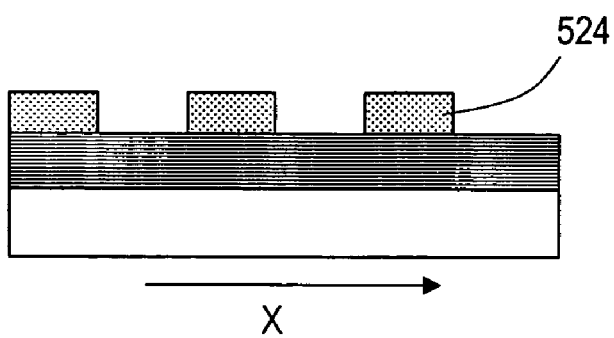

Next, as shown in FIG. 34B, a resist pattern 524 comprising a plurality of islet portions is formed on the wall member forming layer 522 by using a negative resist, for example. The pitch of the islet portions of the resist pattern 524 along the X direction is to be selected in accordance with the pitch of the wall members to be formed, i.e., the unit feature pitch $P_X$. In the present embodiment, the average pitch of the resist pattern 524 along the X direction is 1.6 μm. Along a Y direction which is perpendicular to the X direction, a resist pattern 524 comprising a plurality of islet portions is disposed, with an average interspace of 0.8 μm between the islet portions. The average pitch of the resist pattern 524 along the Y direction is 3.2 μm.

Figure 34C:
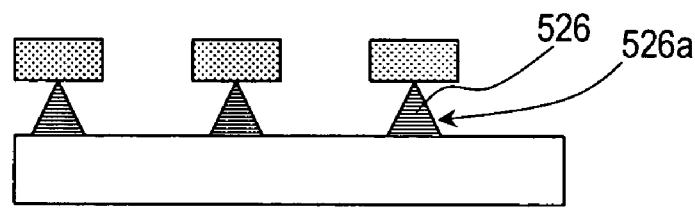

Thereafter, as shown in FIG. 34C, the wall member forming layer 522 is etched by using the resist pattern 524 as a mask. For example, the wall member forming layer (silicon nitride film) 522 is subjected to a wet etching using a buffered hydrofluoric acid for 60 seconds, and thereafter is washed well with water. Through this etching, wall members 526 having a height corresponding to the thickness of the wall member forming layer 522 are formed. In FIG. 34C, the cross section of each wall member 526 is shown to be substantially triangular with a bottom face in contact with the substrate 520, the cross-sectional shape of the wall members 526 is not limited to that which is shown in FIG. 34C. The cross section of each wall member 526 may be a trapezoid having a bottom side in contact with the substrate 520. Alternatively, by performing an anisotropic etching for the wall member forming layer 522, wall member 526 each having a substantially rectangular cross section may be formed.

Figure 34D:
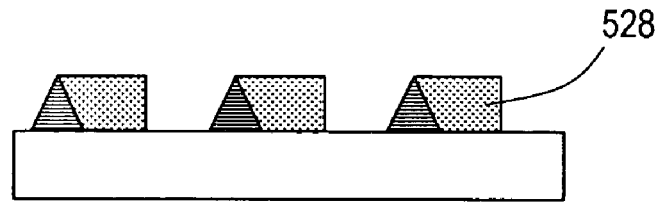

Next, after removing the resist pattern 524 by using acetone or the like, a plurality of slope member forming layers 528 are formed on the substrate 520 (FIG. 34D). The slope member forming layers 528 may be islet portions of a resist pattern composed of a positive resist, for example. Each islet portion of the resist pattern 528 is formed so as to be in contact with one side face 526a of the corresponding wall member 526. In the present embodiment, the resist pattern 528 is formed by using a photomask having a pattern which is shifted by 0.4 μm from the pattern of the photomask (reticle) used when forming the resist pattern 524 in FIG. 34B. Therefore, the average pitch of adjoining islet portions of the resist pattern 528 along the X direction is 1.6 μm, and the average interspace between adjoining islet portions of the resist pattern 528 is 0.8 μm.

Figure 34E:
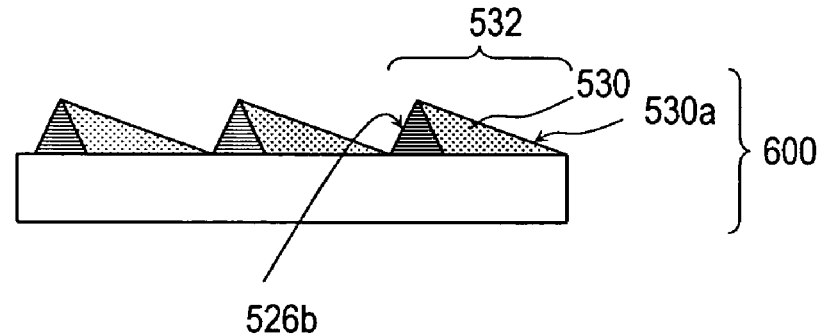

Thereafter, as shown in FIG. 34E, the resist pattern 528 is heated to deform the resist pattern 528, whereby the slope members 530 are formed. The formation of the slope members 530 can be effected by, for example, heating the substrate 520 in a hot oven (temperature: 135°) for 10 minutes. The temperature inside the oven may be any temperature which does not cause deformation of the wall members 526 and the substrate 520 but which causes thermal deformation (thermal flow) of the resist pattern 528, and may be selected in accordance with the materials of the wall members 526 and the resist pattern 528.

Thus, an alignment controlling element 600 having a plurality of unit features 532 each composed of a wall member 526 and a slope member 530 is obtained. In the alignment controlling element 600 thus obtained, the unit features 532 have an average pitch of 1.6 μm, and the slanted face 530a of each slope member 530 constitutes an angle of 12° with the substrate 502. Each unit feature 532 of the present embodiment has a substantially triangular cross section as shown in FIG. 4E, the triangular shape having a vertex angle (i.e., the angle between the exposed side face 526b of each wall member and the slanted face 530a of each slope member 530) of 112°.

Although the above-described method causes deformation of the slope member forming layer (resist pattern) 528 through thermal flow, it would also be possible to deform the slope member forming layer through exposure.

Hereinafter, with reference to FIGS. 35A to 35E, another method for producing the alignment controlling element of the present embodiment will be described. In this method, slope members are formed by deforming a slope member forming layer through an oblique exposure utilizing wall members.

Figure 35A:
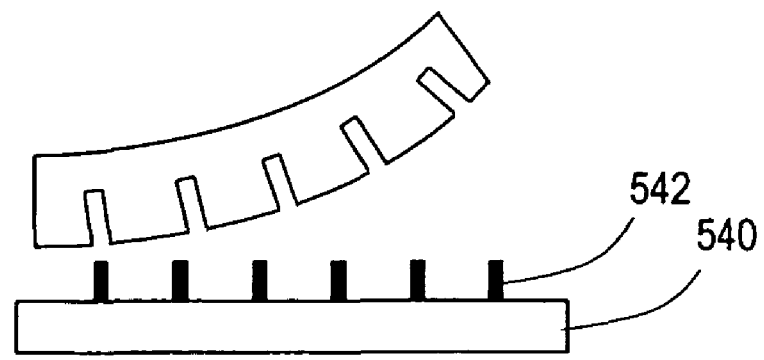
FIGS. 35A to 35E are schematic cross-sectional views for explaining another method for producing an alignment controlling element according to Embodiment 7 of the present invention.

First, as shown in FIG. 35A, a plurality of wall members 542 are formed on a substrate 540 by emboss, for example. In the present embodiment, the wall members 542 are formed by using resin black (color mosaic CK-2000; Fuji Hunt Electronics Technology K.K.).

Figure 35B:
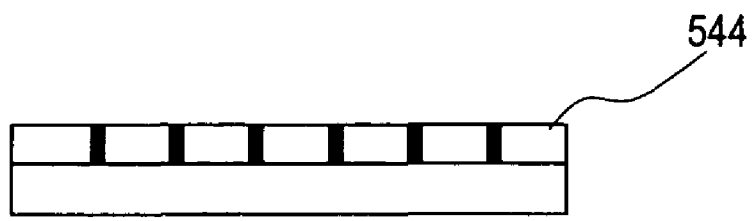

Next, as shown in FIG. 35B, a slope member forming layer 544 is formed so as to fill between adjoining wall members 542 and cover any surface portion of the substrate 540 on which the wall members 542 are not formed. Although FIG. 35B shows the slope member forming layer 544 to have the same thickness as the height of the wall members 542, the two values may be different. The slope member forming layer 544 is a layer composed of, for example, a negative resist (OMR85; Tokyo Ohka Kogyo Co., Ltd.).

Figure 35C:
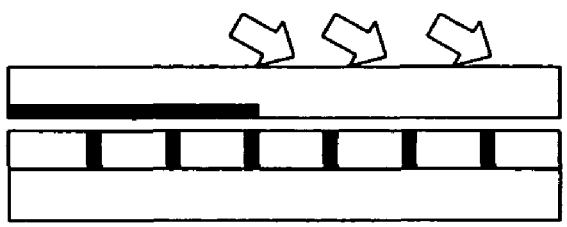

Thereafter, as shown in FIG. 35C, the slope member forming layer (nega-resist layer) 544 is subjected to an oblique exposure. The direction of exposure may be selected in accordance with the direction in which the slanted faces are to be formed. As a result, only portions of the nega-resist layer 544 which are not shaded by the wall members 542 are exposed.

Figure 35D:
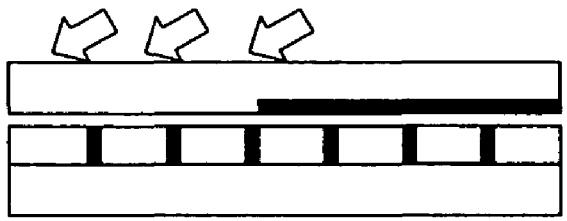

At this time, as shown in FIG. 35C, any surface region of the substrate 540 other than the regions to be exposed in this step may be covered with a mask. In that case, after the step of FIG. 35C, any surface region of the substrate 540 which has been exposed in the step shown in FIG. 35C may now be covered with a mask, and any region of the nega-resist layer 544 not covered with the mask may be subjected to an exposure from a direction which is different from the direction of exposure shown in. FIG. 35C (FIG. 35D). In this manner, for a given desired surface configuration, a plurality of instances (which may be three times or more) of oblique exposure can be performed, each time with a different direction of exposure. Alternatively, by using a light-transmissive substrate 540, the oblique exposure illustrated in FIGS. 35C and 35D may be performed from the back side of the substrate 540.

Figure 35E:
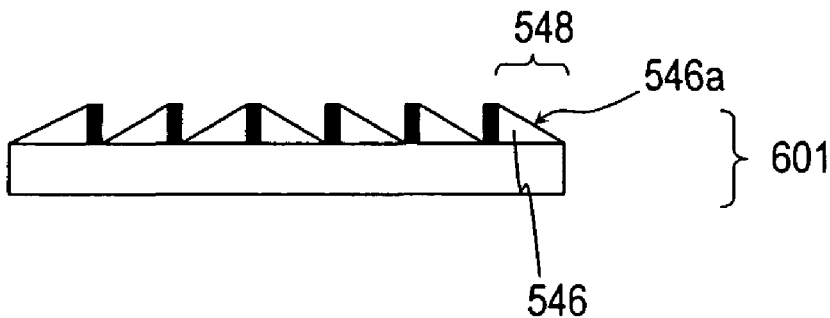

By performing development of the nega-resist layer 544 after the exposure, only the portions of the nega-resist layer 544 which have been exposed are removed, so that the unexposed portions form slope members 546 each having a slanted face 546a, as shown in FIG. 35E. Thus, an alignment controlling element 601 having a plurality of unit features 548 each composed of a wall member 542 and a slope member 546 is obtained. Note that, in the case where a plurality of instances of oblique exposure are performed while switching the direction of exposure as shown in FIGS. 35C and 35D, the slanted face of each unit feature 548 has a normal direction which depends on the direction of exposure to which that unit feature 548 was subjected.

In the methods which have been described with reference to FIGS. 34A to 34E and FIGS. 35A to 35E, slope members are formed by deforming a slope member forming layer. However, slope members can be formed without performing any such deformation step.

Hereinafter, with reference to FIGS. 36A to 36D, still another method for producing the alignment controlling element of the present embodiment will be described. In this method, slope members are formed by applying a solution to a substrate by ink jet technique, using each wall member as a dam. Therefore, there is no need to perform a step of deforming a slope member forming layer as in the methods illustrated in FIGS. 34A to 34E and FIGS. 35A to 35E.

Figure 36A:
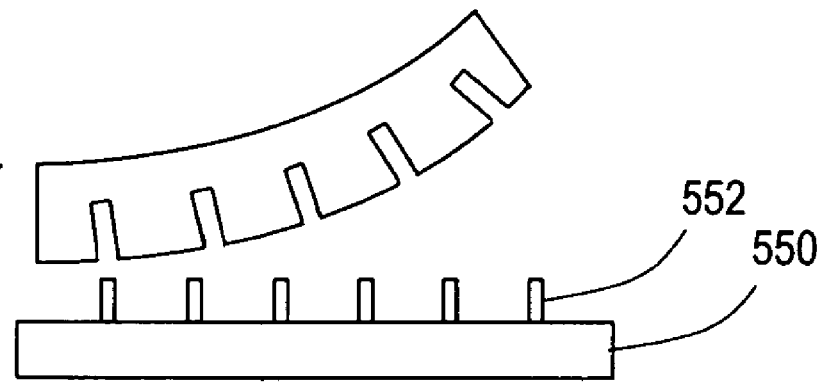
FIGS. 36A to 36D are schematic cross-sectional views for explaining yet another method for producing an alignment controlling element according to Embodiment 7 of the present invention.

First, as shown in FIG. 36A, a plurality of wall members 552 are formed on a substrate 550 by emboss or the like. The wall members 552 may be formed of a positive resist (OFPR800, Tokyo Ohka Kogyo Co., Ltd.), for example. The material of the wall members 552 may be any material having a relatively small surface tension, and does not need to be photosensitive.

Figure 36B:
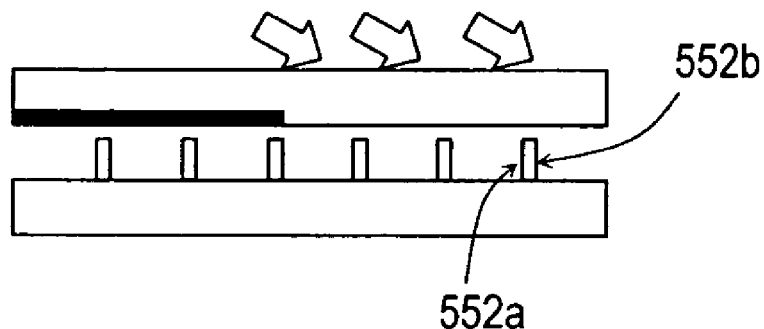

Next, as shown in FIG. 36B, an oblique exposure is performed for the substrate 550 on which the wall members 552 are formed, which allows only one side face 552a of each wall member 552 to be exposed. As a result, hydrophilicity is imparted only to the side face 552a of each wall member 552, whereas the other side face 552b of each wall member 552 maintains its water repellency.

Figure 36C:
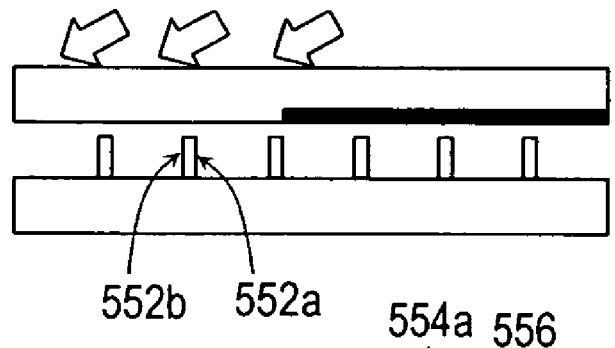

At this time, as shown in FIG. 36B, any surface region of the substrate 550 other than the regions to be exposed in this step may be covered with a mask. In that case, after the step of FIG. 36B, any surface region of the substrate 550 which has been exposed in the step shown in FIG. 36B may now be covered with a mask, and the wall members 552 which are in any region not covered with the mask may be subjected to an exposure from a direction which is different from the direction of exposure shown in FIG. 36B (FIG. 36C). By thus performing a plurality of instances (which may be three times or more) of oblique exposure, each time with a different direction of exposure, hydrophilicity can be imparted to any side face of each wall member 552. Alternatively, the oblique exposure illustrated in FIGS. 36B and 36C may be performed from the back side of the substrate 550.

Figure 36D:
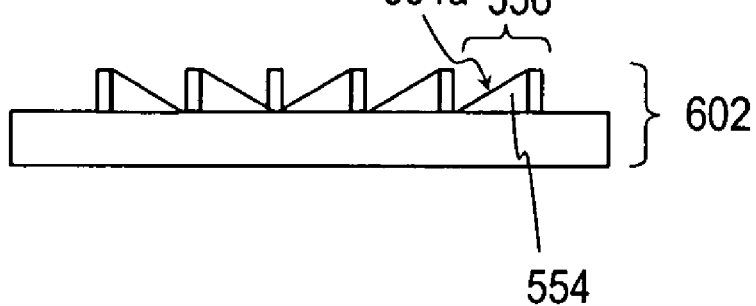

Thereafter, as shown in FIG. 36D, a solution for forming slope members is applied to the surface of the substrate 550, by using e.g. ink jet technique. At this time, the solution is repelled by the water-repellent side face 552b of each wall member 552, so as to adhere to the hydrophilic side face 552a of each wall member 552 and the surface of the substrate 550. Then, the applied solution is dried, whereby slope members 554 each having a slanted face 554a are formed. Although there are no limitations to the solution for forming the slope members, a hydrophilic (aqueous dispersion type) ink, e.g., polyvinyl alcohol, may be used.

In the step of FIG. 36D, a hydrophobic (organic solvent type) ink may instead be used as the solution for forming the slope members. In this case, it would be necessary to impart oleophilicity to the side faces 552a of the wall members 552. The impartment of hydrophilicity or oleophilicity to the side faces 552a of the wall members 552, which is done in order to enhance the wettability with respect to the solution for forming the slope members, may be expressed as impartment or enhancement, etc., of "lyophilicity".

Through the above method, an alignment controlling element 602 having a plurality of unit features 556 each composed of a wall member 552 and a slope member 554 is obtained. Note that, in the case where a plurality of instances of oblique exposure are performed while switching the direction of exposure as shown in FIGS. 36B and 36C, the slanted face 556a of each unit feature 556 has a normal direction which depends on the direction of exposure to which that unit feature 556 was subjected.

With the methods illustrated in FIGS. 34A to 34E, FIGS. 35A to 35E, and FIGS. 36A to 36D, alignment controlling elements 600, 601, and 602 which can control the initial alignment of a liquid crystal layer with an entire surface which is in contact with the liquid crystal layer can be easily produced. By employing such an alignment controlling element 600, 601, or 602, there is provided an advantage in that the alignment of the liquid crystal layer can be controlled more uniformly. Moreover, with the above methods, the angle between each slanted face and the substrate surface, the height of each wall member, and the like can be arbitrarily and precisely set, even if the average pitch $P_X$ of the unit features of the alignment controlling element is reduced (e.g., several µm or less). Since the angle between each slanted face and the substrate surface can be easily adjusted based on the pitch, height, and the like of the wall members, a high pretilt which was difficult to obtain with conventional methods can be realized.

The alignment controlling element 501 shown in FIG. 32A can alternatively be formed by emboss (replica technique). Hereinafter, a method for producing an alignment controlling element by emboss will be described.

First, a master having a plurality of unit features on its surface is produced by a method similar to any of the methods described with reference to FIGS. 34A to 34E, FIGS. 35A to 35E, and FIGS. 36A to 36D, for example.

Next, by using this master, the surface configuration of the master is embossed to a layer of resin material (resin layer) or the like, thus forming an alignment controlling element 501. The resin layer may be disposed on a glass substrate, for example. Although there are no limitations to the material of the resin layer, the same material as the material of any known alignment film can be used. Alternatively, an embossed master may be obtained by embossing the aforementioned master, and the embossed master may be used to form the alignment controlling element 501 by performing further emboss.

Embodiment 8

Hereinafter, a liquid crystal display device according to Embodiment 8 of the present invention will be described with reference to the accompanying drawings.

The liquid crystal display device of the present embodiment has a similar structure to that of the liquid crystal display device of Embodiment 7. However, in the alignment controlling element of the present embodiment, the normal direction of a slanted face 507a of each unit feature 503 is slanted in a different direction (different azimuth) depending on the specific location on the surface of the substrate 502. Note that, in the case where the slanted face 507a is not planar, "the normal direction of the slanted face 507a" refers to a direction perpendicular to the line 507A shown in FIGS. 33C and 33D.

Hereinafter, the more detailed structure of the alignment controlling element of the present embodiment will be described. As has been described with reference to FIG. 17A, the alignment controlling element of the present embodiment includes 200×600 unit regions (300 µm×100 µm).

Figure 37A:
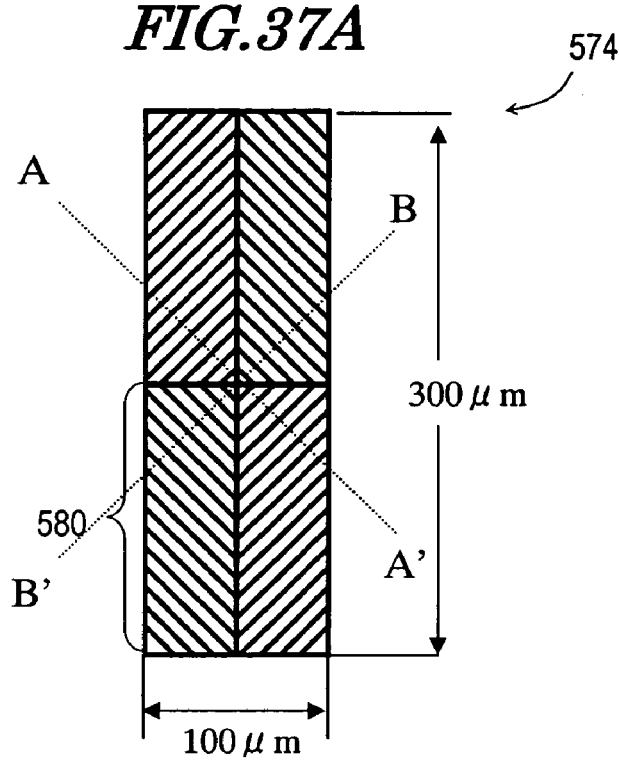
FIGS. 37A to 37C are diagrams for explaining the structure of an alignment controlling element according to Embodiment 8 of the present invention.
Figure 37B:
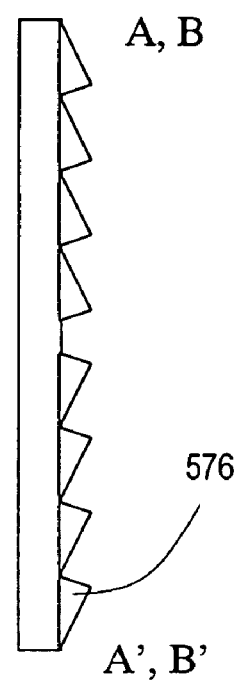

As shown in FIG. 37A, each unit region 574 is halved both longitudinally and laterally, thus resulting in four subregions 580. FIG. 37B is an A-A' or B-B' cross-sectional view of FIG. 37A. As shown, each subregion 580 has a plurality of unit features 576 arranged therein. In each subregion 580, slanted faces 576a of the unit features 576 have substantially the same normal direction. In each subregion, the slanted faces 576a are formed so as to face outward from the center of a unit region 574 in which that subregion belongs.

Figure 37C:
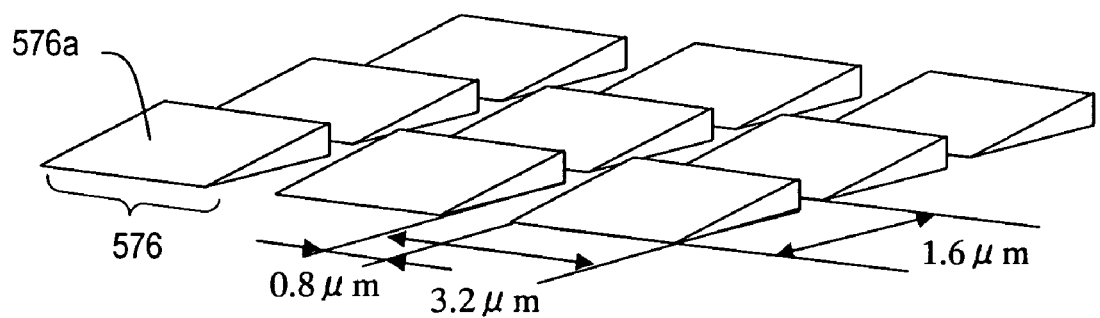

Referring to FIG. 37C, the arrangement of the unit features 576 in each subregion will be described more specifically. The unit features 576 are arranged with an average pitch $P_X$ of 1.6 µm in a direction perpendicular to their own ridges. In the direction of the ridges, the unit features 576 are arranged with an average pitch $P_Y$ of 3.2 µm, with grooves of 0.8 µm being formed therebetween.

In the alignment controlling element of the present embodiment, the normal direction of the slanted face of each unit feature is slanted in a direction which is predetermined in accordance with the specific location of the unit feature on the substrate surface. Therefore, so-called alignment division is realized, where the pretilt direction in the liquid crystal layer is controlled with respect to each predetermined region. As a result, the viewing angle characteristics of the liquid crystal display device can be improved.

The structure of the alignment controlling element of the present embodiment is not limited to that shown in FIGS. 37A to 37C. For example, the size of the unit regions 574, the number and shape of subregions, etc., can be arbitrarily set. In the case where the alignment controlling element of the present embodiment is applied to a display device, it is preferable that each unit region 574 has a size corresponding to the size of each pixel of the display device to which the element is to be applied. The size and pitch of the unit features 576 can be arbitrarily set. Furthermore, the alignment controlling element may have an alignment film and/or a conductive film on its surface. In this case, the liquid crystal layer may advantageously be placed so as to be in contact with the alignment film.

Next, a method for producing the alignment controlling element of the present embodiment, which permits alignment division, will be described.

First, a method for producing an alignment controlling element by using a material which is capable of thermal deformation will be described.

By a method similar to the method described with reference to FIGS. 34A to 34C, wall members 526 are formed on a substrate 520, except that a resist pattern 524 shown in FIG. 34B is to be formed in accordance with the unit feature arrangement as shown in FIG. 37A.

Next, as shown in FIG. 34D, a resist pattern 528 is formed by using a photomask in such a manner that, in each subregion, the pattern is in contact with a side face 526a of the wall member 526 on which a slanted face is to be formed. In the present embodiment, a photomask is to be used such that a pattern which is shifted by 0.4 µm in the upper right, upper left, lower right, or lower left direction from the resist pattern 524 for forming the wall members 526 is formed in the upper right, upper left, lower right, or lower left subregion, respectively, of the unit region shown in FIG. 37A.

The subsequent steps are similar to the steps described with reference to FIG. 34E.

With the above method, unit features each of whose slanted face is oriented in a different direction depending on the specific location on the substrate surface can be easily formed.

Alternatively, the alignment controlling element of the present embodiment may be produced by a method which utilizes exposure-based deformation of a slope member forming layer, similarly to the method described with reference to FIGS. 35A to 35E.

First, in the step of forming wall members 542 as shown in FIG. 35A, wall members 542 are formed on a substrate 540 in accordance with the unit feature arrangement shown in FIG. 37A. Next, the steps of oblique exposure for the nega-resist layer 544 as shown in FIGS. 35C and 35D are performed as follows. First, a first oblique exposure is performed by using a mask which covers any portion of each unit region other than the upper right subregion. Similarly, second, third, and fourth oblique exposures are performed, each by using a mask which covers any portion of each unit region other than the lower right, lower left, or upper left subregions. The first to fourth oblique exposures are to be performed with respectively different directions of exposure. Thereafter, the nega-resist layer 544 is developed (FIG. 35E), whereby an alignment controlling element whose slanted faces are oriented in different directions from subregion to subregion is obtained.

The alignment controlling element of the present embodiment may also be produced by a method similar to the ink jet technique-based method described with reference to FIG. 36.

First, in the step of forming wall members 552 shown in FIG. 36A, wall members 552 are formed on a substrate 550 in accordance with the unit feature arrangement shown in FIG. 37A.

Next, the steps of oblique exposure for the wall members 552 as shown in FIGS. 36B and 36C are performed as follows. First, a first oblique exposure is performed by using a mask which covers any portion of each unit region other than the upper right subregion. Similarly, second, third, and fourth oblique exposures are performed, each by using a mask which covers any portion of each unit region other than the lower right, lower left, or upper left subregions. The first to fourth oblique exposures are to be performed with respectively different directions of exposure. Then, a solution for forming slope members is applied to the substrate 550 by ink jet technique or the like, and thereafter the applied solution is dried (FIG. 36D), whereby an alignment controlling element whose slanted faces are oriented in different directions from subregion to subregion is obtained.

With the above-described method, an alignment controlling element in which the pitch, height, slanted face angles, etc., of the unit features are arbitrarily and precisely controlled, and which permits alignment division, can be easily produced.

The alignment controlling element of the present embodiment may have a surface formed by emboss. Such an alignment controlling element can be formed by a method similar to the emboss-based method for forming the alignment controlling element as described in Embodiment 7. Furthermore, by the method described with reference to FIGS. 34A to 34E, FIGS. 35A to 35E, and FIGS. 36A to 36D, a master corresponding to e.g. the upper right subregion may be produced, and the surface configuration of the master may be embossed four times for different regions, each time in a different direction, whereby an alignment controlling element in which the normal direction of the slanted faces are different from subregion to subregion can be obtained.

According to the present invention, ruggednesses formed on a surface which is in contact with a liquid crystal layer impart a substantially uniform pretilt to the liquid crystal molecules located at a middle level along the thickness direction of the vertical alignment type liquid crystal layer, whereby liquid crystal alignment can be controlled with a high precision. Therefore, a bright and high-contrast liquid crystal display device can be provided. By optimizing the shape, size, arrangement, etc., of the unit features arranged in a two-dimensional array on the surface which is in contact with the liquid crystal layer, the pretilt angle and the pretilt direction can be freely set.

Since the alignment of the liquid crystal layer can be regulated by a two-dimensional plane, better response characteristics can be obtained than is possible with any conventional display device utilizing rib technique or incliened electric field technique in which an alignment regulating force is linearly (one-dimensionally) applied.

By forming unit features of different configurations in accordance with specific locations on the substrate surface, it becomes possible to realize alignment division such that each pixel is divided into a plurality of regions of different pretilt directions. Furthermore, a region of the same pretilt direction within a single pixel can be further divided into a plurality of regions having different pretilt angles. Thus, a liquid crystal display device having excellent viewing angle characteristics can be provided.

The alignment controlling structure (ruggednesses) according to the present invention has an advantage in that it can be formed with a high precision through an easier process than that required for producing any conventional alignment controlling means.

The present invention is applicable to various types of vertical alignment type liquid crystal display devices. The present invention is particularly suitable for MVA mode liquid crystal display devices.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) on Patent Application No. 2004-126357 filed in Japan on Apr. 22, 2004, the entire contents of which are hereby incorporated by reference.

What is claimed is:

1. A liquid crystal display device comprising
a pair of substrates, a vertical alignment liquid crystal layer provided between the pair of substrates, and electrodes for applying a voltage to the vertical alignment liquid crystal layer, wherein,
at least one of the pair of substrates has a rugged structure on a surface which is in contact with the vertical alignment liquid crystal layer;
the rugged structure comprises a plurality of substantially columnar unit features arranged along a first direction with a period of no less than 0.1 μm and no more than 10 μm, each unit feature having vertical side walls vertical with respect to the substrates and an upper face parallel to the substrates;
the plurality of unit features are arranged to form bottom faces entirely surrounded on all lateral sides by the vertical side walls of most adjacent ones of the plurality of unit features so as to confine liquid crystal alignment within each bottom face, the each bottom face lacking a symmetry axis of rotation in a substrate normal direction so that liquid crystal molecules at the each bottom face are aligned in a direction parallel to the bottom face, liquid crystal molecules located near the side walls are aligned perpendicular to the side walls, and liquid crystal molecules at each upper face are aligned perpendicular to the upper face;
the vertical alignment liquid crystal layer with no voltage applied thereacross has a pretilt due to the rugged structure; and
wherein at least a plurality of the unit features of the rugged structure with substantially columnar shape extend less than half way through the liquid crystal layer.

2. The liquid crystal display device according to claim 1, wherein, with no voltage applied across the vertical alignment liquid crystal layer, liquid crystal molecules located at a middle level along a thickness direction of the vertical alignment liquid crystal layer are aligned so as to be tilted from a normal direction of the pair of substrates.

3. The liquid crystal display device according to claim 1, wherein the plurality of unit features have a height of no less than 0.1 μm and no more than 3 μm.

4. The liquid crystal display device according to claim 1, wherein each unit feature is a triangular prism.

5. The liquid crystal display device according to claim 1, wherein each unit feature is a pentagonal prism.

6. A liquid crystal display device comprising
a pair of substrates, a vertical alignment liquid crystal layer provided between the pair of substrates, and electrodes for applying a voltage to the vertical alignment liquid crystal layer, wherein,
at least one of the pair of substrates has a rugged structure on a surface which is in contact with the vertical alignment liquid crystal layer;
the rugged structure comprises a plurality of substantially columnar unit features arranged along a first direction with a period of no less than 0.1 μm and no more than 10 μm, each unit feature having vertical side walls vertical with respect to the substrates and an upper face parallel to the substrates;
the plurality of unit features are arranged to form bottom faces surrounded by the vertical side walls of most adjacent ones of the plurality of unit features so as to confine liquid crystal alignment within each bottom face, the each bottom face lacking a symmetry axis of rotation in a substrate normal direction so that liquid crystal molecules at the each bottom face are aligned in a direction parallel to the bottom face, liquid crystal molecules located near the side walls are aligned perpendicular to the side walls, and liquid crystal molecules at each upper face are aligned perpendicular to the upper face;
the vertical alignment liquid crystal layer with no voltage applied thereacross has a pretilt due to the rugged structure;
wherein at least a plurality of the unit features of the rugged structure with substantially columnar shape extend less than half way through the liquid crystal layer; and
wherein the unit features are arranged in an array, wherein the unit features of the array have a first regular period in an X direction and a second regular period in a Y direction, wherein the first and second regular periods are different from each other.

7. The liquid crystal display device according to claim 1, wherein the unit features are arranged in an array, wherein the unit features of the array have a first regular period in an X direction and a second regular period in a Y direction, wherein the first and second regular periods are different from each other.

8. The liquid crystal display device according to claim 1, wherein only one of the pair of substrates has the rugged structure on the surface.

* * * * *